US012739195B2

(12) United States Patent
Daly et al.

(10) Patent No.: US 12,739,195 B2
(45) Date of Patent: Sep. 15, 2026

(54) SYSTEM COMPRISING ENDPOINT PROCESSING UNITS AND A NETWORK FOR CONNECTING ENDPOINT PROCESSING UNITS

(71) Applicant: Delos Data Inc., Palo Alto, CA (US)

(72) Inventors: Daniel P. Daly, Santa Barbara, CA (US); Edward V. E. Doe, Palo Alto, CA (US); Alain J. E. Gravel, Thousand Oaks, CA (US)

(73) Assignee: DELOS DATA INC., Palo Alto, CA (US)

(*) Notice: Subject to any disclaimer, the term of this patent is extended or adjusted under 35 U.S.C. 154(b) by 0 days.

(21) Appl. No.: 19/227,473

(22) Filed: Jun. 4, 2025

(65) Prior Publication Data

US 2026/0089090 A1 Mar. 26, 2026

Related U.S. Application Data

(60) Provisional application No. 63/777,883, filed on Mar. 26, 2025, provisional application No. 63/714,118, (Continued)

(51) Int. Cl.
*H04L 45/24* (2022.01)
*H04L 67/10* (2022.01)

(52) U.S. Cl.
CPC .............. *H04L 45/24* (2013.01); *H04L 67/10* (2013.01)

(58) Field of Classification Search
CPC ................................ H04L 45/24; H04L 67/10
See application file for complete search history.

(56) References Cited

U.S. PATENT DOCUMENTS

| | | | |
|---|---|---|---|
| 6,101,549 | A | 8/2000 | Baugher et al. |
| 7,627,744 | B2 | 12/2009 | Maher et al. |

(Continued)

FOREIGN PATENT DOCUMENTS

| | | | |
|---|---|---|---|
| CN | 117157953 | A | 12/2023 |
| CN | 118503194 | A | 8/2024 |
| HU | E033041 | T2 | 11/2017 |

OTHER PUBLICATIONS

Asterfuison ("AOC, DAC, ACC, AEC Modules: The most Complete Overview", cloudswit.ch, May 20, 2024) (Year: 2024).*

(Continued)

*Primary Examiner* — Boris D Grijalva Lobos
(74) *Attorney, Agent, or Firm* — ADELI LLP

(57) ABSTRACT

Some embodiments provide a system for executing a distributed application. The system includes multiple clusters of EPUs that perform computations that are associated with the execution of the distributed application. Each EPU has one or more EPIs. For each cluster of EPUs, the system includes a set of intra-cluster switches each of which connects to multiple EPIs of two or more EPUs in the cluster in order to connect the EPUs in the cluster of EPUs. The system includes a set of two or more inter cluster switches each of which connects at least two intra-cluster switches of two different clusters of EPUs. The inter-cluster and intra-cluster switches form a network. Each of one or more EPIs performs a multi-pathing operation that forwards a result of a computation performed by the EPI's EPU to a destination along two or more paths through the network.

16 Claims, 33 Drawing Sheets

Related U.S. Application Data filed on Oct. 30, 2024, provisional application No. 63/707,702, filed on Oct. 15, 2024, provisional application No. 63/698,036, filed on Sep. 23, 2024, provisional application No. 63/697,485, filed on Sep. 21, 2024.

(56) References Cited

U.S. PATENT DOCUMENTS

| | | | |
|---|---|---|---|
| 8,738,684 | B1 | 5/2014 | Ellis |
| 8,743,888 | B2 | 6/2014 | Casado et al. |
| 8,743,889 | B2 | 6/2014 | Koponen et al. |
| 8,817,620 | B2 | 8/2014 | Koponen et al. |
| 8,966,035 | B2 | 2/2015 | Casado et al. |
| 9,083,609 | B2 | 7/2015 | Casado et al. |
| 10,200,235 | B2 | 2/2019 | Pfaff et al. |
| 10,275,851 | B1 | 4/2019 | Zhao et al. |
| 10,382,401 | B1 | 8/2019 | Lee et al. |
| 10,728,091 | B2 | 7/2020 | Zhao et al. |
| 11,080,225 | B2 | 8/2021 | Borikar et al. |
| 11,477,114 | B2 | 10/2022 | Hu |
| 12,603,829 | B2 | 4/2026 | Clark |
| 2001/0034771 | A1 | 10/2001 | Hutsch et al. |
| 2002/0110119 | A1 | 8/2002 | Fredette et al. |
| 2004/0105440 | A1 | 6/2004 | Strachan et al. |
| 2008/0059602 | A1 | 3/2008 | Matsuda et al. |
| 2012/0131252 | A1 | 5/2012 | Rau |
| 2013/0329549 | A1 | 12/2013 | Kusama et al. |
| 2014/0269379 | A1 | 9/2014 | Holbrook et al. |
| 2015/0319009 | A1 | 11/2015 | Zhao |
| 2016/0124852 | A1 | 5/2016 | Shachar et al. |
| 2017/0351555 | A1 | 12/2017 | Coffin |
| 2018/0322387 | A1 | 11/2018 | Sridharan et al. |
| 2019/0109789 | A1 | 4/2019 | Friedman et al. |
| 2019/0123894 | A1 | 4/2019 | Yuan |
| 2019/0132150 | A1 | 5/2019 | Ramachandran et al. |
| 2019/0158371 | A1 | 5/2019 | Dillon et al. |
| 2019/0182143 | A1 | 6/2019 | Kim et al. |
| 2019/0182149 | A1 | 6/2019 | Kim et al. |
| 2020/0177629 | A1 | 6/2020 | Hooda et al. |
| 2020/0302568 | A1 | 9/2020 | Li et al. |
| 2021/0191774 | A1 | 6/2021 | Kanteti et al. |
| 2021/0219175 | A1 | 7/2021 | Xu et al. |
| 2021/0318878 | A1 | 10/2021 | Zhao et al. |
| 2021/0328902 | A1 | 10/2021 | Huselton et al. |
| 2021/0334234 | A1 | 10/2021 | Yudanov |
| 2022/0085916 | A1 | 3/2022 | Debbage et al. |
| 2022/0086096 | A1 | 3/2022 | Sugiyama et al. |
| 2022/0188688 | A1 | 6/2022 | Launay et al. |
| 2022/0351326 | A1 | 11/2022 | Rimmer et al. |
| 2022/0361262 | A1 | 11/2022 | Liu et al. |
| 2023/0034757 | A1 | 2/2023 | Wu et al. |
| 2023/0064808 | A1 | 3/2023 | Thubert et al. |
| 2023/0214345 | A1 | 7/2023 | Taylor |
| 2023/0297292 | A1 | 9/2023 | Potyraj et al. |
| 2023/0325265 | A1 | 10/2023 | Balle et al. |
| 2023/0327988 | A1 | 10/2023 | Rennie et al. |
| 2024/0061796 | A1 | 2/2024 | Dastidar et al. |
| 2024/0069978 | A1 | 2/2024 | Singh et al. |
| 2024/0086258 | A1 | 3/2024 | Lal et al. |
| 2024/0098033 | A1 | 3/2024 | Hong et al. |
| 2024/0129234 | A1 | 4/2024 | Farrokhbakht et al. |
| 2024/0152409 | A1 * | 5/2024 | Brar ....................... G06F 9/5027 |
| 2024/0220336 | A1 * | 7/2024 | Punniyamurthy .... G06F 9/5044 |
| 2024/0256475 | A1 | 8/2024 | Chen et al. |
| 2024/0406093 | A1 | 12/2024 | Chuang et al. |
| 2025/0126071 | A1 | 4/2025 | Brar et al. |
| 2025/0274380 | A1 * | 8/2025 | Barkai .................... H04L 45/70 |
| 2025/0291760 | A1 | 9/2025 | Ensey et al. |
| 2025/0292355 | A1 | 9/2025 | Heinecke et al. |
| 2025/0321795 | A1 | 10/2025 | Narayanaswamy et al. |
| 2026/0046317 | A1 | 2/2026 | Crabtree et al. |
| 2026/0052100 | A1 | 2/2026 | Holl et al. |
| 2026/0058900 | A1 | 2/2026 | Kommula et al. |
| 2026/0086859 | A1 * | 3/2026 | Daly ....................... H04L 45/24 |

OTHER PUBLICATIONS

Author Unknown, "Source Routing," Wikipedia, Sep. 5, 2024, 3 pages, Wikipedia.com.

Bosshart, Pat, et al., "P4: Programming Protocol-Independent Packet Processors," ACM SIGCOMM Computer Communication Review, vol. 44, No. 3, Jul. 2014, pp. 88-95.

Cai, Zheng, et al., "The Preliminary Design and Implementation of the Maestro Network Control Platform," Oct. 1, 2008, 17 pages, NSF.

Casado, Martin, et al. "Ethane: Taking Control of the Enterprise," SIGCOMM'07, Aug. 27-31, 2007, 12 pages, ACM, Kyoto, Japan.

Casado, Martin, et al., "Rethinking Packet Forwarding Hardware," Seventh ACM SIGCOMM' HotNets Workshop, Nov. 2008, 6 pages, ACM.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Casado, Martin, et al., "Scaling Out: Network Virtualization Revisited," Month Unknown 2010, 8 pages.

Casado, Martin, et al., "Virtualizing the Network Forwarding Plane," Dec. 2010, 6 pages.

Das, Saurav, et al., "Unifying Packet and Circuit Switched Networks with OpenFlow," Dec. 7, 2009, 10 pages, available at https://yuba.stanford.edu/~nickm/papers/UArch_Cam_Rdy.pdf.

Filsfils, Clarence, et al., "SRv6", Dec. 5, 2017, Cisco, available at https://www.segment-routing.net/tutorials/2017-12-05-srv6-introduction.

Greenberg, Albert, et al., "VL2: A Scalable and Flexible Data Center Network," SIGCOMM '09, Aug. 17-21, 2009, 12 pages, ACM, Barcelona, Spain.

Gude, Natasha, et al., "NOX: Towards an Operating System for Networks," ACM SIGCOMM Computer Communication Review, Jul. 2008, 6 pages, Vo. 38, No. 3, ACM.

Guo, Chanxiong, et al., "BCube: A High Performance, Server-centric Network Architecture for Modular Data Centers," SIGCOMM'09, Aug. 17-21, 2009, 12 pages, ACM, Barcelona, Spain.

Kim, Changhoon, et al., "Floodless in SEATTLE: A Scalable Ethernet Architecture for Large Enterprises," SIGCOMM'08, Aug. 17-22, 2008, 12 pages, ACM, Seattle, Washington, USA.

Koponen, Teemu, et al., "Onix: A Distributed Control Platform for Large-scale Production Networks," In Proc. OSDI, Oct. 2010, 14 pages.

PCT International Search Report and Written Opinion of Commonly Owned International Patent Application PCT/US2025/047269, mailing date Nov. 25, 2025, 17 pages, International Searching Authority (US).

Sherwood, Rob, et al., "FlowVisor: A Network Virtualization Layer," Oct. 14, 2009, 15 pages, Openflow-TR-2009-1.

Tavakoli, Arsalan, et al., "Applying NOX to the Datacenter," Proc. HotNets, Month Unknown 2009, 6 pages.

Yang, L., et al., "Forwarding and Control Element Separation (ForCES) Framework," Apr. 2004, 41 pages, The Internet Society.

Yu, Minlan, et al., "Scalable Flow-Based Networking with DIFANE," In Proc. SIGCOMM, Aug. 2010, 16 pages.

Lebeane, Michael, et al., "GPU Triggered Networking for Intra-Kernel Communications," The International Conference for High Performance Computing, Networking, Storage, and Analysis (SC '17), Nov. 12-17, 2017, Denver, Colorado, 12 pages.

* cited by examiner

EPU
Memory
1204
1240
1202
Compute Cores
$EPI_1$
$EPI_2$
$EPI_M$
1200
1205
1207
CPP
1200
1202
Adjacent Slice
1230
1242
1201
RSF Driver
1260
Tx Comm Queues
TX Scheduler
1216
1208
1212
1203
Tx Data Processing
Tx Packet Jitter Buffer
Ethernet Transmitter
1222
$P_1$
$P_2$
$P_N$
PCIe Controller
UCIe Adapter
EPU
1205
Ethernet Interace
Rx Data Processing
Rx Packet Jitter Buffer
Tx'd Packet Monitor
Ethernet Receiver
1206
1210
1214
1244
1218
1220
Rx Comm Queues
1250
1232
Adjacent Slice 2700
2705
2710
2715
2720
2725
Frame Header
TXRX Header
Data Segment or Control
TXRX CRC
ETH CRC
2707
2703
2709
DMAC
SMAC
ETYPE
2825
2830
A
B
C
D
S1
S2
S3
S4
Switch 2815
Switch 2820
R3
R1
R2
R4

3520
E
E
Switch 1
3515
C
C
3505
Switch 2
C
3510
3502
E
E
E
E
E
EPI
TXRX
Collect
ALU
EPI
3600
TXRX
TXRX
Collect
ALU
EPI
Collect
ALU
EPI
3600
3605
3610
3600
TXRX
TXRX
TXRX
TXRX
TXRX
EPI
EPI
EPI
EPI
EPI
3620
3620

SYSTEM COMPRISING ENDPOINT PROCESSING UNITS AND A NETWORK FOR CONNECTING ENDPOINT PROCESSING UNITS

CROSS REFERENCE TO RELATED APPLICATIONS

The present application is related to the following applications having related subject matter: U.S. patent application Ser. Nos. 19/227,455; 19/227,456; 19/227,458; 19/227,460; 19/227,461; 19/227,462; 19/227,463; 19/227,464; 19/227,465; 19/227,466; 19/227,468; 19/227,469; 19/227,470; 19/227,471; 19/227,474; 19/227,476; 19/227,477; 19/227,479; 19/227,480; 19/227,483; 19/227,486; 19/227,487; 19/227,489; 19/227,490; 19/227,491; 19/227,492; 19/227,493; 19/227,494; and 19/227,496, all of which are filed Jun. 4, 2025.

BACKGROUND

In recent years, there has been a proliferation of private and public clouds. With this proliferation, there has also been a proliferation of distributed computation applications that use many compute resources in one or more clouds to perform distributed operations. Examples of such applications include AI (artificial intelligence) applications that are used to train machine-trained networks (MTNs) or other machine learning (ML) models or that are used to perform inference operations of the MTNs or other ML models.

With the increased use of distributed computation applications, many private and public clouds utilize larger clusters of processing units, e.g., central processing units (CPUs) or graphics processing units (GPUs), to perform the distributed computation operations. For instance, for AI applications, larger and larger GPU clusters are being used to perform resource intensive computations needed by the AI applications. GPU clusters will soon include millions of GPUs. As the number of endpoint processing units (such as GPUs) increases, failures of such processing units and failures of the network fabric between such processing units increases as well.

Existing tools that are used today to manage communication through the network fabric between endpoint processing units (such as GPUs) cannot properly handle the number of failures in the processing units and in the network fabric. For AI applications, many existing networks use big networking trees (called fat trees below) that are formed with distributed switch and link level protocols with side effects, and point-to-point transports like RDMA or TCP for fault tolerance. Fat tree networks are optimized for the average case, which leads to long tail latencies resulting from to-be-expected failures and statistically likely non-average pathological traffic congestion.

Some have attempted to solve AI networking problems by using the same solutions that are used for high performance computing (HPC) and large scale clouds, and then integrating these solutions with scale up technology based on proprietary GPU connectivity. Such approaches often create two disparate types of networks (e.g., a scale up network and a scale out network) that need to be coordinated to optimize for AI workloads. These approaches are not useful as large sets of cobbled together solutions are often incongruent and very difficult to manage.

Moreover, AI clusters are different than large scale clouds as AI clusters are controlled systems that require coordination across each of the GPUs in an almost synchronous fashion. In AI clusters, failures are expected at a fairly well-known frequency. Hence, the whole cluster needs to be thought of as a single system that requires a significant level of fault tolerance.

BRIEF SUMMARY

Some embodiments provide a novel method for managing the network fabric between numerous endpoint processing units (EPUs) that perform distributed computation operations. The EPUs in some embodiments include graphics processing units (GPUs), but in other embodiments the EPUs conjunctively or alternatively include other types of processing units, such as central processing units (CPUs), tensor processing units (TPUs), etc. The EPUs are organized in some embodiments in different domains, e.g., in different clusters. The method of some embodiments provides a uniform way of managing the network fabric for intra- and inter-domain communication between the EPUs (e.g., provides a uniform management for the passing of computations between EPUs that are within the same domain and that are in different network domains).

The method of some embodiments uses a set of one or more management servers to configure a set of forwarding elements (e.g., a set of one or more switches and/or set of one or more routers) in the network fabric to establish the desired forwarding behavior between the EPUs (e.g., the EPUs within the same domains and across different domains). Specifically, the network fabric in some embodiments includes EPU interfaces (called endpoint interfaces, or EPIs, below), forwarding elements communicatively coupled with these EPIs, and wired or wireless links between the EPIs and forwarding elements and between the forwarding elements. In some embodiments, the network fabric also includes software or firmware (e.g., drivers) operating on EPUs to determine when an EPU has completed an operation that has produced a result that needs to be forwarded (transmitted) through the network fabric. This software/firmware along with the EPIs and forwarding elements in some embodiments are configurable network elements that are configured by the set of servers to establish the desired forwarding behavior between the EPUs.

In some embodiments, EPIs communicatively connect to their respective EPUs through a local bus (e.g., PCIe bus). Conjunctively, or alternatively, EPIs in some embodiments are integrated on the same integrated circuit (IC) dies, or implemented within the same IC chips, as their respective EPUs. The EPIs have different implementations in different embodiments. For instance, in some embodiments, an EPI includes a network interface controller (NIC), an embedded switch, and an in-band control data message processor for receiving in-band control data messages that are for configuring the NIC and embedded switch and for sending these data messages or control messages contained in these data messages respectively to the NIC and embedded switch to which they are addressed, as further described below. In other embodiments, the EPI does not include an embedded switch but includes a data plane circuit for processing egress and ingress data messages sent by the EPI's EPU and received for this EPU, and a control plane circuit for configuring the data plane circuit. In still other embodiments, the EPI is a standard NIC.

In some embodiments, the EPI is control-plane configured remotely by a server or control plane (CP) agents in the network fabric. For instance, in some embodiments, the EPI has a launch time parameter and a rate parameter that can be control plane specified on a per flow basis to control when the EPI forwards the result of an EPU operation along the network fabric. In some embodiments, these two parameters can be set on a per EPU operation basis as further described below.

In some embodiments, the managed forwarding elements (i.e., the forwarding elements configured by the management server cluster) include intra-domain switches (e.g., rack switches connecting EPUs operating on the same rack) and inter-domain switches (e.g., rack switches connecting EPUs operating on different racks) through their respective EPIs. In some embodiments, the managed forwarding elements also include routers and/or gateways, while in other embodiments, the managed forwarding elements do not include routers and/or gateways. In some embodiments, the EPIs are also managed forwarding elements that are directly configured by the management server cluster. In other embodiments, the EPIs are not directly configured by the management server cluster. For instance, as mentioned below, the EPIs in some embodiments are configured by the managed forwarding elements (MFEs) to provide the desired forwarding behavior (e.g., to perform the desired scheduled forwarding of computation results) and/or are configured by the management server cluster through the MFEs (e.g., the first-hop MFEs connected through a physical link (wired or wireless) to the EPIs).

The configurable component of the managed forwarding elements in some embodiments include the control plane components (e.g., control plane processors) of the forwarding elements. The forwarding elements in some embodiments include (1) data plane components that process data messages (e.g., packets) forwarded by the forwarding elements and (2) control plane components that configure the data plane components and/or perform other operations. In some embodiments, the control plane components of the managed forwarding elements include control plane processors that are configured by the management server cluster.

The management server cluster in some embodiments configures the control plane components of the forwarding elements based on API commands that the management server cluster processes from application servers (e.g., virtual machines (VMs), Pods, containers, or standalone servers) that execute a distributed application for which the EPUs perform distributed computations. In some embodiments, the management server cluster configures the control plane components of the forwarding elements before processing any API commands from the application servers. Conjunctively, or alternatively, the management server cluster configures these control plane components for API commands associated with individual distributed computation operations and/or distinct sets of two or more distributed computation operations.

For an operation performed by an EPU, the MFEs can perform time-based scheduling that configures the network fabric to forward the result of this operation through the fabric in a particular way. This scheduling for the EPU operation can be either proactively provided (e.g., before the EPU has been assigned the operation or has performed the operation) or reactively provided (e.g., after the EPU has been assigned the operation or has performed the operation). This scheduling in some embodiments entails directing the EPIs of the EPUs to send the results computed by their EPUs at a particular time period at a particular rate. This scheduling of an EPI of an EPU is performed by the CP of the first-hop MFE of the EPU. The first-hop MFE's CP in some embodiments performs this scheduling based on configuration data and/or scheduling parameters provided by the management server cluster.

For instance, for a particular operation that the EPU performs, an EPU's EPI in some embodiments has a launch time parameter. In some embodiments, the launch time parameter can be proactively scheduled by the first-hop MFE CP of the EPU (e.g., proactively specified by this CP before the EPU is assigned this operation or performs this operation), or reactively scheduled by this CP (e.g., reactively provided by the CP after the EPU is assigned this operation or performed this operation). The setting of this launch time in turn directs the EPI to send the result of this particular operation of the EPU through the network fabric at the specified launch time.

In some embodiments, the first-hop MFE's CP also notifies the EPU's EPI to use a particular egress port to send out the result of the operation. This MFE CP in some embodiments notifies the EPU's EPI of this egress port after the EPU has completed its operation. In other embodiments, the MFE CP provides this information before or while the EPU performs its operation. The EPU's EPI in some embodiments performs a separate communication process with the EPU to specify a queue identifier (ID) associated with the operation. This queue ID, in turn, is associated with the egress port that will be used to transmit the data message flow that will contain the result of the EPU's operation.

With the particular egress port and launch time, the MFE CP of some embodiments also provides the rate at which the EPI should send the data through the network fabric. This rate in some embodiments corresponds to the rate at which the EPI will read data stored by the EPU in the memory and store this data in an egress queue from where the data will then be read and output along the specified egress port. In some embodiments, the EPI derives the egress port by performing a mapping operation, e.g., that derives the egress port from the queue identifier (e.g., a single identifier or a pair of identifiers) that identifies the transmit- and receive-communication queues used by the EPU and EPI to communicate regarding the operation. Hence, in these embodiments, the egress port is not provided in real-time by the MFE CP but rather is provided by the mapping records that the CP previously provided to configure the EPI.

The egress port in some embodiments corresponds to a particular path through the network fabric to the desired destination for the results computed by the EPI's EPU. In this manner, by providing the launch time, egress port, and transmission rate, the MFE CP of some embodiments configures (i.e., programs or directs) the EPI to use a particular path, rate, and time for sending its associated EPU's results through the network fabric to the desired destination. This scheduling operation of the MFE CP is performed by the control plane processor of the MFE.

In some embodiments, the CP scheduling operation is based on configuration data sets that this CP processor receives from the management server cluster (1) before the application server invokes the command that eventually directs the EPU to perform its operation and/or (2) after the application server invokes this command. Also, in some embodiments, the MFE CP performs some of its scheduling operations soon after receiving scheduling parameters from the management server cluster, while performing other scheduling operations much later after receiving configuration data from the management server cluster. In the former case, the MFE CP in some embodiments simply passes along proactively-provided scheduling parameters (with possible modifications) that it receives from the management server cluster to the EPI, while in the latter case, the MFE CP in some embodiments generates the scheduling parameters from the received configuration data (e.g., after receiving the EPI's request for reactively-generated scheduling parameters).

In some embodiments, the application server's command is transmitted to the EPU through the same network fabric (e.g., through the same network with the same links and the same MFEs) as the network fabric that the management server cluster uses to manage the CP processors of the managed MFEs, while in other embodiments the application server's command is transmitted to the EPUs through another network fabric (e.g., through another network with another set of links and/or another set of MFEs).

In some embodiments, the MFE CP processors in the network fabric use in-band communication with the EPIs to configure the EPIs to use the network fabric at scheduled times and rates, and to use specific paths through the network fabric, for specific operations performed by their respective EPUs. Other embodiments, however, configure the EPIs through other mechanisms, e.g., through a separate control channel communications between the MFE CPs and the EPI, or use other CP agents to configure the EPI, etc.

Because of the scheduled time, rate, and port information, the EPIs in some embodiments do not forward EPU-generated data messages by performing traditional L2/L3 forwarding protocols and L2/L3 match-action operations based on EPU-formulated data message headers. For instance, in some embodiments, the source-side EPIs generate forwarding tags that they and the MFEs use to perform their forwarding operations. In other embodiments, however, the EPIs still perform data message processing based on match-action rules specified in terms of data message header information (e.g., in terms of MAC addresses, MAC and IP addresses, five-tuple identifiers including source and destination IP address, source and destination port numbers, and protocol, etc.).

For the same EPU operations, the management server cluster configures the network fabric CP agents (e.g., the MFE CP processors) to program the EPIs deterministically with the same time, rate, and path scheduling parameters under the same network conditions, so that the EPIs will consistently select the same paths and consistently transmit their data at the same times and rates, which in turn ensures that the communication between the EPUs is reliable and deterministic. In some embodiments, the management server cluster also monitors the state of the network fabric to identify changes to the network state, and in turn to modify the time, rate, and path parameters when necessary, e.g., to circumvent paths or forwarding nodes in the network that are failing or in use for other operations. This approach to managing the network fabric is referred to below as Reliable Scheduling of the network fabric. Also, in the discussion below, Reliable Schedule Fabric (RSF) refers to a network fabric that is scheduled by using Reliable Scheduling, and the management servers are referred to as Reliable Scheduled Operation (RSO) servers.

To monitor the state of the network fabric, the management servers in some embodiments use a set of one or more telemetry servers that collect telemetry data from the MFE CP processors and EPIs. In some embodiments, the telemetry servers collect all the telemetry data from the MFE CP processors. In these embodiments, the CP processors not only provide their respective telemetry data but also provide telemetry data that the CP processors collect from the EPIs. To collect the telemetry data from the EPIs, the CP processors in some embodiments register with a telemetry collection service of the EPIs.

In some embodiments, the telemetry data includes a time stamp for each data message the EPI or MFE sent to transmit each chunk of data that contains a portion of the result of an EPU operation. Other embodiments, however, just collect the completion flag associated with the EPI or MFE completing the transmission of all the data messages that contain the EPU operation result. Along with this flag, the telemetry data includes a time for when the transmission operation was completed. By passing all such completion flags and times to the telemetry server set for each particular EPU operation that had a scheduled transmission through the network fabric, and then analyzing this data at the telemetry or management server set, flows can be visualized and the time for each flow's transmission through each network-fabric node (e.g., each EPI or MFE) can be identified. Reviewing this data can identify any portion of the network that is performing poorly. Also, repeated review of such data can identify any network node that has degraded performance for any type of flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for managing the network fabric between numerous endpoint processing units (EPUs) that perform distributed computation operations. This method in some embodiments ensures reliable, deterministic communication between the EPUs through the network fabric. The EPUs in some embodiments include graphics processing units (GPUs), but in other embodiments the EPUs conjunctively or alternatively include other types of processing units, such as central processing units (CPUs), artificial intelligence (AI) accelerators (e.g., tensor processing units (TPUs), neural processing units (NPUs), quantum processing units (QPUs), etc.). In this document, EPUs are also referred to as endpoints. Many of the embodiments that are described in this document for EPUs are equally applicable to other types of non-EPU endpoints, such as memories and/or other storage units.

The EPUs are organized in some embodiments in different domains, e.g., in different clusters and/or different network domains. The method of some embodiments provides a uniform way of managing the network fabric for intra- and inter-domain communication between the EPUs (e.g., provides a uniform management for the passing of computations between EPUs that are within the same domain and that are in different domains).

The method of some embodiments is implemented with a cluster of management servers that configure a set of forwarding elements in the network fabric to establish the desired forwarding behavior between the EPUs (e.g., the EPUs within the same domains and across different domains). For instance, the network fabric in some embodiments includes EPU interfaces (called endpoint interfaces, or EPIs, below), forwarding elements communicatively coupled with these EPIs, and wired or wireless links between the EPIs and forwarding elements and between the forwarding elements. In some embodiments, the network fabric also includes software or firmware (e.g., drivers) operating on EPUs to determine when an EPU has completed an operation that has produced a result that needs to be forwarded (transmitted) through the network fabric. This software/firmware along with the EPIs and forwarding elements in some embodiments are configurable network elements that are configured by the set of servers to establish the desired forwarding behavior between the EPUs.

Figure 1:
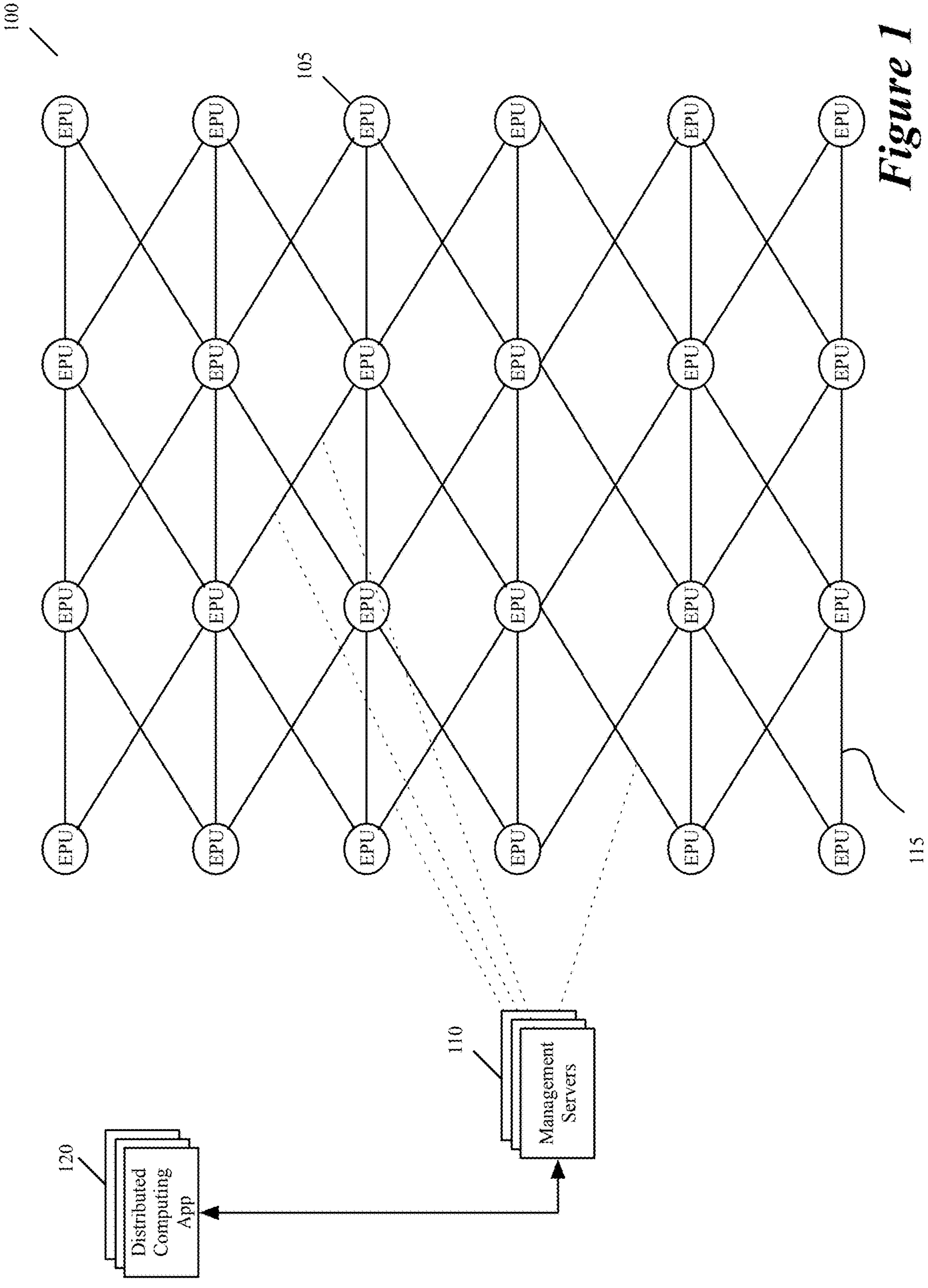
FIG. 1 illustrates an example of how some embodiments use a set of one or more servers to manage the forwarding of results between numerous EPUs that are communicatively coupled through a network fabric.

FIG. 1 illustrates an example of how some embodiments manage the network fabric through a cluster of one or more servers. Specifically, this figure illustrates numerous EPUs 105 that are communicatively coupled through a network fabric 100 that is managed by a set of management servers 110. This figure also illustrates a distributed application that runs on a cluster of one or more servers 120, which direct the EPUs to perform distributed computation operations needed for the running of the distributed application. In some embodiments, the distributed application is a single distributed application that is conjunctively executed by the EPUs 105. That is, the operations for (and directed by) a single distributed application are concurrently or sequentially executed by numerous EPUs 105.

Examples of distributed applications include AI training applications or AI inference applications. AI training applications, in some embodiments, are applications that train a machine learning (ML) model to perform a particular task, and can involve supervised or unsupervised learning. For instance, neural networks such as convolutional neural networks (CNNs), transformer-based neural networks such as large language models (LLMs), or other types of neural networks (recurrent networks, etc.) are typically trained using supervised learning, in which input data with known ground-truth outputs is propagated through the network to generate outputs that are compared to the known outputs and used to adjust parameters (e.g., weights) of the network. Such AI training applications are often very computationally expensive, as not only are numerous input data propagated through the network at each training iteration (which itself can involve millions, if not billions, of calculations), but the comparison of outputs and subsequent parameter adjustment (e.g., using backpropagation and gradient calculation) can also involve many calculations. In some embodiments, the AI training application directs the EPUs 105 to perform these computations and transfer data to each other for subsequent computations.

AI inference applications use a trained ML model to perform the particular task for which it is trained. For instance, face detection or other image analysis applications may use a convolutional neural network, while LLMs use a transformer-based neural network. Such inference applications may also be computationally expensive and direct the operation of numerous EPUs 105, as each received input entails the propagation of that input through the neural network (or other ML) model to generate output data (e.g., for an end user).

It should also be understood that, while described as a distributed application that runs on a cluster of one or more servers, any sort of application may direct EPUs to perform computation operations and transmit those computations through the network fabric of some embodiments. Thus, the distributed application 120 could represent an application that runs on a single server using a single memory space (e.g., as one or more virtual machines, pods, containers, etc. sharing that single memory space) or an application that runs across multiple physical servers (e.g., as a set of microservices that operate on different physical servers, use different memory spaces, and communicate with each other through a network). In either case, the distributed application 120 distributes some or all of its computations to the set of EPUs 105 that are connected by the network fabric 100. Furthermore, in some embodiments a set of multiple related applications that interact with each other could all distribute computations to the set of EPUs 105, with the computations performed by one set of the EPUs 105 for a first one of these applications transmitted to another set of the EPUs 105 for use in computations performed for a second one of these related applications.

The EPUs 105 in some embodiments only include EPUs of the same type (e.g., are all GPUs, or are all CPUs, or are all TPUs). In other embodiments, the EPUs include two or more types of processing units, such as CPUs and GPUs, GPUs and TPUs, GPUs and NPUs, etc. Also, as the EPUs are hardware processing units, the EPUs in some embodiments include traditional components of GPUs, CPUs, TPUs and/or other types of processing units. Examples of such traditional components which may be present in some or all of the different types of EPUs include arithmetic logic units (ALUs), instruction fetch and decode units, register files, caches, etc. As the processor architectures of GPUs, CPUs, and TPUs are often optimized for different types of operations, these types of processors traditionally have different types of architectures with some different types of components. For instance, the EPUs of some embodiments may include specialized vector or matrix ALUs (e.g., matrix multiplication units in TPUs) that enable the EPUs to more quickly perform vector, matrix, and/or higher-dimensional tensor operations (e.g., computations involving vectors, matrices, and/or higher-dimensional tensors that are commonly found within neural networks). These vector ALUs of some embodiments can perform vector operations within a single processor clock cycle while the matrix ALUs of some embodiments can perform matrix operations within a single processor clock cycle.

GPUs, for instance, are specialized circuits that excel at digital image processing and computer graphics acceleration as well as highly-parallelized non-graphics computations such as those found in typical neural networks. Historically, GPUs were used predominantly for image processing and graphics applications. However, today GPUs are used for many other applications, including AI training and inference applications. GPUs, such as the NVIDIA Geforce RTX 40 series, the AMD Radeon RX 7000 series, or the Intel Arc Series, often include a set of hierarchically-arranged processing units with shared memory blocks. As an example, NVIDIA GPUs are typically arranged (at least in part) as a set of streaming multiprocessors (SMs). Each SM may have an instruction cache, a data cache, an instruction dispatcher for handling multiple threads, a set of processor cores (as well as additional processing units), and a shared memory. These SMs (or equivalent sets of processor cores) can be hierarchically arranged into groups that also have their own shared memory blocks, caches, and/or other processing units.

As shown, the network fabric 100 includes numerous network interconnects 115 between different pairs of EPUs. To keep the network-fabric illustration in FIG. 1 simple, the EPUs are only shown to be connected to sets of their neighboring EPUs. Accordingly, this illustration is purely a conceptual presentation of the network fabric and is not meant to convey any specific network topology between the EPUs. In some embodiments, the network fabric connects any EPU to any other EPUs through one or more hops that traverse through one or more forwarding elements managed by the management server cluster 110.

In some embodiments, the network interconnects 115 of the network fabric 100 include EPU interfaces (called endpoint interfaces, or EPIs, below), forwarding elements communicatively coupled with these EPIs, and the physical links (e.g., wired or wireless links) between the EPIs and forwarding elements and between the forwarding elements. In some embodiments, EPIs communicatively connect to their respective EPUs through a local bus (e.g., PCIe bus). Conjunctively, or alternatively, EPIs in some embodiments are implemented on the same integrated circuit (IC) dies, implemented within the same IC chips (e.g., within the same chip packaging), or placed on the same motherboards, as their respective EPUs.

The EPIs have different implementations in different embodiments. In some embodiments, an EPI includes a network interface controller (NIC), an embedded switch, and an in-band control data message processor for (1) receiving in-band control data messages that are for configuring the NIC and embedded switch and (2) sending these data messages or control messages contained in these data messages respectively to the NIC and embedded switch to which they are addressed, as further described below. In other embodiments, the EPI does not include an embedded switch but includes (1) a data plane circuit for processing egress and ingress data messages sent by the EPI's EPU and received for the EPU and (2) a control plane circuit for configuring the data plane circuit. In still other embodiments, the EPI is a standard NIC.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

In some embodiments, each EPU operates in a host computer with one or more connected EPIs. This may be a bare metal host computer that can include one or more EPUs, each connected to one or more EPIs. In some embodiments, the EPUs are not contained within a larger host computer but instead operate as their own bare metal devices in one or more datacenters (e.g., organized into racks in the datacenters). When operating as their own standalone devices (e.g., bare metal devices), each EPU in some embodiments may be operate in the datacenter as a single physical compute block unit with its own associated one or more EPIs, or may operate with one or more other EPUs to collectively form one physical compute block unit (e.g., may be part of a group of EPUs operating as a single physical circuit board) in the datacenter. In the latter case, each EPU in some embodiments has its own set of EPIs in some cases, while sharing the use of a set of EPIs with the other EPUs in its physical group in other cases. In some embodiments, if multiple tenants (customers) use the same EPU (e.g., on a time-shared basis), the EPU can have different associated EPIs for each tenant.

In different embodiments, the EPUs 105, network fabric 100, management server cluster 110, and distributed computing application servers 120 may operate in a single datacenter or across multiple datacenters. The one or more datacenters may be one or more public cloud datacenters (e.g., multi-tenant public clouds), one or more private cloud datacenters (e.g., on-premises enterprise datacenters, branch offices, etc.), or a combination thereof (e.g., a hybrid of public and private clouds). In some embodiments, the EPUs 105 and network fabric 100 connecting the EPUs operate in one datacenter while the management server cluster 110 and/or distributed computing application servers 120 operate in one or more other datacenters. It should be understood that other configurations of the location of the EPUs 105, management server cluster 110, and distributed computing application servers 120 are possible as well.

In some embodiments, the EPIs are control-plane configured remotely by servers or control plane (CP) agents in the network fabric. For instance, in some embodiments, an EPI has a launch time parameter and a rate parameter that can be control plane specified on a per flow basis to control when the EPI forwards the result of an EPU operation along the network fabric. In some embodiments, these two parameters can be set on a per EPU operation basis as further described below.

In some embodiments, the managed forwarding elements (i.e., the forwarding elements configured by the management server cluster) include intra-domain switches (e.g., rack switches connecting EPUs operating on the same rack through their respective EPIs) and inter-domain switches (e.g., rack switches connecting EPUs operating on different racks through their respective EPIs, sometimes referred to herein as rail switches). In some embodiments, the managed forwarding elements also include routers and/or gateways, while in other embodiments, the managed forwarding elements do not include routers and/or gateways.

In some embodiments, the EPIs are also managed forwarding elements that are directly configured by the management server cluster. In other embodiments, the EPIs are not directly configured by the management server cluster. For instance, as mentioned below, the EPIs in some embodiments are configured by the managed forwarding elements (MFEs) to provide the desired forwarding behavior (e.g., to perform the desired scheduled forwarding of computation results) and/or are configured by the management server cluster through the MFEs (e.g., the first-hop MFEs connected through a physical link (wired or wireless) to the EPIs).

The configurable components of the managed forwarding elements in some embodiments include the control plane (CP) components (e.g., control plane processors) of the forwarding elements. The forwarding elements in some embodiments include (1) data plane components that process data messages (e.g., packets) forwarded by the forwarding elements and (2) control plane components that configure the data plane components and/or perform other operations. In some embodiments, the control plane components of the managed forwarding elements include control plane processors that are configured by the management server cluster.

The management server cluster 110 in some embodiments configures the control plane components of the forwarding elements based on API commands that the management server cluster processes from application servers 120 (e.g., virtual machines (VMs), Pods, containers, or standalone servers) that execute the distributed application for which the EPU performs distributed computations. In some embodiments, the management server cluster 110 configures the control plane components of the forwarding elements before processing any API commands from the application servers 120. Conjunctively, or alternatively, the management server cluster configures these control plane components for sets of one or more API commands after receiving these commands from the application servers 120, each of these API commands being associated with individual distributed computation operations assigned to the EPUs, and/or distinct set of two or more distributed computation operations.

As mentioned above, the cluster of application servers 120 executes a distributed application and uses the EPUs to perform distributed computation operations that are needed for the execution of the distributed application. In some embodiments, the application server cluster transmits its commands to the EPUs through the network fabric 100 that is managed by the management server cluster. In other embodiments, the application server cluster transmits its commands to the EPU through another network fabric (e.g., through another network with another set of links and/or another set of forwarding elements).

Figure 2:
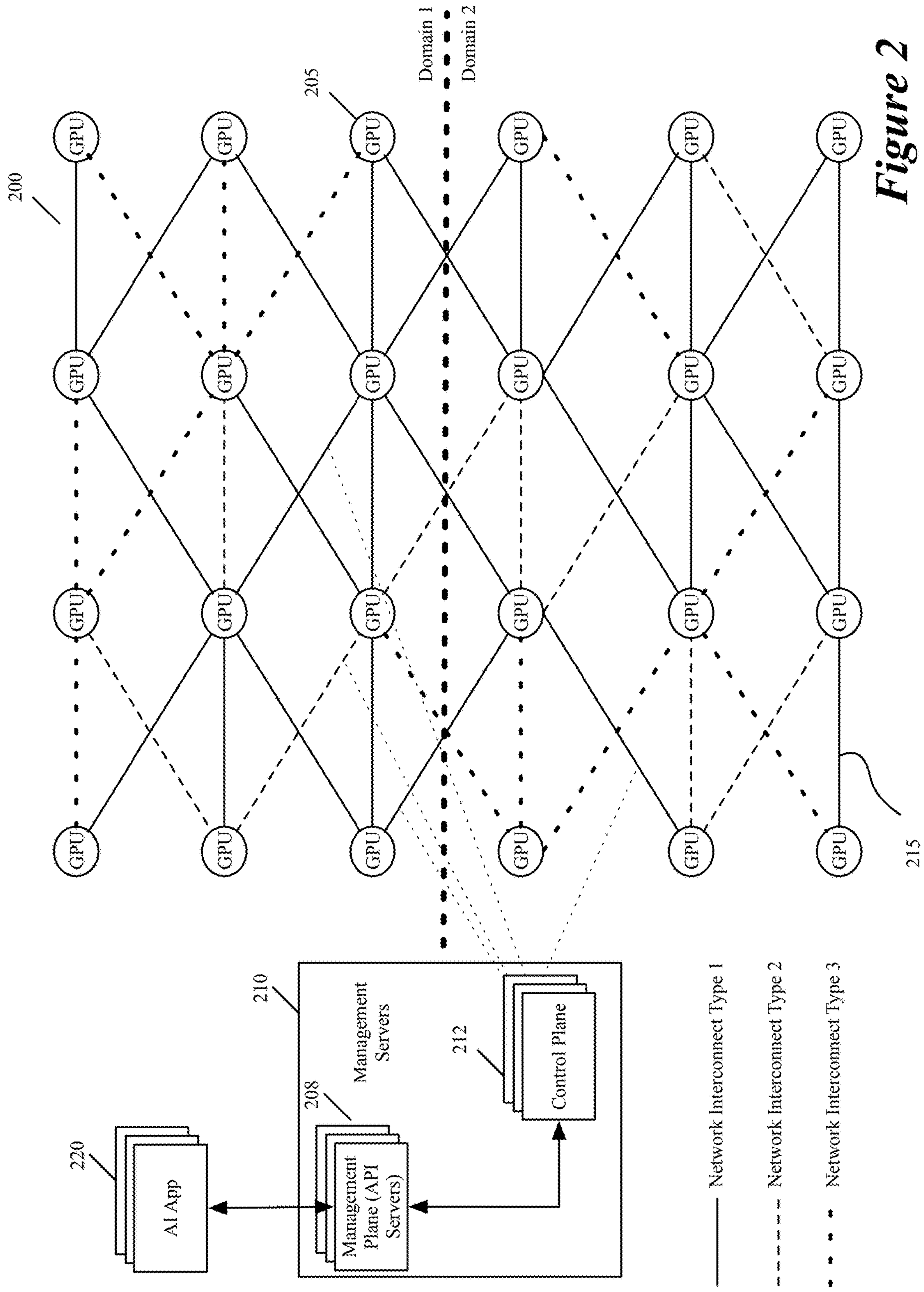
FIG. 2 conceptually illustrates an example of an AI application cluster that executes an AI application by using two or more clusters of GPUs that are arranged in two or more domains.

An AI application is one example of an application that is executed by a server cluster that uses numerous EPUs. FIG. 2 conceptually illustrates an example of an AI application cluster 220 that executes an AI application by using two or more clusters of GPUs 205 that are arranged in two or more domains. Two domains are specifically illustrated in this figure. In some embodiments, the illustrated two domains are two different groups of GPUs (e.g., different racks of GPUs) that are first-hop connected to different sets of forwarding elements.

FIG. 2 also illustrates that the management server cluster in some embodiments can be grouped into two different sets of servers, which are management plane (MP) servers 208 and control plane (CP) servers 212. In some embodiments, the MP servers 208 are API servers (interface servers) that receive the APIs from the AI Application 220 and then direct the CP servers 212 to configure the CP components of the network fabric 200 for the received API commands. In some embodiments, the different clusters of servers 220, 208 and 212 use common interfaces (e.g., webserver interfaces) to communicate to each other through local or remote network fabric, such as a local area network, a wide area network, or the Internet.

In some embodiments, the CP servers 212 configure the control plane components of the network fabric 200 (e.g., MFE CP processors) before processing any API commands from the application servers 220 that are tied to any specific operation that the application servers 220 have directed the GPUs to perform. Conjunctively, or alternatively, the CP servers 212 configure the network fabric control plane components for sets of one or more API commands (from the application servers 120) that are associated with individual distributed computation operations and/or distinct sets of two or more distributed computation operations that the application servers 220 have directed the GPUs to perform.

Figure 3:
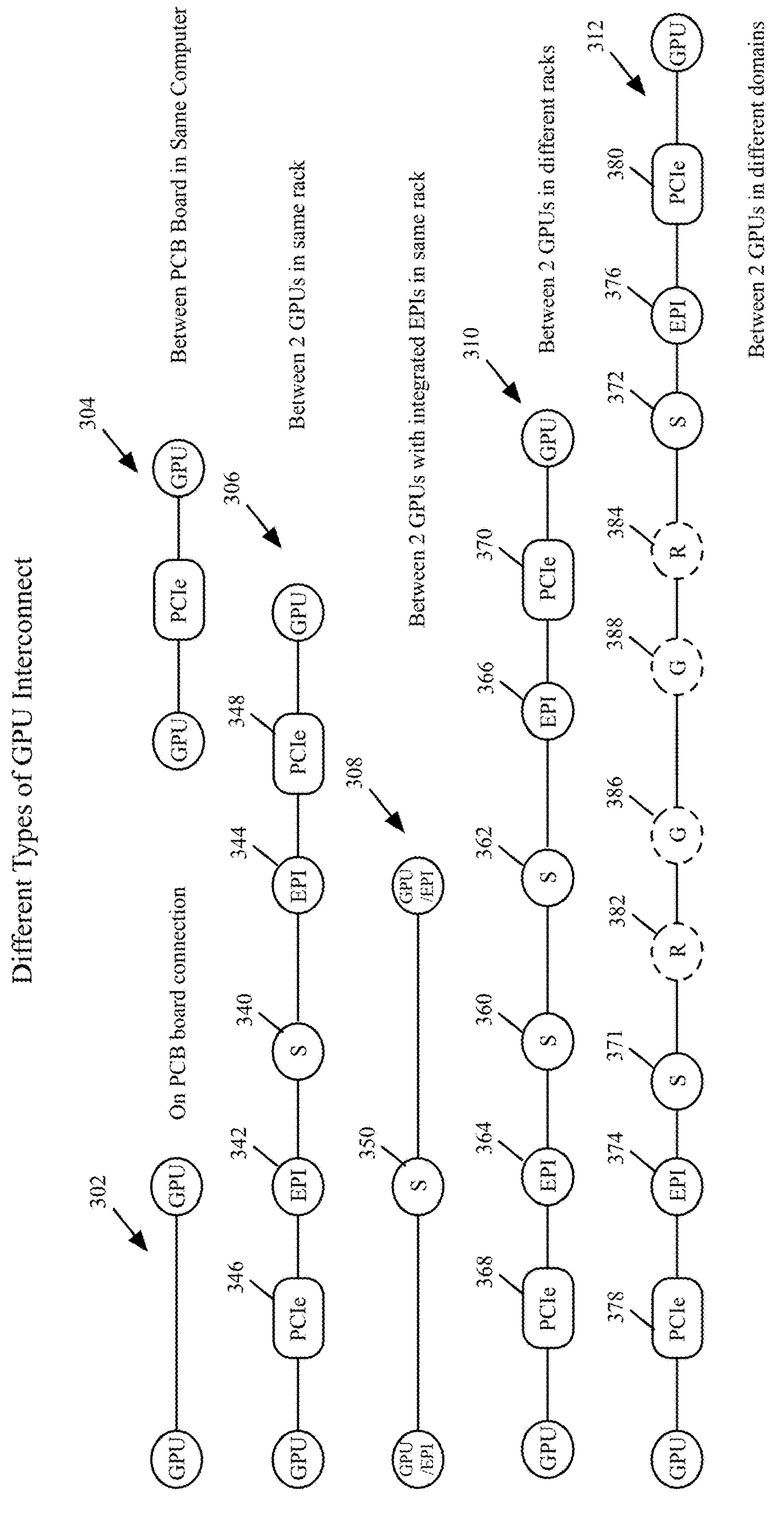
FIG. 3 illustrates examples of different types of interconnects between different GPU pairs.

FIG. 2 conceptually illustrates that the network fabric 200 in some embodiments uses different types of network interconnects between different pairs of GPUs. Three different types of network interconnects are shown in this figure by using three different types of lines. FIG. 3 illustrates examples of different types of interconnects between different GPU pairs.

Specifically, FIG. 3 shows that a pair of GPUs can connect through the following examples of network interconnects 302-310: (1) with the interconnect 302 being a local on-board connection when both GPUs are on the same board, (2) with the interconnect 304 being a local bus connection (e.g., a PCIe connection) when both GPUs are on the same device (e.g., the same computer), (3) with the interconnect 306 being a connection that includes one switch 340, two EPIs 342 and 344, and two local buses 346 and 348 (e.g., PCIe) when the GPUs are in one GPU cluster (e.g., a rack) connected to the same switch, (4) with the interconnect 308 being a single switch connection when the GPUs have integrated EPIs and are in the same GPU cluster (e.g., a rack) connected to the switch 350, (5) with the interconnect 310 being a two-switch connection that includes two switches 360 and 362, two EPIs 364 and 366, and two local buses 368 and 370 (e.g., PCIe) when the GPUs are in two different GPU clusters (e.g., two different racks) that are connected through the two switches.

In some embodiments, as described below, the connection 310 also includes an EPI (associated with a different GPU in the same cluster as one or the other endpoint GPUs) between the two switches 360 and 362. Also, in other embodiments, two GPUs in two different domains connect through three switches, as further described below. FIG. 3 also shows that in some embodiments the network interconnect 312 between two GPUs can include routers and/or gateways. In this example, the network interconnect 312 includes two switches 371 and 372, two EPIs 374 and 376, two local buses 378 and 380 (e.g., PCIe), two routers 382 and 384 and two gateways 386 and 388 when the GPUs are in two different GPU clusters that are in two different layer 3 domains (e.g., within one datacenter, or in two different datacenters, or in two different cities or regions, such as states, provinces and/or countries).

Implementing a distributed application by using different L3 domains in different geographic sites (e.g., different cities, states, countries) is highly useful when due to physical constraints it is not ideal to execute the distributed application in one datacenter or in one geographic location. Examples of such physical constraint include energy constraints, real estate constraints, cost constraints, etc. For instance, one geographic location in some cases might not have sufficient energy resources to satisfy the necessary power consumption requirements for operating a very large number of EPUs (e.g., GPUs) that conjunctively execute one or more distributed applications. Alternatively, or conjunctively, the real estate in one geographic location might be too expensive.

The network interconnects illustrated in FIG. 3 are simply a few examples of network interconnects that form the network fabric of some embodiments. One of ordinary skill will realize that the network interconnects in some embodiments include other types of interconnects with other combinations of forwarding elements and/or different types of forwarding elements.

In FIG. 2, the different GPUs 205 are on different integrated circuit (IC) dies. In some embodiments, the different GPUs 205 are different IC chips. Also, in some of these embodiments, the different GPUs 205 are on different printed circuit boards (PCBs). The different GPUs in some of these embodiments operate on different device housings (e.g., operate as different standalone devices or on different computers). Similarly, in FIG. 1 and in some of the other examples in the discussion below, the different EPUs 105 in a collection of EPUs are on different IC dies, different IC chips, different PCBs and/or different device housings.

Some embodiments, however, can have multiple EPUs (e.g., GPUs) operate in the same device housing, PCB, and/or IC chip, but many of the EPUs (e.g., GPUs) operate separately and are interconnected through network fabric. As mentioned above, a group of two or EPUs (e.g., GPUs) can operate in some embodiments in the same housing to operate as one standalone device (e.g., bare metal device), that collectively is one physical compute block unit in the datacenter. In such a case, each EPU in the group can have its own set of EPIs in some cases, while sharing the use of a set of EPIs with the other EPUs in its physical group in other cases.

In some embodiments, the form factor of a group of EPUs (e.g., GPUs) that operate as one physical unit is not as critical, as the gating factor in such embodiments (for treating one or more EPUs as a single EPU unit for the purpose of assigning operations to perform for the distributed application) is the operation of the EPUs in the group within one memory space. In other words, each EPU in these embodiments has a collection of computational units (e.g., ALUs) that operate within one memory domain. In these embodiments, the computational units of all the EPUs in the group can be on one IC die, one IC chip package (housing one or more IC dies), or one PCB (housing one or more IC chip packages), so long as all of the computation units operate within one memory space.

In different embodiments, the management server cluster (e.g., the servers 110 or 210) manages one or more types of forwarding elements. For instance, the management server cluster manages the EPIs, switches, routers, and gateways of the network interconnects illustrated in FIG. 3. In other embodiments, however, the managed forwarding elements (e.g., the forwarding elements managed by the management server cluster to provide reliable, deterministic communication between the GPUs) do not include routers and/or gateways. Also, in some embodiments, the EPIs are managed forwarding elements that are directly configured by the management server cluster, while in other embodiments, the EPIs are not directly configured by the management server cluster. For instance, as further described below, the EPIs in some embodiments are configured by the managed switches (e.g., switches 340, 350, 360, and 362) to provide the desired forwarding behavior, e.g., to perform the desired scheduled forwarding of computation results.

The CP of the managed switches in some embodiments performs the configuration of the EPIs based on configuration data and/or parameters provided by the management server cluster. In such embodiments, the management server cluster can be viewed as configuring the EPIs through the managed switches. The management server cluster in some embodiments provides configuration data to the CP of the managed switches through in-band data messages that are sent through the same RSF network fabric that connects the EPUs (e.g., through the same managed switches and physical links that connect the EPUs). In other embodiments, the management server cluster provides the configuration data to the CP managed switches through a separate network that this cluster uses to communicate with the CP managed switches.

In some embodiments, the management server cluster (e.g., the servers 110 or 210) uses a scheduling technique, referred to below as Reliable Scheduling, to configure (1) the forwarding elements and (2) the EPIs through the configured forwarding elements, in order to ensure that the network fabric provides reliable, deterministic communication between the EPUs, e.g., the EPUs 105 of FIG. 1 or the GPUs 205 of FIG. 2. In the discussion below, Reliable Schedule Fabric (RSF) refers to a network fabric that is scheduled by using Reliable Scheduling, and the management servers of the management server cluster that configures the forwarding elements to implement this scheduling are referred to as Reliable Scheduled Operation (RSO) servers. In some embodiments, the reliability of the RSF is also a result of the retransmission scheme that it uses to ensure that transmitted data results are fully received at their destinations before being discarded, as further described below.

Figure 4:
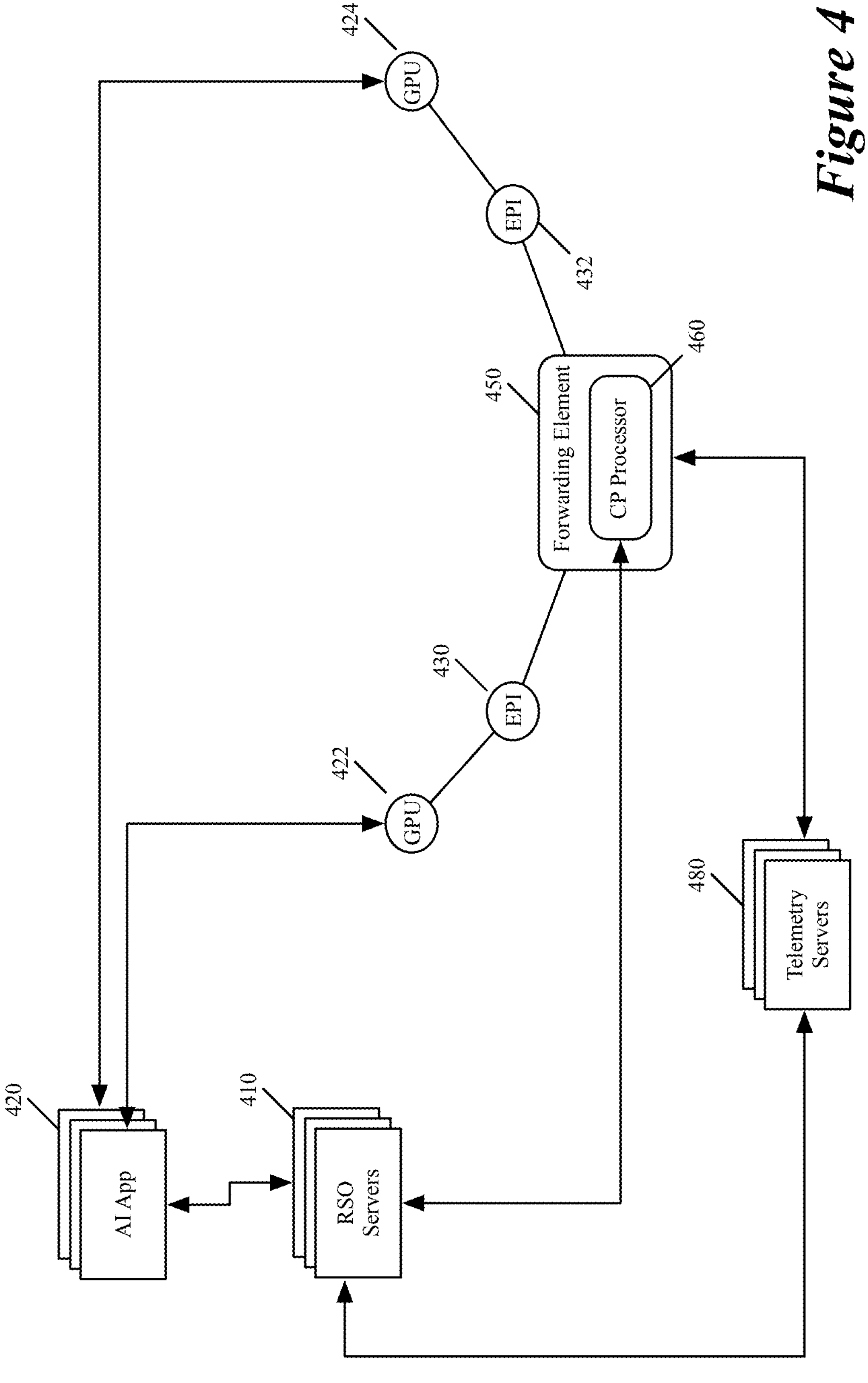
FIG. 4 illustrates an example of a cluster of one or more RSO servers that configure CP processors of forwarding elements in the network fabric to implement Reliable Scheduling of the network fabric.

FIG. 4 illustrates an example of a cluster of one or more RSO servers 410 that configure MFE CP processors 460 (e.g., switches 340, 350, 360, and 362) in the network fabric to implement Reliable Scheduling of the network fabric (i.e., to implement RSF). To keep this illustration simple, only one forwarding element 450 connecting two GPUs 422 and 424 is shown. As illustrated, the GPUs connect to the forwarding element 450 through their respective EPIs 430 and 432. For further simplicity, the discussion below assumes that both GPUs 422 and 424 are in the same rack and that the forwarding element 450 is a top-of-rack switch for this rack. Also, it is assumed that the GPUs connect to their respective EPIs through a local bus (such as a PCIe bus).

FIG. 4 also illustrates (1) a cluster of servers executing an AI application 420 that uses one or more clusters of GPUs (including GPUs 422 and 424) to perform computations and (2) a cluster of telemetry servers 480 collecting and aggregating telemetry data, which the telemetry cluster 480 provides to the RSO servers 410. As further described below, the RSO servers analyze the provided telemetry data to monitor the state of the network fabric to identify changes to the network state, and in turn to modify the parameters used for scheduling the network fabric communication (such as time, rate, and path parameters) when necessary, e.g., to circumvent paths or forwarding nodes in the network that are failing.

The RSO servers 410 in some embodiments configure control plane processors (e.g., the CP processor 460) of the managed forwarding elements (e.g., the forwarding element 450) to perform time-based scheduling for the use of the network fabric that connects the GPUs. Specifically, for each operation performed by an EPU, the RSO servers 410 can configure the MFEs to perform time-based scheduling of the network fabric to forward the result of this operation through the fabric in a particular way. The management server cluster 410 can configure the CP processors (e.g., the CP processor 460) of the MFEs to perform their scheduling for an EPU operation either proactively (e.g., before the EPU has been assigned the operation or has performed the operation) or reactively (e.g., after the EPU has been assigned the operation or has performed the operation).

This scheduling in some embodiments entails directing the EPIs of the EPUs to send the results computed by their EPUs at a particular time at a particular rate. In some embodiments, this scheduling of an EPI of an EPU is performed by the CP of a first-hop MFE that directly connects to the EPU through a physical link (e.g., a wire or wireless link). The first-hop MFE's CP in some embodiments performs this scheduling based on configuration data and/or scheduling parameters provided by the management server cluster. A physical link is also commonly called a physical network link. Examples of a physical link include a cable link (e.g., a twisted pair cable link, such as a CAT6 link) or an optical link (e.g., a fiber optic link). A physical link can also be a wireless link (e.g., a WiFi link).

For instance, as further described below, this configuration is reactively provided by the CP processor 460 after (1) an AI application server 420 directs GPU 422 to perform an operation (e.g., a multiplication operation or other operation related to AI processing) through a first network that is separate from the RSF network managed and configured by the RSO servers 410, and (2) the AI application 420 uses an API command (1) to inform an RSO server 410 of this operation's assignment to the GPU 422, and (2) to identify another GPU 424 as the destination for the result of this operation (e.g., the product of a multiplication operation). The RSO server 410 then directs the CP processor 460 to configure the EPI 430 to provide a launch time, a particular rate, and a path through the RSF to the destination GPU 424, when the GPU 422 has completed its multiplication. The CP processors of other embodiments perform their reactive scheduling in other ways, as further described below.

In some embodiments, the CP scheduling entails directing the EPI (e.g., EPI 420) of an EPU (e.g., the GPU 422) that performs a certain computation to send the result of its computation at a particular time period and at a particular rate. For instance, in some embodiments, a GPU's EPI has a launch time parameter that the CP processor 460 of the managed forwarding element 450 sets for transmitting the result of a particular operation that the GPU 422 performs. This parameter directs the EPI to send the result of this operation through the network fabric at the set launch time.

In some embodiments, the first-hop MFE CP also notifies the EPU's EPI to use a particular egress port to send out the result of the operation. The MFE CP in some embodiments notifies the EPU's EPI of this egress port after the EPU has completed its operation. In other embodiments, the MFE CP provides this information while the EPU performs its operation. In still other embodiments, the first-hop MFE CP preconfigures an EPU with the paths to all possible destinations for the EPU's computations, as further described below. The EPU's EPI in some embodiments performs a separate communication process with the EPU to specify a queue identifier (ID) associated with each EPU operation. This queue ID, in turn, is associated with the egress port that will be used to transmit the data message flow that will contain the result of the EPU's operation.

With the particular egress port and launch time, the MFE CP of some embodiments also provides the rate at which the EPI should send the data through the network fabric. This rate in some embodiments corresponds to the rate at which the EPI will read data stored by the EPU in the memory and store this data in an egress queue from which the data will then be read and output through the specified egress port. In some embodiments, the EPI derives the egress port by performing a mapping operation, e.g., that derives the egress port from the queue ID (e.g., a single identifier or a pair of identifiers) that identifies the transmit and/or receive communication queues used by the EPU and EPI to communicate regarding the operation. Hence, in these embodiments, the egress port is not provided in real-time by the MFE CP but rather is provided by the mapping records that the CP previously provided to configure the EPI.

The egress port in some embodiments corresponds to a particular path through the network fabric to the desired destination for the results computed by the EPI's GPU. In this manner, by providing the launch time, egress port and transmission rate, the CP processor of the managed forwarding element of some embodiments configures (i.e., programs or directs) the EPI to use a particular path, rate and time for sending its associated GPU's results through the network fabric to the desired destination.

In some embodiments, this scheduling operation of the MFE CP processor is based on configuration data sets that this CP processor receives from the RSO servers 410 (1) before an application server 420 invokes a command that eventually directs a GPU to perform an operation, and/or (2) after the application server invokes this command. Also, in some embodiments, the MFE CP performs some of its scheduling operations soon after receiving scheduling parameters from the management server cluster, while performing other scheduling operations much later after receiving configuration data from the management server cluster. In the former case, the MFE CP in some embodiments simply passes along proactively-provided scheduling parameters (with possible modifications) that it receives from the management server cluster to the EPI, while in the latter case, the MFE CP in some embodiments generates the scheduling parameters from the received configuration data (e.g., after receiving the EPI's request for reactively-generated scheduling parameters).

In some embodiments, the MFE CP processors provide to an applicable set of one or more EPIs the configuration information (e.g., the launch time, particular rate, path, etc.) for a particular set of one or more operations completed by a set of one or more GPUs associated with the set of EPIs only after assessing that a GPU receiving the set of results of the set of operations (from the set of GPUs) is ready to receive the set of results. For instance, when the receiving GPU needs results from multiple sender GPUs, the receiving GPU in some embodiments is ready to receive the results from the sender GPUs after all sender GPUs have indicated that they are ready to send their results. On the other hand, when the receiving GPU only needs to receive the result of an operation performed by only one sender GPU, the receiving GPU in some embodiments is ready to receive this result from the sender GPU after the sender GPU has indicated that it is ready to send its result. Also, for a receiving GPU to be deemed ready to receive the result(s) from one or more sender GPUs, the receiving GPU in some embodiments also needs to have completed any earlier computation that the receiving GPU was performing. Some embodiments avoid creating unnecessary congestion in the RSF network by sending result(s) to a receiving GPU only after determining that the receiving GPU is in a state to perform a computation on the received result(s).

In some embodiments, the MFE CP processors (e.g., the CP processors of the managed TOR switches) use in-band communication with the EPIs to configure the EPIs to use the network fabric at scheduled times and rates, and to use specific paths through the network fabric, for specific operations performed by their respective GPUs. Other embodiments, however, configure the EPIs through other mechanisms, e.g., through separate control channel communications between the MFE CPs and the EPI, or use other CP agents to configure the EPI, etc. These CP processors, in some embodiments, use DPDK (data plane development kit) to perform the scheduling.

Because of the scheduled time, rate, and port information, the EPIs in some embodiments do not forward EPU-generated data messages by performing traditional L2/L3 forwarding protocols and L2/L3 match-action operations based on EPU-formulated data message headers. For instance, in some embodiments, the source-side EPIs generate forwarding tags that they and the MFEs use to perform their forwarding operations. In other embodiments, however, the EPIs still perform data message processing based on match-action rules specified in terms of traditional data message header information (e.g., in terms of MAC addresses, MAC and IP addresses, five-tuple identifiers including source and destination IP address, source and destination port numbers, and protocol, etc.).

As mentioned above, the management (RSO) servers 410 of some embodiments monitor the state of the network fabric to identify changes to the network state. For this monitoring, the management server cluster uses the telemetry server cluster 480 to collect telemetry data from the MFE CP processors and EPIs. The RSO servers 410 initially store the topology of the network (i.e., the relationships between EPI ports and forwarding elements in the network), which enables the identification of which ports to use for which paths between EPIs. As telemetry data is received by the RSO servers 410, the RSO servers can update the network topology and paths between different EPIs (e.g., can modify the egress port to use at a source EPI to reach a destination EPI's port) based on the collected telemetry data.

Figure 5:
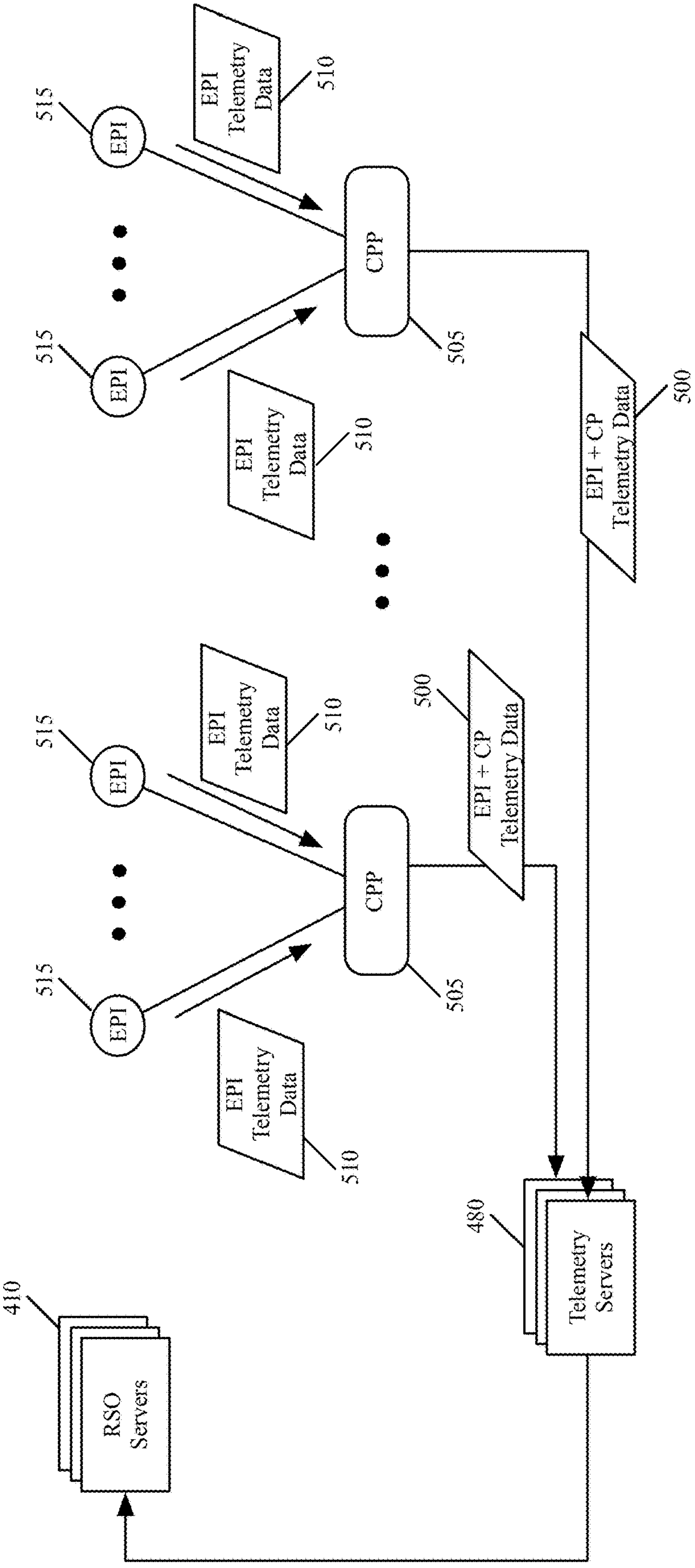
FIG. 5 conceptually illustrates the collection of telemetry data by the management (RSO) servers through the telemetry server cluster.

FIG. 5 conceptually illustrates the collection of telemetry data by the RSO servers 410 through the telemetry server cluster 480. As shown, in some embodiments the telemetry servers 480 collect telemetry data 500 from the MFE CP processors 505. In these embodiments, the telemetry data 500 provided by the CP processors 505 to the telemetry servers 480 includes not only the respective CP processor telemetry data but also telemetry data 510 that the CP processors 505 collect from the EPIs 515. To collect the telemetry data 510 from the EPIs 515, the CP processors 505 in some embodiments register with a telemetry collection service of the EPIs. In some embodiments, the CP processors 505 collect the telemetry data from the EPIs 515 via in-band messages, while the telemetry servers 480 collect the telemetry 500 from the CP processors 505 via out-of-band messages. In other embodiments, all of the telemetry data 500 and 510 is collected via in-band messages. In still other embodiments, all of the telemetry data 500 and 510 is collected via out-of-band messages.

In some embodiments, the telemetry data 500 includes a time stamp for each data message the EPI or managed switch sent to transmit each chunk of data that contains a portion of a result of a GPU operation. In other embodiments, however, the telemetry data 500 collected by the telemetry servers 480 only includes a completion flag associated with the EPI or switch completing the transmission of all the data messages that contain the result of the GPU operation. Along with this flag, the telemetry data 500 includes a time for when the transmission operation was completed.

By passing all such completion flags and times to the telemetry server set 480 for each particular GPU operation that had a scheduled transmission through the network fabric, and then analyzing this data 500 at the telemetry server set 480 or management server set 410, flows can be visualized and the time for each flow's transmission through each network-fabric node (e.g., each EPI 515 or managed switch) can be identified. A review of this data (e.g., by an automated process or a manual review by a network administrator) can identify any portion of the network that is performing poorly. Also, repeated automated or manual review of such data can identify any network node that has degraded performance for any type of flow.

The collected telemetry data allows the RSO servers 410 to learn which paths have failed (e.g., traverse through an MFE that has failed), are operating poorly (e.g., traverse through an MFE that has poor performance/telemetry data), or are introducing additional latency to the system. To avoid such degraded or failed paths or lessen the load on these paths, the RSO servers can then select other paths for subsequent data flows by analyzing the telemetry data to identify these other paths (and can distribute new forwarding records for the EPIs and MFEs to send subsequent data along these paths). In addition to using this telemetry data to identify paths that have failed or are performing poorly, some embodiments use similar timing data to determine when an EPU is performing poorly. This timing data and the identification of poor-performing EPUs is discussed further below.

For the same GPU operations, the management server cluster configures the network fabric CP agents (e.g., the MFE CP processors) to program the EPIs deterministically with the same time, rate, and path scheduling parameters under the same network conditions, so that the EPIs will consistently select the same paths and consistently transmit their data at the same times and rates, which in turn ensures that the communications between the GPUs is reliable and deterministic.

In some embodiments, the management server cluster also monitors the state of the network fabric to identify changes to the network state, and in turn to modify the time, rate, and path parameters when necessary, e.g., to circumvent paths or forwarding nodes in the network that are failing or in use for other operations. Because of this, the management of the network fabric is referred to as Reliable Scheduling of the network fabric, and the network fabric is referred to as Reliable Schedule Fabric (RSF). In some embodiments, the reliability of the RSF is also a result of the retransmission scheme that it uses to ensure that transmitted data results are fully received at their destinations before being discarded, as further described below.

When Reliable Scheduling is used for GPUs performing AI operations, AI workload outcomes (such as Time-to-Train and Time-to-First-Token) can be optimized. RSF scales linearly with the number of GPUs by replacing conventional Multi-Tier Fat Trees with deterministic forwarding through any kind of network topologies, and offers robust and predictable performance especially when faced with multiple compounding failures. This delivers a highly efficient and resilient AI infrastructure, enabling a new standard for multi-GPU training and inference.

Figure 6:
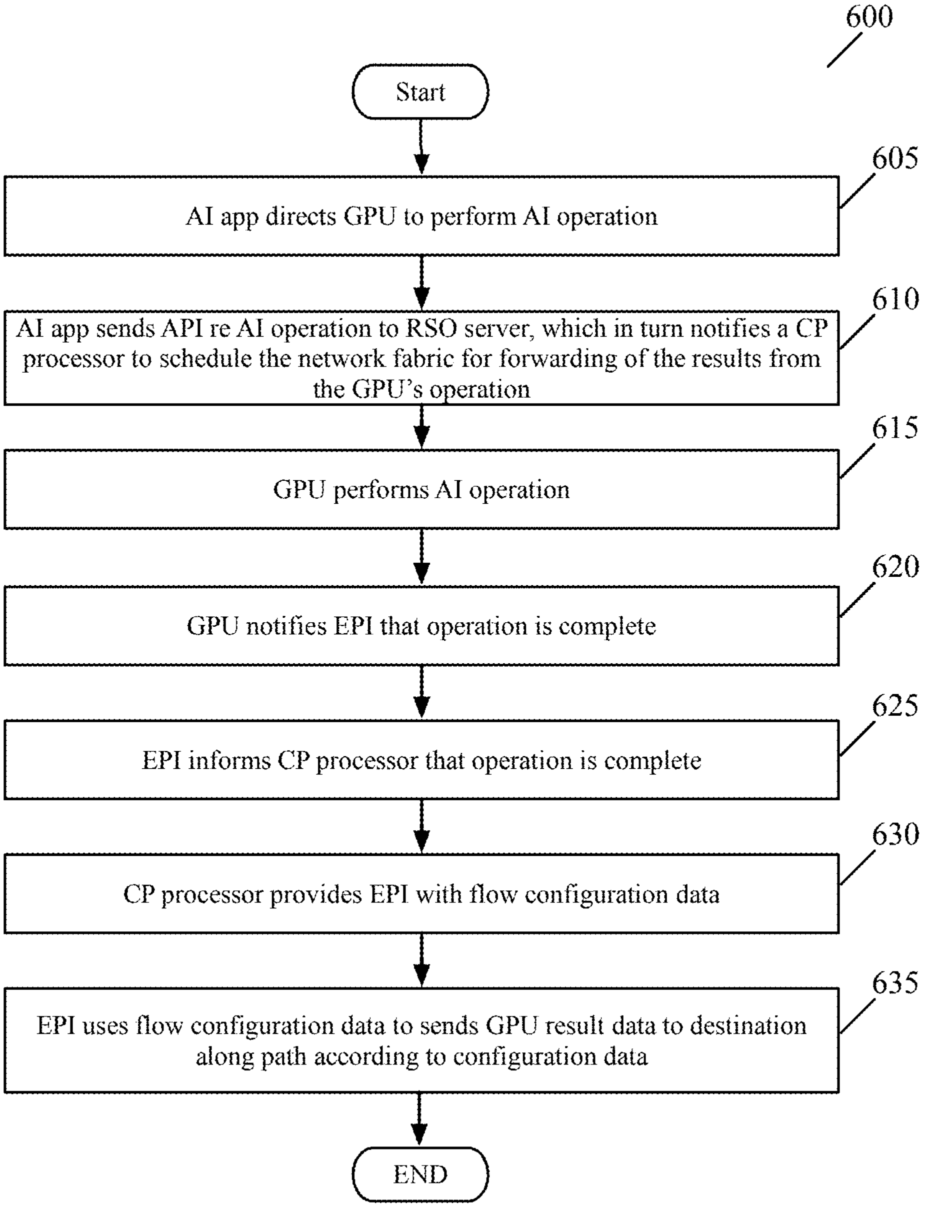
FIG. 6 conceptually illustrates a sequence of communications that is performed by the various components of the distributed computing system in order to process one operation and send the result of this operation through the RSF.
Figure 7:
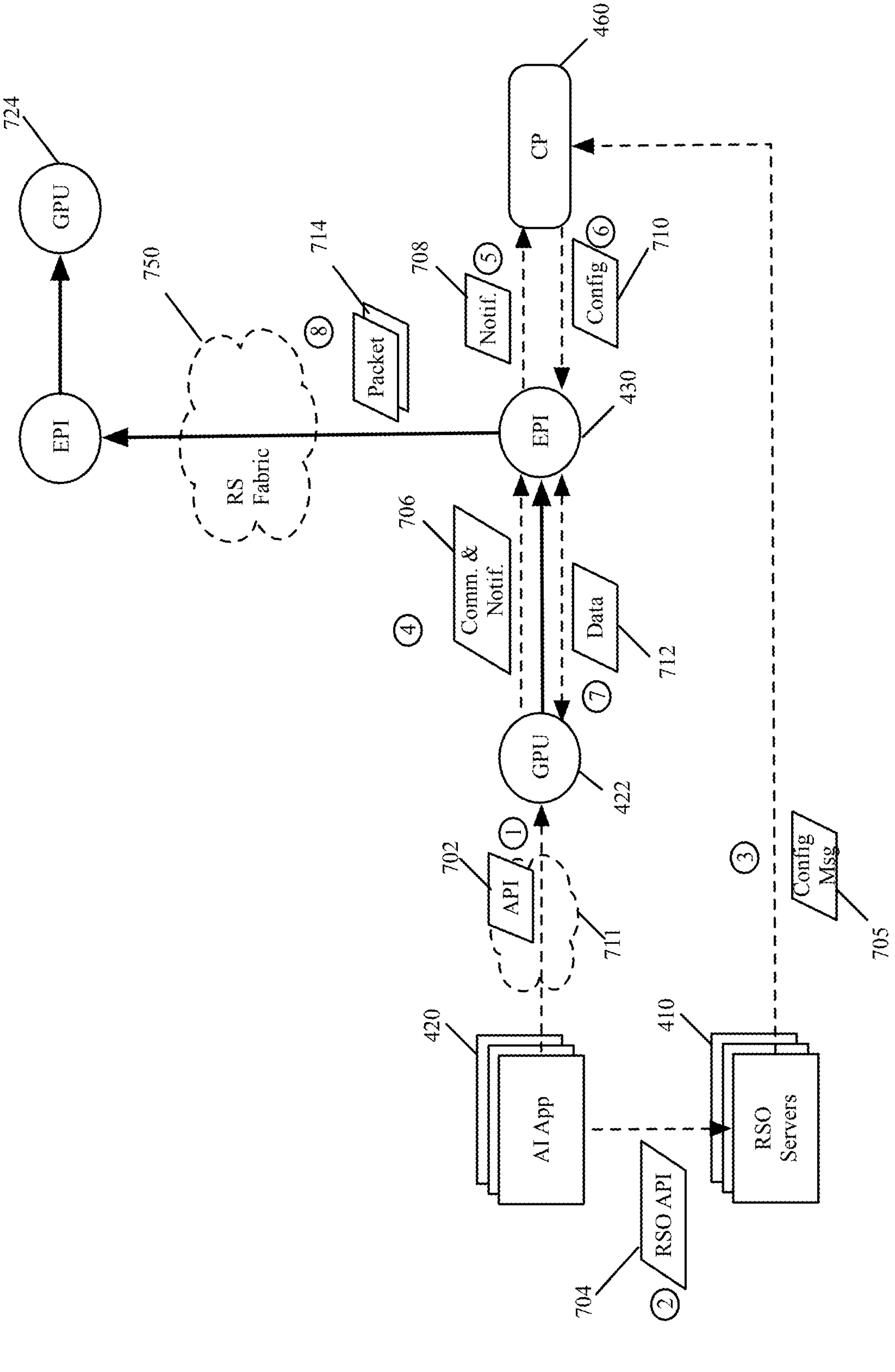
FIG. 7 illustrates a data flow diagram showing the flow of data between the different components of a distributed computing system.

FIGS. 6 and 7 illustrate an example of the reactive scheduling operations of the CP processors of the MFEs of some embodiments. FIG. 6 conceptually illustrates a sequence of communications that is performed by the various components of the distributed computing system (such as the systems illustrated in the examples of FIGS. 4-5) in order to process one operation and send the result of this operation through the RSF. This sequence of communications includes reactive scheduling operations performed by the MFE CP 460.

This figure will be described by reference to a data flow diagram illustrated in FIG. 7. The data flow diagram illustrates the flow of data between the different components of a distributed computing system. As further described below, the sequence of operations illustrated in FIGS. 6 and 7 are just some examples of the operations performed in some embodiments. Other embodiments perform these operations in different sequences and/or perform a different set of operations to achieve the same or similar results.

As shown, the process 600 of FIG. 6 starts when an AI application server directs (at 605) a source GPU (also called sender GPU) to perform an operation. This direction in some embodiments is also accompanied by an identification of the destination that should receive the result of the source GPU's operation (e.g., a destination GPU (also called receiving GPU), or a destination switch in case of a subsequent in-network compute operation). FIG. 7 illustrates the AI application 420 sending an API 702 to the sender GPU 422 through a first network 711 that is separate from the RSF managed and configured by the RSO servers 410. In some embodiments, the API 702 identifies the operation to perform and the destination for this operation.

Before or after directing the source GPU to perform this operation, the application server uses (at 610) an RSO API command to inform the RSO server cluster of this operation's assignment to the source GPU, and the destination for the result of this operation. The application server, in different embodiments, informs the RSO server cluster of the assignment of the operation to the source GPU (via an RSO API command), just prior to assigning the operation to the source GPU, concurrently with the assignment of the operation to the source GPU, or shortly after assigning the operation to the source GPU. As such, the RSO server cluster may receive this API command concurrently with the assignment of the operation to the source GPU or shortly before or after the assignment of the operation to the source GPU (e.g., within one second prior to or after the assignment of the operation to the source GPU).

The RSO server cluster, in turn, then directs (at 610) an MFE CP processor to schedule the network fabric to forward the results of the source GPU's operation. FIG. 7 illustrates the AI application 420 sending an RSO API 704 to the RSO server cluster 410 regarding the operation that it assigned to the source GPU 422, and the RSO server cluster 410 then sending configuration message(s) 705 to direct the CP processor 460 to configure the EPI 430 with a launch time, a particular rate, and a path through the RSF to a destination GPU 724, when the source GPU 422 has completed its operation.

In some embodiments, the AI application identifies the destination GPU to the RSO server cluster, and to the source GPU that performs the computation (at the direction of the AI application), in terms of a GPU identifier (e.g., a high-level identifier that identifies the GPU at an abstraction specified in the programming layer of the AI application and the other GPUs) as opposed to a network identifier used by the RSO server clusters. Similarly, for the RSO server cluster, the AI application uses a high-level identifier that identifies the source GPU that is performing an operation. The RSO server cluster is configured to map the GPU high-level identifiers to the networking-layer identifiers (e.g., network addresses of the GPUs such as L2 or L3 addresses, or forwarding tags associated with paths through the network to the EPUs), and use these networking-layer identifiers in the configuration data generated for the forwarding elements.

When the AI application server assigns a set of one or more related operations to two or more GPUs that then have to send the results of their operations to a common destination (e.g., to the same receiving GPU or receiving in-network-computing switch), the AI application servers API to the RSO server cluster identifies the assigned set of operations, the source GPUs that are assigned to this set of operations and the destination(s) (e.g., one or more GPUs and/or switches) that should receive the results of this set of operations. The RSO server cluster then directs one or more CP processors to configure the network fabric for forwarding the results of the operations by the two or more source GPUs to their appropriate destination(s). In some embodiments, the RSO server cluster configures the CP processor of the first-hop MFE(s) of each destination GPU to provide the reactively provided scheduling parameters to the EPIs of the source GPUs. In other embodiments, the RSO server cluster configures the CP processor of the first-hop MFE(s) of each source GPU to provide the reactively provided scheduling parameters to the source GPUs.

The source GPU completes (at 615) the operation that the AI application directed it to perform at 605, and then notifies (at 620) its EPI of the completion of its operation. FIG. 7 illustrates a notification message 706 that the source GPU 422 sends its EPI 430 when it has completed its operations. As shown, the notification message 706 is part of a set of communication messages exchanged between the GPU 422 and its EPI 430 for the source GPU to pass along the result of the operation that the AI application directed it to perform at 605. In some embodiments, the source GPU and its EPI perform a separate message exchange each time the GPU has a result of an operation that it needs the EPI to pass through the network fabric.

In some of these embodiments, the source GPU identifies a communication queue pair through which it will communicate with the EPI to transmit the result of the GPU's operation. This queue pair includes a transmit-side queue for the source GPU to communicate with its EPI and a receive-side queue for the EPI to communicate with its source GPU. The source GPU in some embodiments identifies this queue based on the destination in the RSF (i.e., the RSF destination) for the result of the source GPU's operation. In the transmit-side queue, the source GPU in some embodiments stores a pointer to a memory location in which the source GPU has stored the result of its operation. From this memory location, the EPI retrieves the results, temporarily stores them in a queue (e.g., a jitter buffer) and then retrieves the results from that queue to transmit the results through the network.

One of ordinary skill will realize that the source GPU and its EPI operate differently in different embodiments. For instance, in some embodiments, the source GPU and EPI perform a communication operation for multiple different operations performed by the source GPU. Also, in some embodiments, the EPI selects the queue for the source GPU to use based on its own programming or based on configuration data pushed by the CP processor of a managed forwarding element. In addition, in some embodiments the source GPU and EPI perform their communication operation before the source GPU has completed the operation requested at 605, and hence the communication operation is not part of the source GPU's notification that it has completed its operation. For instance, after receiving the configuration message 705 from the RSO server cluster 410, the MFE CP processor of some embodiments pre-configures the EPI to be ready to receive the source GPU's completed-operation notification, which then causes the EPI to start a communication operation with the GPU before the GPU has completed its operation.

At 625, the EPI informs the CP processor that the GPU's operation is complete. FIG. 7 illustrates the EPI 420 sending a notification 708 to the CP processor 460 that the GPU 422 has completed its operation. With this notification, the EPI 420 in some embodiments identifies to the CP processor 460 the queue ID of the communication queue that the GPU is using for communicating with the EPI regarding the completed operation. In other embodiments, the EPI does not provide the queue ID to the CP processor as the queue ID is based on the RSF destination associated with the completed operation, and this destination is known to the CP processor and the EPI based on the operation's associated information and/or is otherwise identifiable based on the data message that the EPI sends to the CP processor or to the destination (e.g., the destination GPU).

The CP processor next sends (at 630) the EPI configuration data (e.g., the launch time, particular rate, path, etc.) to configure the EPI to forward the results of its source GPU's operation, and the EPI then uses (at 635) the provided configuration data to forward the source GPU's result along the network fabric to its destination(s). After receiving confirmation that the data message flow that contains the source GPU's result has been completely received at its destination(s), the source EPI of some embodiments moves the pointer in the transmit-side communication queue to the corresponding receive-side communication queue in order to inform the GPU (e.g., a GPU process such as a GPU driver) that the stored data in the GPU's memory can now be discarded.

FIG. 7 illustrates the CP processor 460 sending configuration data 710 to the EPI 430, which then based on this configuration data retrieves and sends the source GPU computation result 712 in one or more data messages 714 along the RSF 750. In some embodiments, the CP processor 460 provides the configuration data 710 before receiving the EPI's notification of the GPU's completed operation, as mentioned above. In these embodiments, the CP processor only sends an instruction to direct the EPI to forward the GPU's computed result based on the preconfigured values that it provided before. In some embodiments, the CP processor instantiates a proxy receiver process for each set of related operations that are completed by a set of one or more GPUs that has to go to one or more common destinations (e.g., has to go to one destination GPU, one destination switch for an in-network compute operation, two or more destination GPUs, etc.). In such embodiments, this proxy receiver process is the process that determines when the CP processor should provide an indication (e.g., a standalone indication, or as part of a configuration data set) to the EPI of each sender GPU that the EPI can send its GPU's result.

When the GPU's result is part of a set of two or more related computations performed by two or more GPUs that need to be sent to the same destination after all the computations are completed, the CP processor (e.g., processor 460) in some embodiments does not provide the configuration data or the instruction to forward the results of the computation of GPU 422 to the EPI 430 until it has received notifications from the EPIs of all the GPUs that are performing the related set of computations that their GPUs have completed their operations.

In other embodiments, this waiting approach is only a configurable feature of the CP processor to allow a network administrator to identify cases in which the CP processor should schedule sending GPUs (i.e., should configure or instruct their EPIs) to send their results as they become ready instead of waiting for all the GPUs that are performing the related set of computations to finish. For instance, for a bulk transfer from multiple GPUs to one destination GPU, the CP processor can be configured to direct one sender GPU to start sending its bulk data results to the receiver GPU when it is ready, even before another sender GPU has indicated that it is ready to send its bulk data. In some embodiments, the CP processor can also preconfigure a GPU's EPI to send its GPU's computation result immediately (e.g., at any given rate through a particular path) without having the CP processor acknowledge and provide transmission instructions (which would normally come after the CP processor has received the EPI's notification that the GPU has completed its operation).

Several more examples of proactively and reactively scheduling EPIs in some embodiments are provided below. As further described in these examples, the RSO server cluster in some embodiments can configure the CP processor of a leader first-hop MFE of each source EPU to proactively provide a set of scheduling parameters for a source EPU's operation to one or more of this EPU's EPIs. These scheduling parameters are referred to as prescheduling parameters as the leader's CP processor provides these parameters before the source EPU performs the operation or is assigned to perform the operation. Each EPI of the source EPU that receives the proactively provided prescheduling parameters can then later use these parameters to forward the result of the source EPU's operation to a set of one or more destinations (e.g., destination EPUs) in the RSF network that need to receive this result. Also, different source EPUs can have the same or different leader MFEs in some embodiments.

For an operation performed by a source EPU, the examples below also further illustrate how the RSO server cluster of some embodiments can provide configuration data that configures the CP processor of each first-hop MFE of each destination EPU to reactively provide to the source EPU a set of scheduling parameters for the source EPU's operation when the source EPU has not previously received prescheduling parameters for this operation. Each first-hop MFE of the destination EPU that is so configured by the RSO server cluster in some embodiments is an MFE that can serve as a last-hop MFE on a path that the source EPU uses to send its result to the destination EPU.

In some embodiments, a GPU organizes its operations along different communication queues associated with different destinations and/or different operations, e.g., operations from collective operations (such as AllReduce or AlltoAll) through one queue, a new bulk transfer to a particular destination through another queue, etc. The EPI in these embodiments has the queues but the GPU writes into these queues when the GPU has operation results that need to be transmitted through the RSF.

In some of these embodiments, the EPI relays the queue ID to the CP processor, which then maps the queue ID to a set of one or more RSF destinations, and then provides (1) the launch time and pacing rate for filling the queue to the NIC and (2) the queue and port (associated with the physical destination) to the embedded switch. By doing this, the CP processor maps the virtual view of the GPU/EPI of the RSF to the physical network fabric based on desired scheduled times and rates. As mentioned above, the CP processor 460 in other embodiments does not provide the embedded switch with the port to use, as in these embodiments the RSF control plane pre-computes paths to different RSF destinations and provides mapping records that map queue IDs to EPI ports.

Instead of using the CP processors of the forwarding elements to identify the configuration data (e.g., the launch time, the path, and the rate) for proactively or reactively scheduling the use of the RSF by the EPIs, and using these CP processors to execute proxy processes for the data receivers (e.g., receiver GPUs or receiver forwarding elements), some embodiments use CP processes that execute on servers to perform these proactive or reactive scheduling operations (i.e., to execute proxy processes and to identify the configuration data). This approach is beneficial in that it offloads this work from the managed forwarding elements to servers that have more computational bandwidth. It also makes the configuration system more resilient as it prevents the failure of one managed forwarding element from not only reducing the capabilities of the network fabric but also affecting the configuration of the EPIs/GPUs configured by the failed managed forwarding element.

Figure 8:
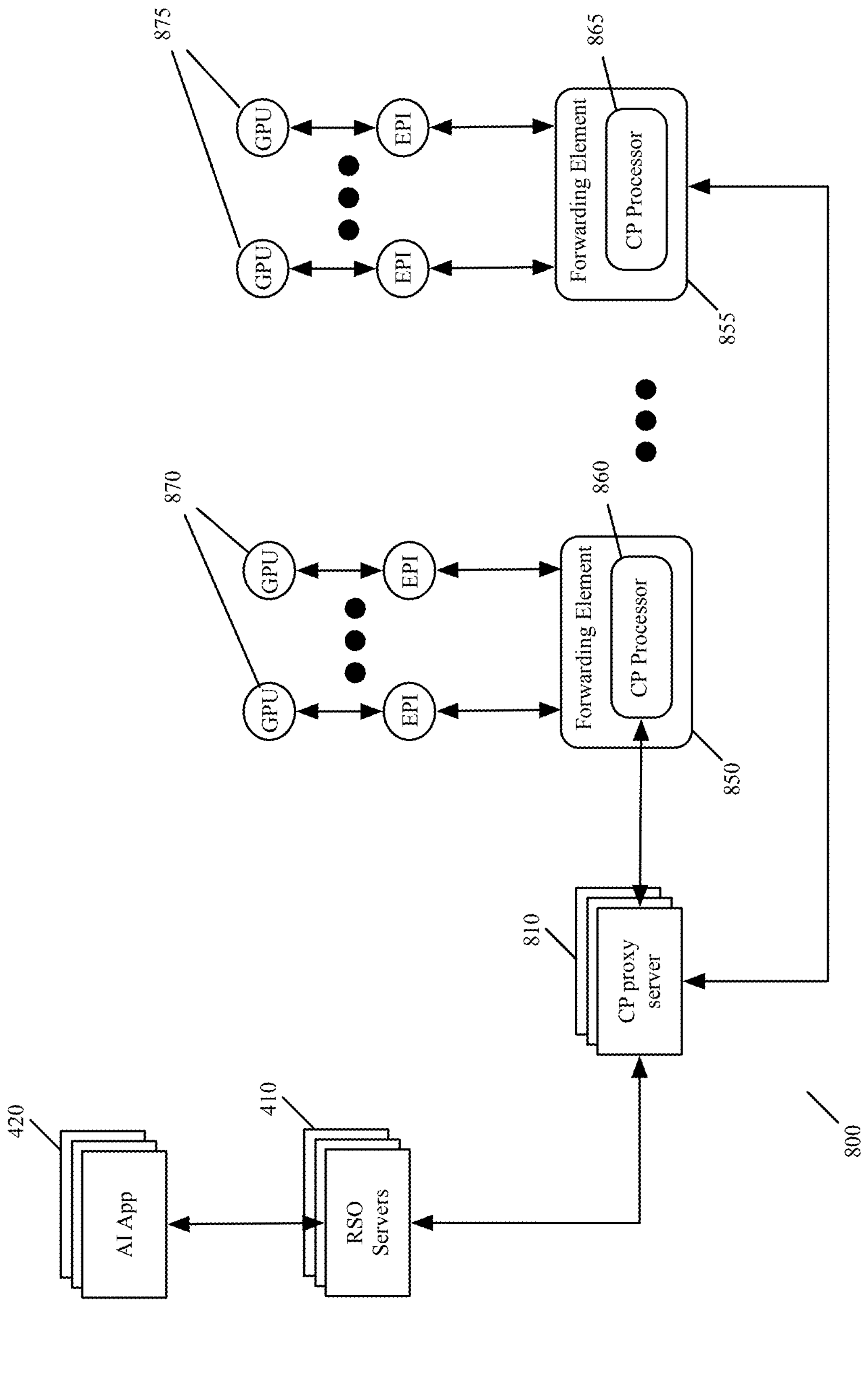
FIG. 8 illustrates an example of a control system using CP processes executing on servers to offload some of the CP operations from the CP processors of the managed forwarding elements.

FIG. 8 illustrates an example of a control system 800 using CP processes executing on servers to offload some of the CP operations from the CP processors of the managed forwarding elements. In this control system, the RSO servers 410 provide the configuration data to one or more CP proxy servers 810 whenever the RSO servers 410 need the RSF to be configured for a particular set of one or more operations that the AI application cluster 420 assigns to a set of one or more GPUs (i.e., whenever the RSO servers 410 receive an API command from an AI application relating to an operation that the AI application has assigned to one or more GPUs).

For a received API command associated with an operation assigned to a GPU, an RSO server sends configuration data to the CP proxy server 810 assigned to the MFE CP processor that is assigned the task of relaying configuration data to the GPU's EPI. This CP processor's MFE in some embodiments directly communicates with the GPU's EPI without having to go through another managed forwarding element, i.e., is a first-hop managed forwarding element from the perspective of the GPU's EPI. FIG. 8 illustrates two managed forwarding elements 850 and 855, with the forwarding element 850 being the first-hop managed forwarding element for GPUs 870 and the forwarding element 855 being the first-hop managed forwarding element for GPUs 875.

In some embodiments, only intra-domain switches can be first-hop MFEs. In other embodiments, both intra-domain switches and inter-domain switches can be first-hop managed forwarding elements for a given GPU (i.e., the GPU's EPI connects through different ports to one or more intra-domain and inter-domain switches). In some such embodiments, the CP processor for a given GPU's EPI is the CP processor of one of the intra-domain switches to which the EPI directly connects, while in other such embodiments the CP processor for a given GPU's EPI is the CP processor one of the inter-domain switches to which the EPI directly connects. In still other embodiments, the CP processors for some EPIs are CP processors of intra-domain switches while the CP processors for other EPIs are CP processors of inter-domain switches.

For a particular operation assigned to a particular GPU, the CP proxy server associated with the particular GPU (e.g., associated with a first-hop managed forwarding element assigned with the task of configuring the particular GPU's EPI) computes (generates) in some embodiments the configuration data for configuring the GPU's EPI and passes this data to the CP processor of the first-hop managed forwarding element that is assigned the task of configuring the particular EPI, so that the CP processor can pass along the generated configuration data to the EPI.

In some embodiments, this CP process server computes some configuration-data attributes (e.g., path and rate) and passes along these attributes to the CP processor of the GPU's first-hop managed forwarding element after receiving the RSO server's configuration message for the CP processor to use to proactively schedule the GPU's EPI. In some of these embodiments, the CP proxy server computes other configuration-date attributes (e.g., launch time) and passes along these attributes to the CP processor of the GPU's first-hop managed forwarding element only after receiving from this CP processor an indication that the GPU has completed its operation according to a message sent by the GPU's EPI. In other words, in these cases, the CP proxy server can reactively generate configuration data in response to an indication from the GPU, and then provide this configuration data to the CP processor of the GPU's first-hop MFE to reactively schedule the GPU's EPI.

In some embodiments, the CP proxy server computes some configuration attributes (e.g., launch time, path and rate) of the configuration data and passes along this configuration data to the CP processor of the first-hop managed forwarding element, before the GPU has even completed its assigned operation, e.g., by specifying an immediate launch whenever the GPU has indicated that it has completed its operation. Alternatively, in some embodiments, the CP proxy sever computes other attributes (e.g., launch time, path and rate) of the configuration data and passes along this configuration data to the CP processor of the first-hop managed forwarding element, only after the GPU has completed its assigned operation and the CP processor informs the CP proxy server that the GPU's EPI has sent a message to indicate that the GPU has completed its operation. In some embodiments, the CP proxy server operates as CP proxy process for an RSF destination (e.g., a destination GPU or switch) for the result of the source GPU's operation, in order to determine the launch time for forwarding the GPU's computed result to the RSF destination.

In order for the CP proxy server 810 to compute the configuration attributes for a given GPU operation, the CP proxy server 810 is provided up-to-date network information by the RSO servers 410 in some embodiments. Initially, the RSO servers 410 store the topology of the network (i.e., the relationships between EPI ports and forwarding elements in the network), which enables the identification of which ports to use for which paths between EPIs. As telemetry data is received by the RSO servers 410 as described above by reference to FIGS. 4 and 5, in some embodiments the RSO servers provide to the CP proxy servers 810 either (1) this telemetry data or (2) path preferences determined based on the telemetry data. This up-to-date information provided to the proxy server 810 enables the proxy server to learn which paths have failed or are introducing additional latency and can be used by the proxy server to select paths for subsequent data.

As mentioned above, some embodiments use timing data to determine when an EPU is performing poorly. Specifically, the RSO servers and/or CP proxy servers can access (1) the time when an operation is scheduled to be performed by an EPU (e.g., when the EPU receives the instructions to perform an operation and the data required to perform that operation) as well as (2) the time when the EPU sends a completion notification to its EPI (causing the EPI to notify a CP processor) indicating that the operation has been completed and the data from that operation is ready to be sent. From these times, the RSO servers (or CP proxy) can compute the time required for the EPU to complete its operation and determine whether this completion time is normal, either by comparison to a baseline for the operation or by comparison to the times required for the same (or similar) operations to be completed by other EPUs.

If an EPU is performing poorly, then in some embodiments the RSO servers stop scheduling operations to be performed by that EPU and/or notify an administrator (e.g., an infrastructure administrator) of the performance issue. When an EPU is performing poorly, this can throw off the scheduling in a highly synchronous system, as one or more other EPUs need to wait for the data from the poor-performing EPU in order to begin their operations that require that data as input. This, in turn, causes delays for subsequent operations.

Different embodiments not only perform the scheduling at different places (e.g., at the MFE CP processor or at the CP proxy servers) but also perform different types of scheduling. For instance, when multiple sender EPUs have to send their results to one receiver EPU, the scheduling in some embodiments assigns different time slots to different senders in order to avoid congestion at the receiver EPU, while other embodiments divide the available bandwidth by the number of sender GPUs and direct all of them to transmit their results conjunctively at the computed reduced level for them. Still other embodiments utilize different methodologies to perform their scheduling.

Many of the examples above relate to reactive scheduling operations that schedule the transmission of a result after an EPU has completed its operation and produced the result of this operation. However, as mentioned above, some embodiments also perform proactive scheduling operations that preschedule transmission of EPU computation results before the EPUs have performed their operations and/or have even been assigned their operations. Also, some embodiments configure the EPIs not to wait for scheduling parameters before transmitting results of certain EPU operations (i.e., because the result data is high priority and/or small enough so as not to create problems in the network when sent without scheduling).

Figure 9:
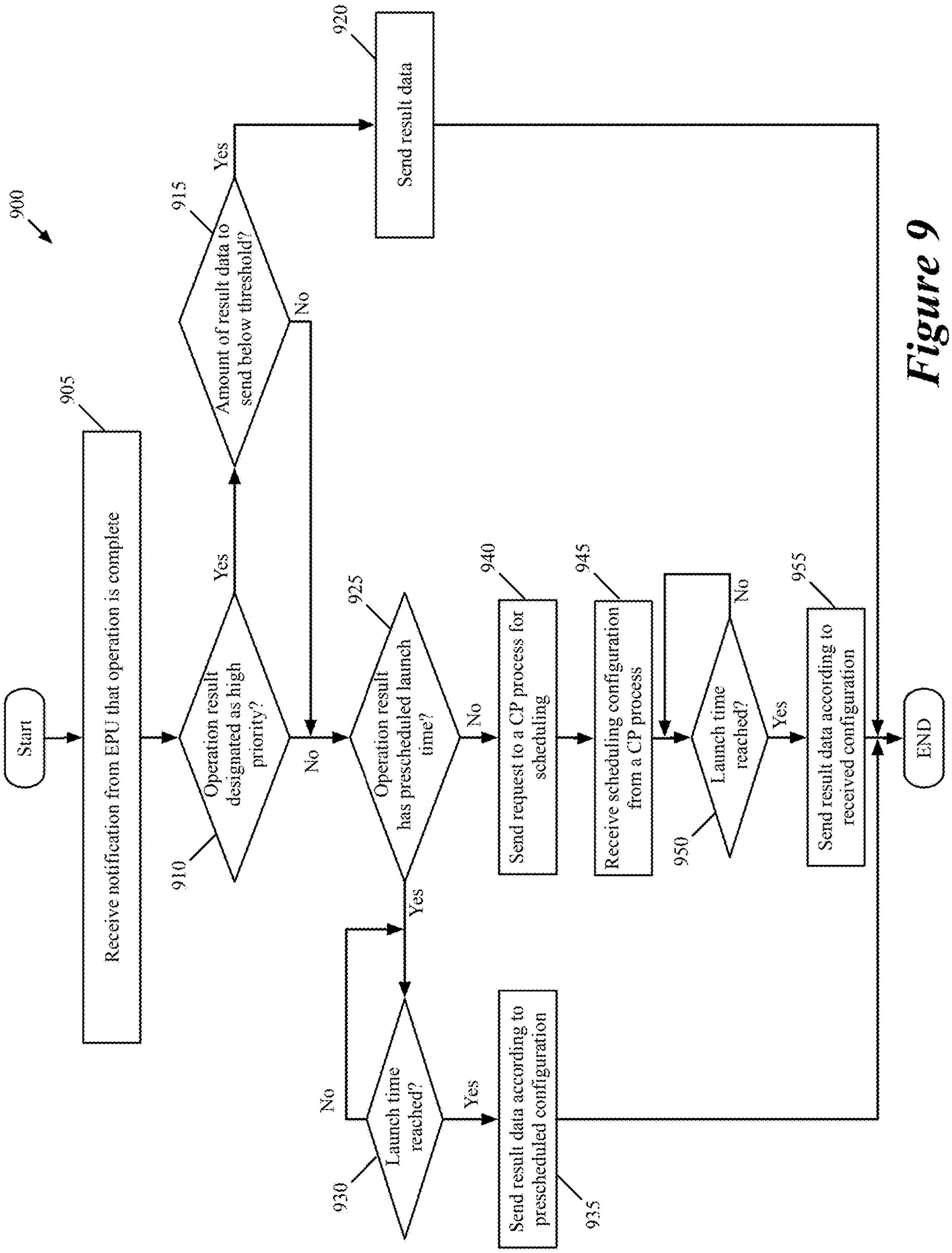
FIG. 9 illustrates a scheduling process of an EPI of some embodiments.

FIG. 9 conceptually illustrates a process 900 of some embodiments for forwarding the result data generated by an EPU through the network to its destination(s). This process 900 first checks to determine whether this forwarding has been prescheduled (e.g., whether it has a scheduling parameter set that the RSO server cluster proactively provided through the CP processor), and if not, reactively requests the scheduling parameter set. In some embodiments, the process 900 is performed by a scheduler of the EPI to which the EPU is coupled (e.g., the EPI 430 in the above figures). For instance, in some embodiments, a transmit scheduler of the EPI performs the process 900. One example of such a transmit scheduler will be described below by reference to FIG. 12.

As shown, the process 900 begins by receiving (at 905) a notification from the EPU that an operation is complete. In some embodiments the notification is part of a communication exchange between the EPU and the EPI, and is performed when the EPU completes an operation and needs to transmit the results of that operation. In some embodiments, this notification specifies the type of data to be sent (e.g., the particular operation that produced the data) as well as the amount of data to be sent. Conjunctively, or alternatively, the notification in some embodiments specifies a set of one or more destinations for the result data (e.g., the set of one or more EPUs and/or storages that are to receive the result data).

In some embodiments, once the results of the EPU's operation are stored in the EPU's memory, a process executing on the EPU (1) receives notification (e.g., through an interrupt or notification registration) and (2) stores a pointer in a transmit-side communication queue of the EPI that identifies the memory location that contains the EPU's result and from which the EPI can retrieve the data to forward to its RSF destination. This process in some embodiments is an RSF interconnect driver that is loaded onto the EPU's operating system (OS). This driver in some embodiments has hooks into the OS to receive notifications each time that an operation of an application has been assigned to the EPU.

This driver in some embodiments is configured by the RSF control plane (e.g., by the RSO server cluster through a first-hop MFE of the EPU) to have a list of queue pairs for a list of possible destinations in the RSF for transmitting the EPU's operations results. In other words, each communication queue pair is associated with one possible destination and is used to communicate with the EPI regarding (1) results that are to be forwarded to that possible destination and (2) communication received from that possible destination. The RSF control plane configuration of the driver in some embodiments includes a set of mapping records each of which maps each possible destination with one queue pair.

When the driver receives a notification that its EPU has been assigned an operation and the result of this operation is intended for a particular destination in the RSF, the driver in some embodiments allocates the queue pair associated with this destination, so that it can subsequently write a pointer to the transmit-side communication queue of this pair to identify the memory location that stores the result of the operation. In other embodiments, the driver pre-allocates all the queue pairs when the EPU boots up.

After receiving (at 905) notification that the EPU has completed its operation, the process 900 then determines (at 910) whether the operation result is designated as high priority data. Some embodiments designate certain types of result data as high priority data (e.g., based on the type of operation that produced the result). Other types of designations include task data (e.g., for the results of other types of operations performed by the EPU that can be prescheduled) and bulk data (e.g., for certain large types of data transfers).

If the operation result is designated as high priority, the process 900 also determines (at 915) whether the amount of data that needs to be sent is below a threshold amount. In some embodiments, each transmit queue of the EPI is pre-allocated a small amount of bandwidth to use for certain small data transfers and data messages (e.g., certain control packets). As such, when the operation result is (1) designated as high priority and (2) small enough to be sent using the pre-allocated bandwidth, the process 900 sends (at 920) the result data without any more delay (e.g., any delay for receiving additional scheduling parameters).

Otherwise, when the operation result is not considered high priority (at 910) or is determined (at 915) to be above the threshold amount of data, the process 900 determines (at 925) whether there is a prescheduled launch time for the operation result. In some embodiments, CP processes proactively preschedule the transmission of some of the transactions assigned to the EPUs. For instance, in some embodiments, the AI application (e.g., application 420) informs the RSO server cluster of at least a subset of the operations (also called tasks or transactions below) that have or will be assigned to certain EPUs, or might be assigned to the EPUs as the EPUs are candidates for performing such operations. Before or after informing the RSO server cluster, the AI application assigns these tasks to the EPUs. In some embodiments, the AI application also specifies an amount of result data generated for each such task that is prescheduled.

In some embodiments, the RSO server cluster proactively preschedules large transactions. Different embodiments define a large transaction differently. For instance, a large transaction in some embodiments is a transaction that produces a large amount of data that needs to be transmitted to one or more destinations connected through the RSF network fabric. In other embodiments, a large transaction is a transaction that uses a lot of compute or memory resources at the source EPU that performs the transaction.

In still other embodiments, a large transaction is a transaction that is broken into smaller transactions that are then assigned to several EPUs to perform collectively. Such large transactions are typically prescheduled as they require coordination among the individual EPUs that perform the smaller transactions that collectively form the larger transaction. Some embodiments allow a system or network administrator to define programmatically what constitutes a small or large transaction in his or her particular RSF network deployment. Irrespective of how some embodiments define a large transaction, a small transaction in some of these embodiments is a transaction that has not been defined as a large transaction.

In addition, in some embodiments, the RSO server cluster proactively preschedules numerous operations for a deterministic set of operations. For instance, a neural network inference application will require a predetermined set of operations to be performed by the EPUs. The RSO server cluster (based on the receipt of multiple API commands for the multiple operations in the set) can pre-generate scheduling parameters for these computations. In some such embodiments, the RSO servers generate the scheduling parameters for a set of candidate EPUs for each such operation and distribute the pre-generated scheduling parameters to each of these candidate EPUs. The candidate EPUs for an operation or group of operations, in different embodiments, can be the EPUs that will perform the operation or group of operations or a larger set of EPUs that includes both the EPUs that will eventually perform the operations as well as other EPUs that do not end up performing the computations. For instance, all of the EPUs in a domain, set of multiple domains, or all domains (or a subset of such EPUs) can be considered the candidate EPUs for an operation or group of operation. Thus, for instance, the scheduling parameters for a set of operations might be generated for and distributed to all of the EPUs in a domain (the candidate EPUs for the set of operations) even if only a subset of those EPUs are used to perform each operation in the set.

For each EPU task that is proactively prescheduled, the CP processes of some embodiments proactively preschedule the transfer of the result data generated by the EPU for that task by (1) generating a set of scheduling parameters for that transfer (e.g., a bit rate and launch time), and (2) proactively providing the generated set of scheduling parameters to each EPI of the EPU that will be responsible for handling at least a portion of the data transfer. In some embodiments, the CP processes are implemented by the RSO server cluster, which then provides each scheduling parameter that it generates for each EPI to the first-hop leader managed forwarding element (e.g., switch) of that EPI. This leader managed forwarding element for each EPI in these embodiments then provides the generated scheduling parameters to the EPI in order to complete the prescheduling of the task. In other embodiments, the CP processor of the first-hop MFE of an EPI executes some or all of the prescheduling CP processes that generate the set of scheduling parameters for a task assigned to the EPI's EPU.

In some embodiments, proactively prescheduling allows the control plane scheduling configurations to be provided to the relevant EPIs before the AI application has assigned the tasks to the respective EPUs of the EPIs or before the respective EPUs have executed the tasks. The prescheduling of the launch times in these embodiments allows the CP processes of some embodiments to minimize scheduling delay and maximize available bandwidth when each EPI determines (at 925) that it has received a preschedule launch time for a particular task that it is currently processing. The high priority determination at 910 and the threshold data-amount determination at 915 similarly minimize scheduling delay and maximize available bandwidth. In addition to EPU computations, the CP processes of some embodiments also preschedule other operations such as memory read/writes and put commands. Furthermore, in addition to operations performed by a single EPU, in some embodiments collective operations (e.g., AllReduce, AlltoAll, Send/Recv) performed by multiple EPUs collectively can be prescheduled.

When the process 900 determines (at 925) that the EPI has a prescheduled launch time for the result data, the process then determines (at 930) whether the prescheduled launch time has been reached. If the time is at or past this prescheduled launch time, then the process sends (at 935) the result data to its destination(s) according to the prescheduled configuration received from the CP processes. For scheduled transfers, this prescheduling in some embodiments specifies at least the launch time and the pacing rate (i.e., the data rate over time) for the data transmission. If the launch time has not yet been reached, the process 900 stays in this state (i.e., waits) until the launch time is reached.

When the process 900 determines (at 925) that the forwarding of the EPU's result is not scheduled ahead of time, the process 900 sends (at 940) a request to a CP process to request that the data transfer be reactively scheduled. As mentioned above and further described below, in some embodiments the CP process that handles the reactive scheduling request for a data message flow (that effectuates the data transfer) to a receiving EPU (also called destination EPU below) is executed by the CP processor of a last-hop MFE (e.g., switch) to the receiving EPU. This last-hop MFE is in the path of the data message flow to the receiving EPU. This last-hop MFE is a first-hop MFE of the receiving EPU in that it directly connects to the receiving EPU. Examples of such last-hop MFEs will be described below by reference to FIGS. 25 and 26. In other embodiments, the CP processor that receives the reactive scheduling request is the CP processor of the first-hop MFE of the EPI that executes the process 900.

Irrespective of which CP processor is contacted, the EPI sends a notification to the CP processor that performs the reactive scheduling to indicate that the EPU has completed its operation and that it needs a set of scheduling parameters to transfer the data result that was produced by this operation. In some embodiments, this notification specifies the type of operation, the amount of data to be transferred, and/or the EPI communication queue that is used for communicating with the EPU regarding the data that is to be forwarded through the RSF.

In response, the process 900 receives (at 945) scheduling configuration information from the CP process. As described above, this scheduling information, in some embodiments, specifies at least a launch time (i.e., time at which the transmission of the result data can begin) and a pacing rate. The CP process, in some embodiments, has information (e.g., from the management server cluster) indicating the current and expected future flow of data throughout the network fabric. Accordingly, the CP process can factor in the expected usage of the various switch ports needed when determining when to schedule the data transfer and the pacing rate for the data transfer. In addition, the CP process of some embodiments factors in the current and expected future receipt of other data by the receiver endpoints (e.g., using a CP proxy server) to determine how much bandwidth the receiver endpoints currently have and are expected to have in the future.

Based on all of these factors, the CP process in these embodiments provides (at 945) the EPI with a launch time and pacing rate for the data transmission. As such, while an upfront delay may occur (to ensure that the bandwidth is available throughout the network) in these embodiments, once the launch time is reached the network should not have any congestion. In some embodiments, the CP process also evaluates whether the sender EPU is allowed to send the specific result data.

Upon receiving the configuration, the process determines (at 950) whether the launch time for the data transmission has been reached. If the current time is at or past this launch time, then the process sends (at 955) the result data to its destination(s) according to the configuration (e.g., the launch time and pacing rate) received from the CP process. If the launch time has not yet been reached, the process 900 stays in this state (i.e., waits) until the launch time is reached. After transmitting the data (e.g., per one of operations 920, 935, and 955), the process 900 ends.

As further described below, the RSF of some embodiments uses a novel data retransmission scheme to ensure that transmitted data results are fully received at their destinations before discarding this data at the source GPU. In other words, the RSF of some embodiments buffers the transmitted result of a sender GPU's operation in the memory of the sender GPU until a confirmation is received that the data has been completely received at the RSF destination (e.g., at a receiving GPU or a receiving managed forwarding element). Hence, in these embodiments, the process 900 removes from the EPU memory the result of the EPU operation at 920, 935 or 955 only after receiving confirmation that the forwarding of the result was successful (i.e., the data message flow containing the result was fully received at the destination of this flow). During the operations 920, 935 and 955, the process 900 maintains the data in the EPU memory until it receives confirmation of the successful completion of the data transfer so that it can resend any missing data in case one or more data messages of the transmitted flow were not received at the RSF destination, as further described below.

Buffering the EPU-generated data in the EPU memory is highly advantageous as it does not require buffering of data in the network fabric (e.g., in the forwarding elements) or at intermediate EPUs. Some topologies today buffer the data in the forwarding elements and/or in GPUs that are used to transition between inner and outer domains. Some embodiments avoid buffering at these intermediate nodes by buffering the data at the sender GPUs, sending the data from the sender GPUs only when the data is ready to be received, and discarding the data at sender GPUs only after receiving notification that the data has reached its destination.

The above-described approaches avoid creating congestion in the network by buffering at the sender GPUs until there is enough capacity to send the data to its destination and the destination is in a state to process this data. Also, by not discarding the data until a confirmation is received that the data has reached its destination, the data does not get lost and does not have to be inefficiently maintained at one or more intermediate nodes. These approaches make the RSF of some embodiments highly reliable for forwarding EPU computation results.

When a fault in the network is detected that causes the data not to reach its destination, the data is retransmitted by the EPI of the sender GPU through another path (as selected by the CP) and is only discarded once a confirmation is received that the data has reached its destination along its new path. This correction process to a detected fault in the network is completely automated and circumvents problems in the RSF that would prevent one GPU's result from reaching another GPU. The same scheme is followed for computations that are to be received and processed by the virtual GPUs of the managed forwarding elements, and for the computational results of the virtual GPUs of the managed forwarding elements.

As mentioned above, the CP processes of some embodiments do not provide the path(s) as a scheduling parameter after receiving a notification (e.g., at 940) from an EPI for reactively requested scheduling parameters. This is because, in some embodiments, the RSF control plane pre-computes paths from different source EPUs to different RSF destinations (e.g., different EPUs) and provides the paths as mapping records that map queue IDs (i.e., identifiers of communication queue pairs associated with RSF destinations) to EPI egress ports that are connected to the desired paths to the RSF destinations. The RSF control plane in these embodiments also provides to intervening MFEs mapping records that map the queue IDs (or a source-side generated tag as further explained below) to the egress MFE ports to ensure that the MFEs select the desired paths to the RSF destinations.

In some embodiments, these paths are precomputed, and updated based on telemetry data, by the RSO server cluster. In these embodiments, the CP processors of the first-hop MFE's of the EPU EPIs then (1) receive, from the RSO servers, mapping records that identify a precomputed path for each EPI port and each possible destination for data messages from this port, and (2) periodically receive updates to these mapping records (i.e., updates to these paths) based on collected telemetry data when such paths need to be updated. Each EPI then receives the mapping records that it should use, and updates to these records, from the CP processor of a first-hop MFE of the EPI.

In some embodiments, the RSO server cluster has different services that provide the different scheduling parameters. For instance, in some embodiments, the RSO server cluster has a topological service that computes the paths, a telemetry service that processes collected telemetry and provides this processed data to the topological service to possibly update the paths based on this data, and a scheduling service that computes the launch time and pacing rates for the forwarding of the results of the EPU operations. These services will be further described below.

Some embodiments encrypt the data messages exchanged between the EPIs and the managed forwarding elements (e.g., the managed switches), as well as between the managed forwarding elements, in order to make the network fabric between the EPUs a secure fabric. For each communication session between an EPI and a managed forwarding element, or between two managed forwarding elements, some of these embodiments encrypt the data messages based on the encryption keys of the two devices at the end of each of these sessions (i.e., the EPI and managed forwarding element, or the keys of the two forwarding elements). To do this, some embodiments use the Confidential Computing encryption paradigm.

Figure 10:
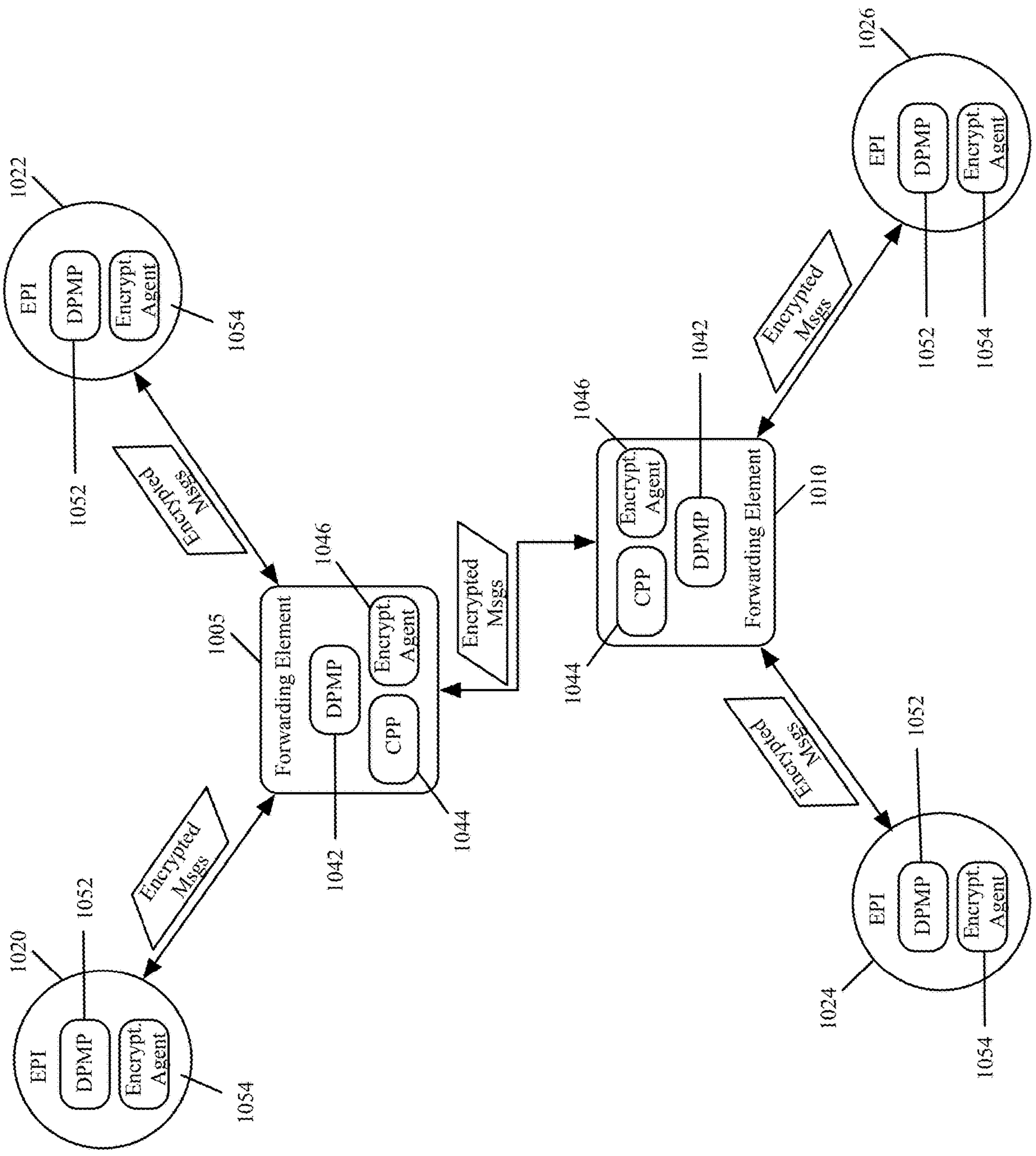
FIG. 10 illustrates an example of an encryption scheme used by some embodiments.

FIG. 10 illustrates an example of this encryption scheme. This figure illustrates two managed forwarding elements 1005 and 1010, each of which is a first-hop connection for two EPU EPIS (EPIs 1020 and 1022 for forwarding element 1005 and EPIs 1024 and 1026 for forwarding element 1010). The forwarding elements 1005 and 1010 are also first-hop connections of each other in the network (i.e., they can communicate without any intervening forwarding elements).

As shown, each of the forwarding elements 1005 and 1010 has (1) a data plane data message processor (DPMP) 1042 for processing data messages forwarded through the network, (2) a control plane processor 1044 for performing control plane operations, and (3) an encryption agent 1046 for encrypting and decrypting data messages forwarded through the network. Each EPI also has a DPMP 1052 for processing data messages forwarded through the network and an encryption agent 1054 for encrypting and decrypting data messages forwarded through the network. In some embodiments, the encryption agents are part of the data message processing pipeline of their respective DPMP (e.g., of the DPMPs 1042 for the encryption agents 1046, and of the DPMPs 1052 for the encryption agents 1054).

As shown, the encryption agents of each forwarding node (i.e., each EPI or forwarding element) encrypt and decrypt the data messages exchanged between each of the nodes in FIG. 10 that are one hop away from each other. In some embodiments, between each EPI and its forwarding element that is one hop away in the network, the encryption agents in some embodiment use the recipient node's public key to encrypt the data messages that they send to that node and use their own private key to decrypt the data messages that they receive from the other node. For instance, the encryption agent 1054 of the EPI 1020 uses the public key of the forwarding element to encrypt the data messages that it sends to the forwarding element 1005 and uses its own private key to decrypt the data messages that the EPI 1020 receives from the forwarding element 1005 (which are encrypted with the public key of the EPI 1020). Similarly, the encryption agent 1046 of the forwarding element 1005 use the public key of the forwarding element 1010 to encrypt the data messages that it sends to the forwarding element 1010 and uses its own private key to decrypt the data messages that the forwarding element 1005 receives from the forwarding element 1010 (which are encrypted with the public key of the forwarding element 1005). In this manner, the forwarding nodes that form the network fabric between the EPUs in some embodiments secure the node-to-node communications.

Figure 11:
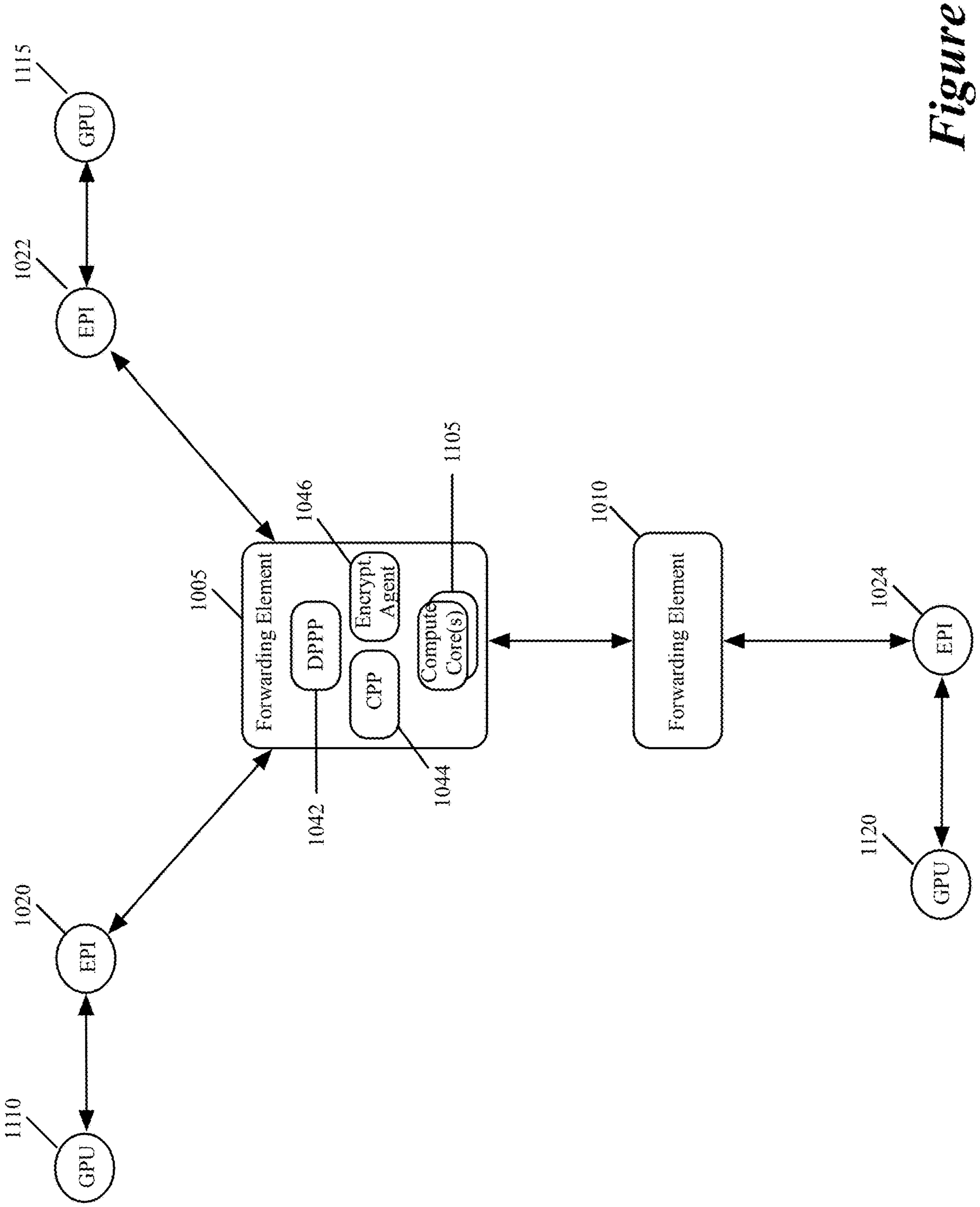
FIG. 11 illustrates that the managed forwarding element of some embodiments has a set of compute cores.

At each forwarding node, the data messages are decrypted in some embodiments. Hence, in these embodiments, each managed forwarding element can advantageously perform in-network computation on the EPU-operation results that are being transmitted through the network fabric securely in an encrypted fashion. To facilitate this in-network computation, some embodiments have a set of one or more compute cores (e.g., GPU cores, CPU cores, TPU cores, NPU cores, etc.) in each managed forwarding element. FIG. 11 illustrates that the managed forwarding element 1005 has a set of compute cores 1105. These compute cores are GPUs in some embodiments. The management plane of some embodiments exposes these GPUs as virtual GPUs in the network fabric for which a specific order of computations can be assigned through the scheduler (e.g., the logically centralized RSO server cluster) of some embodiments.

For instance, the scheduler can specify that the forwarding element's virtual GPU 1105 first add the result of two computations calculated by the GPUs 1110 and 1115 of EPIs 1020 and 1022, and then multiply the result of this addition with the result of a subsequent computation (i.e., a computation performed after the computations of the GPUs 1110 and 1115) calculated by the GPU 1120 of the EPI 1024. Hence, some embodiments refer to the GPUs of the forwarding elements as virtual GPUs as their operations can be explicitly scheduled to occur at specific times and in specific orders. There is no such ordering of operations in currently used in-network computing schemes.

The network fabric of some embodiments is not only encrypted and secure, but also can be configured to support multi-tenancy. The CP processors 860 of the forwarding elements and/or CP proxy servers 805 configure the EPIs over encrypted network interconnects (network links) to support multi-tenancy. Some embodiments achieve hardware multi-tenancy by restricting endpoint access to certain subset of clusters. This access restriction is programmed into the EPI's by the CP processors of the first-hop managed forwarding elements. In some embodiments, the bare metal hosting assigns only one tenant to an endpoint. The data is forwarded through an EPI in some embodiments will only be forwarded to EPI's in the same virtual cluster. The control of these EPIs is configured through one or more of their first-hop managed forwarding elements.

Figure 12:
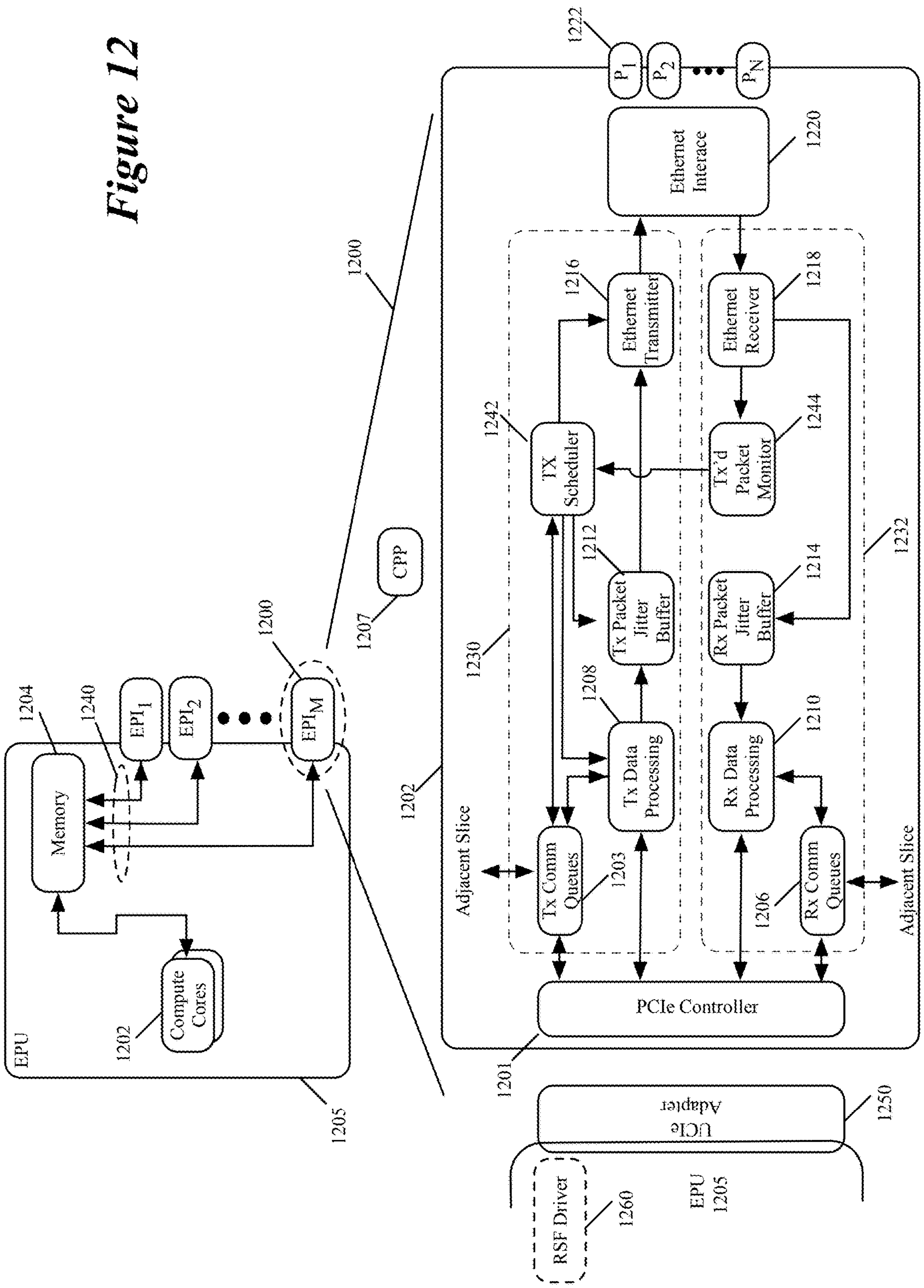
FIG. 12 illustrates one example of an EPI tile of some embodiments.
Figure 14:
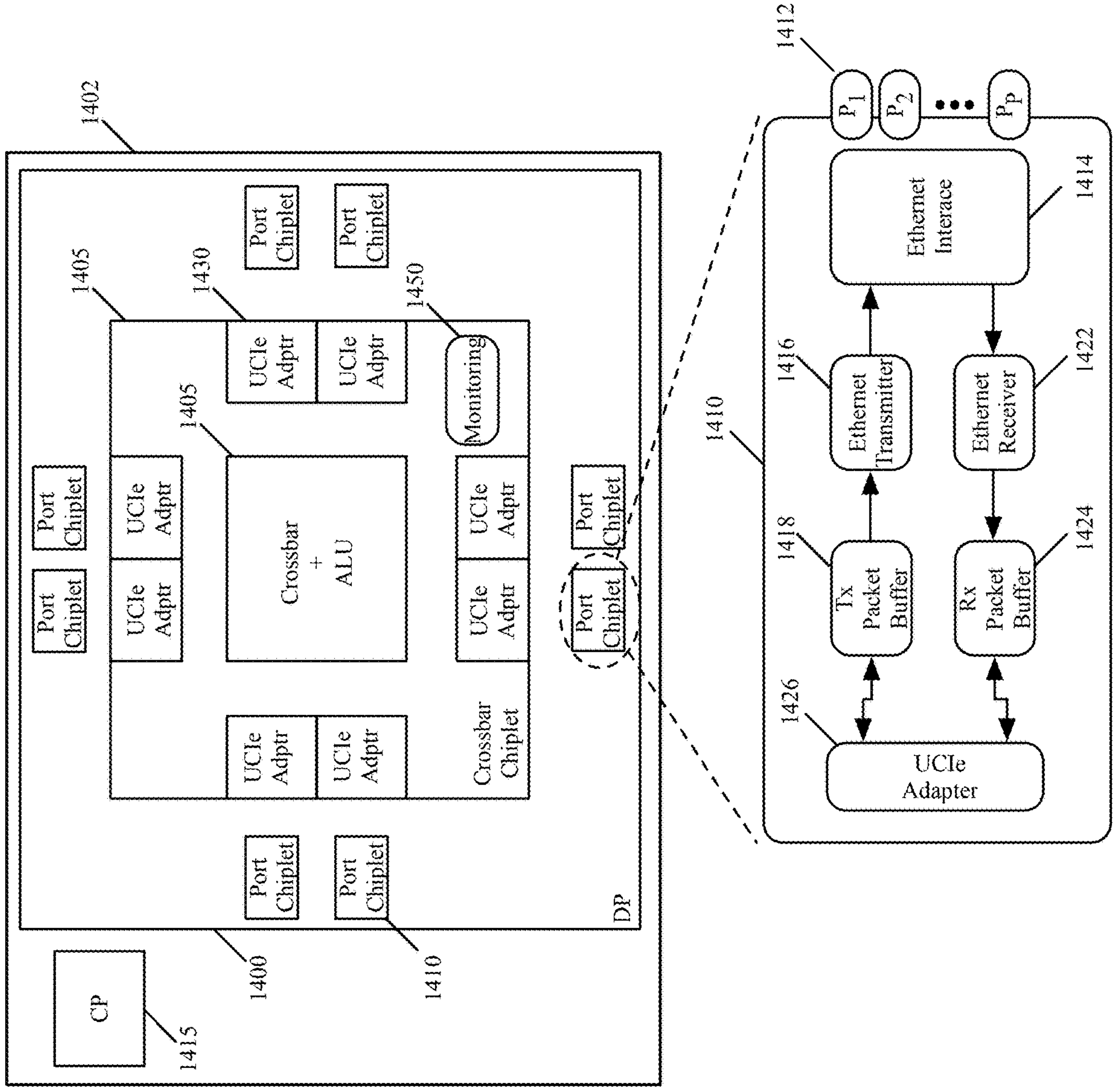
FIG. 14 illustrates an example of a switch tile of some embodiments.

Some embodiments use a tile construct to allow deployments to use EPUs with a custom number of m EPI tiles and managed switches to have a custom number of s switch tiles, where m and s can be any integer and can be the same or different. FIG. 12 illustrates one example of an EPI tile 1200, while FIG. 14 illustrates an example of a switch tile 1400. In FIG. 12, the EPI tile 1200 is one of M (e.g., 5, 8, 16, etc.) EPI tiles of an EPU 1205. Each EPI tile has N ports 1222 (e.g., 8 ports) to provide the EPU with M*N ports (e.g., 40 ports) that connect the EPU to the rest of the EPU network fabric.

In some embodiments, each EPU 1205 is on its own IC die, and each EPI tile 1200 includes (1) an ASIC chiplet 1202 that implements the EPI's data plane circuit and (2) a CP processor 1207 that implements the EPI's control plane circuit. In some embodiments, the EPI tiles are in one or more chip packages. For instance, in some embodiments each EPI is in its own chip package, while in other embodiments multiple EPIs are in each chip package (e.g., are placed on a common substrate and covered by a chip cap). In some embodiments that have multiple EPI tiles in one or more chip packages, the EPI chips are placed on the same motherboard or in the same device housing as the EPU 1205, and connect to the EPU through a local bus (such as PCIe).

In other embodiments, the EPU and its M EPI chiplets are placed in one IC chip package (e.g., the EPU die and M EPI chiplets are placed on a common substrate and covered by one chip cap). In some such embodiments, X EPUs (e.g., 4 EPUs) along with their M associated EPI tiles are packaged together in one IC chip package. All X EPUs within one chip package in some embodiments operate in the same memory domain, with each EPU's memory 1204 viewed as a different slice of this common memory domain. In some of these embodiments, EPUs that are in different chip packages are part of different memory domains. EPUs in different chip packages do not need to share memory domains as the EPIs implicitly perform memory address translations as part of their serializing and deserializing of the data that is transmitted between the EPUs through the network fabric.

As shown, each EPI 1200 includes a PCIe controller 1201, a set of transmit side processing circuits 1230, a set of receive side processing circuits 1232, and an Ethernet interface 1220. Each set of processing circuits 1230 or 1232 includes (1) a data processing pipeline 1208 or 1210, (2) a data message jitter buffer 1212 or 1214, (3) a transmitter 1216 or receiver 1218, and (4) transmit/receive (TX/RX) communication queue pairs (QP) 1203 or 1206. The transmit side processing circuits also include a transmit scheduler 1242, while the receive side processing circuits include a transmitted data message monitor 1244 in some embodiments.

Through the PCIe controller 1201, an EPI 1200 interfaces with a UCIe interface 1250 of the EPU in order to communicate with its associated EPU, to read and write data from and to the EPU's memory 1204 through a network-on-chip (NOC) 1240 of the EPU, and/or to exchange commands/instructions with the EPU, etc. The TX/RX communication QPs 1203 and 1206 include several pairs of queues through which the EPU and EPI exchange messages. In some embodiments, these messages include notifications from the EPU that it has completed a computation and stored the result of this computation at a particular location in its memory 1204. As shown, the QPs 1203 and 1206 are also used in some embodiments by each EPI 1200 to communicate with other EPIs of its EPU. In some embodiments, each pair of receive (RX) and transmit (TX) queues store pointers to data that either needs to be sent (TX) or has been received (RX).

For an operation performed by an EPU, the EPU in some embodiments specifies at least one queue pair for the EPU and EPI to use to communicate regarding this operation. For instance, when the EPU completes an operation associated with a QP, the EPU uses the transmit queue of the pair to communicate regarding the availability of results of the EPU's operation for transmission, e.g., the EPU in some embodiments stores a pointer in the transmit queue to a memory location in which the EPU has stored the result of its operation. Each queue pair in some embodiments is associated with a particular destination for the result of the EPU's operation.

Some embodiments use the existing DMABUF construct to specify the memory location that stores the transaction result of a source EPU's operation that needs to be transmitted to a destination (e.g., a destination EPU) in the RSF network. In these embodiments, the pointer in the transmit queue identifies the DMABUF location for the destination that needs to receive the result of the transaction. In some embodiments, the transmit queue is associated with the destination as well. In this manner, the source EPU stores the result of its transaction in a DMABUF location in memory that is identified by a pointer in the TX queue 1203 that is associated with the RSF-network destination that needs to receive this transaction's result. The EPI data plane circuit then retrieves the result from this location, "packetizes" or "segments" the result, and sends this result to the destination (i.e., generates a data message flow with one or more data messages each of which stores a portion of this result in its payloads, and transmits this data message flow to the destination).

In some embodiments, an RSF driver 1260 on the EPU is the EPU resource that selects the queue pair for an EPU operation, and this driver selects the queue pair based on the RSF destination that needs to receive the results of the EPU operation. This driver in some embodiments has hooks into the EPU's OS to receive notifications each time that an operation has been assigned to the EPU. This driver is configured by the RSF control plane to have a list of queues for a list of possible destinations in the RSF for transmitting the results of the EPU operations. When the driver receives a notification that its EPU has been assigned an operation that has its result intended for a particular RSF destination, the driver 1260 allocates the queue pair associated with this destination for an EPI that it will use to send at least a portion of this result to the particular destination. The driver then subsequently (1) writes a pointer that identifies the memory location that stores the portion of the result (which can be the entire result or only a part of the result) that the EPI needs to forward and (2) reads messages from the EPI regarding this operation (e.g., regarding the transmission of the results of this operation).

The transmit scheduler 1242 of the transmit side processing 1230 performs the above-described EPI scheduler operations. These include detecting that the EPU has stored in a transmit communication queue 1203 a new pointer that identifies the memory location storing the results of an EPU computation, performing the above-described scheduling assessments (e.g., the operations described above by reference to FIG. 9), and communicating with the next-hop CPP to obtain scheduling parameters when such parameters are needed.

After the EPU completes an operation and indicates the completion of this operation for the TX scheduler by storing a message in the TX communication queue 1203 for the operation, the TX scheduler 1242 uses the scheduling parameters that a CP scheduler in the RSF has specified for the operation to direct the TX data processor 1208 (1) to retrieve the results from the memory location identified by the pointer at the appropriate time (e.g., at the scheduled launch time), (2) to format this data into data messages, (3) if needed, to perform one or more other data message processing operations on the data messages that are to be transmitted, and (4) to store the data messages in the transmit-side (TX) data message jitter buffer 1212.

The TX jitter buffer 1212 in some embodiments has multiple FIFOs, each associated with a different queue ID for temporarily storing the results of different operations associated with the different queue IDs. In other embodiments, the TX jitter buffer 1212 does not have different FIFOs associated with different queue IDs, as each data message flow from the TX data processor 1208 is associated with a different queue ID.

The data messages are stored in the TX jitter buffer 1212 for short durations in order to avoid jitter in the data message transmission (e.g., due to GPU operational delay). A short period after directing the TX data processing pipeline 1208 to retrieve the result of an EPU operation from memory and to store this result in the TX jitter buffer 1212, the transmit scheduler 1242 then directs the TX jitter buffer 1212 to output the data message flow that contains this result from one of the buffer's FIFOs (e.g., from the FIFO associated with the queue ID of the operation) to the Ethernet transmitter 1216.

The TX jitter buffer 1212 in some embodiments outputs the data message flow with a source-assigned tag to use for forwarding the data message flow to the flow's destination (e.g., to a destination EPU or to a destination switch that performs an in-network computing operation on the data message) in the RSF. For instance, in some embodiments, this tag is used to identify an egress port for an EPI to use to forward the flow, and is also used by the MFEs (e.g., the managed switches) as a source-forwarding identifier to perform tag-based forwarding of the data message flow through the RSF to its desired destination.

In other embodiments, the RSF driver 1260 generates this tag and associates it with the data that is stored in the memory 1204. In these embodiments, the TX data processor 1208 or TX jitter buffer 1212 associates the driver-generated tag with the data message flow that is used to transmit the data stored in the memory 1204. In other embodiments, the TX data processor 1208 or TX jitter buffer 1212 generates this tag and associates the tag with the data message flow.

In some embodiments, the source-assigned tag accompanies each forwarded data message of the flow, while in other embodiments, the tag does not accompany each forwarded data message of the flow. For instance, in some embodiments, the tag is provided on a per flow basis (e.g., provided in one or more headers of an initial set of one or more data messages of the flow), while in other embodiments, the tag is provided on a per data message basis (e.g., is inserted in the data message header or an encapsulation header that encapsulates each header of each data message of the flow).

The tag, in some embodiments, includes or is accompanied by the queue ID, or is used to identify the queue ID. As mentioned above, the queue ID in some embodiments (1) is the identifier (e.g., a single identifier or a pair of identifiers) of the communication queue pair 1203/1206 used for communications between the source EPU and source EPI or is based on this communication queue pair, and (2) is associated with the RSF destination (e.g., an ingress port of a destination EPU or switch) of the flow. The queue ID in other embodiments is just the identifier of the transmit-side communication queue 1203. More generally, in some embodiments, the queue ID is based on both the source and destination endpoints. For instance, the queue ID may be based on one source EPU and one or more destination EPUs, one source EPI and one or more destination EPIs, or one or more source EPIs and one or more destination EPIs.

In some embodiments, the tag includes or is accompanied by the source EPU's identifier to allow the RSF to perform different tag-based forwarding for the same tag's use by different source EPUs. In other embodiments, the tag does not include the source EPU's identifier. Also, in some embodiments, the tag identifies, includes, or is accompanied by the segment ID to allow multiple EPIs of an EPU, and/or multiple ports of the same EPI, to send different segments of the computed result from the memory location identified by the EPU-provided pointer. The tag in some embodiments further includes or is accompanied by a transaction identifier to identify the transaction (e.g., Send, Receive, Write, Read, etc.) being performed by the data message flow.

The Ethernet transmitter 1216 uses the provided tag (i.e., tag provided for the data message flow by the TX jitter buffer 1212) to identify the physical port 1222 from which the data message flow should exit the EPI. The EPI ports (e.g., ports 1222) in some embodiments are traditional network ports (e.g., Ethernet ports).

When providing scheduling parameters to the Ethernet transmitter 1216 for a given queue ID, the RSF's CP scheduler provides a mapping from the tags (e.g., the queue ID and the EPU ID) to the physical ports 1222. The CP scheduler in some embodiments provides this set of scheduling parameters for a queue ID to an EPI when the CP scheduler performs the scheduling for a particular EPU's operation (e.g., whether pre-scheduling the operation or in response to a notification from the EPI that the operation has been completed and needs to be scheduled). The physical ports that are provided in the different sets of scheduling parameters for the different EPI ports are based on paths that are computed by the RSF CP scheduler between the different ports of an EPI of a source EPU and a destination in the RSF (e.g., a destination EPU in the RSF).

Alternatively, in other embodiments, the mapping records that map the tags to the ports are provided by the RSO server cluster's topological services (as opposed to its scheduling services) and are provided separately from the scheduling parameters that are provided by the scheduling services of the RSO server cluster and the CP processors/proxy servers. The topological services of the RSO server cluster can distribute updated mapping records when this cluster updates one or more records to modify the paths used by the EPI based on collected and analyzed telemetry date.

For a data message flow that it retrieves from the transmit jitter buffer 1212, the Ethernet transmitter passes the identified port ID to the Ethernet interface, which then uses this port ID to identify the physical port 1222 from which it should send the data messages. The Ethernet interface performs framing operations and then provides the data message to the serializer/deserializer (SERDES) associated with the identified physical port 1222. The SERDES performs the serialization operation and then forwards the data message along its associated physical port.

The receive side processing starts with the Ethernet interface 1220 receiving data messages from the physical ports 1222 of the EPI. This interface 1220 passes these data messages to Ethernet receiver 1218, which stores them directly in the receive side data message jitter buffer 1214 or indirectly in this buffer through the transmitted data message monitor 1244. The transmitted data message monitor 1244 analyzes the received data messages to extract in-band control messages, including messages that either indicate the successful or failed transmission of all of the data messages of a flow (1) at their destination or (2) at each hop along the path to the destination.

The data message monitor 1244 then provides the appropriate success or failure message to the transmit scheduler 1242, so that this scheduler can either direct the EPU to delete the data from its memory or to initiate a re-transmission of the flow for each missing segment. In some embodiments, the transmit scheduler 1242 directs the EPU to delete the stored results after receiving a message from the transmitted data message monitor 1244 that all of the transmitted data messages for each transmitted segment of the results have been received at each hop along the path(s) to the destination in the RSF.

If any segment has failed to transmit, the transmit scheduler in these embodiments re-initiates the transmission of the flow for that segment. In some such embodiments, this re-transmission is a high priority transmission that the transmit scheduler prioritizes over other new or ongoing transmission flows. In other embodiments, the transmit scheduler 1242 only assesses the successful reception of each segment of the transmitted result at the RSF destination for these results. In some embodiments, the transmitted data message monitor is implemented as one or more stages of the receive data processing pipeline 1210. Also, in some embodiments, the transmit- and receive-side data processing pipelines 1208 and 1210 use the same set of data message processing stages.

Like the transmit side buffer 1212, the receive side buffer 1214 stores the received data messages for a short duration in order to avoid jitter in the data message reception rate. The receive side data processing pipeline 1210 retrieves data messages from the receive side data message jitter buffer 1214, performs data message processing operations in two or more data message processing stages of this pipeline, and then extracts and stores the payloads of these data messages in the appropriate queues of the receive QP 1206 for subsequent storage in the EPU's memory through the PCIe controller 1202 and the UCIe adapter 1250.

In some embodiments, the RSF driver 1260 is a driver executing on the control CPU of the EPU 1205. The control CPU in some embodiments performs control operations for the EPU 1205. For instance, when multiple EPUs reside in one housing, the control CPU performs high level coordination operations for the EPUs (e.g., delegates tasks among the EPUs). The control CPU communicates with its associated EPU(s) through a high speed interconnect, such as PCI or NVLink. Instead of using the driver 1260, other embodiments use another software or firmware process of the EPU 1205 to detect when the EPU has completed an operation (e.g., executed a transaction) and has stored the computed result of this operation (e.g., stored the result of the executed transaction) in the memory 1204. For instance, other embodiments use an EPU kernel process (e.g., a function executing on a group of processor cores (e.g., a streaming multi-processor) or control unit of EPU) to detect that the EPU has stored the computed result of an operation in the memory 1204.

Also, the embodiments described above by reference to FIG. 12 use a pull model to provide the result of a computation of the EPU 1205 to an EPI 1200. In this model, the RSF driver 1260 (or an EPU kernel process) writes to a communication queue the location in the memory 1204 that stores the computation result. The EPI polls (in a pull model) these communication queues to determine that the EPU has completed an operation and can then retrieve the result from the identified location in the memory. Instead of using a pull model, other embodiments use a push model in which a software or firmware process of the EPU (e.g., an EPU kernel) or a control unit (e.g., CPU) of the EPU notifies (e.g., as an interrupt or other notification) the EPI (e.g., the CP processor 1207 of the EPI) that the location in memory 1204 has been written to the communication queue (or the EPI is automatically notified based on the writing of the location in memory to the communication queue. In either case, the EPI can then retrieve the result data from the identified memory location. Still other embodiments use other low-level hardware, firmware, and/or software communication between the EPU and EPI to notify the EPI when the EPU has completed an operation and/or to provide this operation's result to the EPI to forward through the network.

Figure 13:
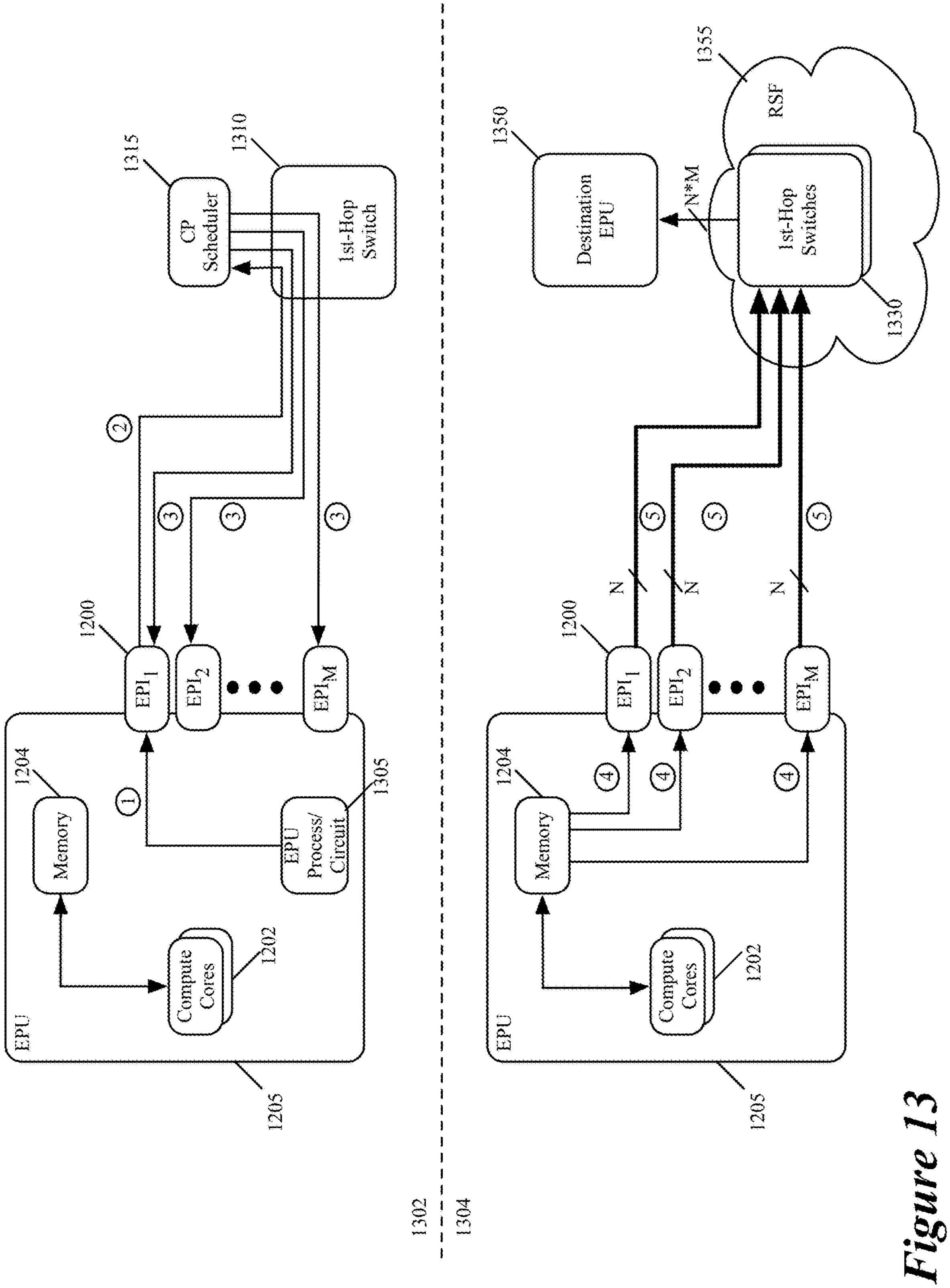
FIG. 13 illustrates using different ports of several EPIs to transmit in parallel to a destination EPU the result of one operation performed by a source EPU.

FIG. 13 illustrates that the CP scheduler of some embodiments can use the different ports 1222 of the EPIs 1200 of an EPU 1205 to transmit in parallel to a destination EPU 1350 the result of one operation performed by the EPU 1205. For purposes of clarity, the example in this figure is shown in two stages 1302 and 1304, each showing a different set of operations.

As shown in the first stage 1302, the scheduling in this example starts with an EPU process or circuit 1305 notifying an EPI ($EPI_1$) of the EPU 1205 that the compute cores 1202 of the EPU have completed an operation, and the result of this operation has been stored at a particular address in its memory 1204. This notification also specifies the amount of data stored in the particular address. In some embodiments, the EPU is a GPU or TPU and its compute cores are cores with vector or matrix ALUs that are optimal for vector or matrix computations.

Through its first-hop switch 1310, $EPI_1$ notifies its CP scheduler 1315 in the RSF network that the EPU 1205 has completed its operation, as well as the amount of data stored as a result of this operation. In some embodiments, the CP scheduler 1315 executes on the control plane processor (CPP) of the EPU's first-hop switch 1310, or a CP proxy server through this CPP. In other embodiments, the CP scheduler 1315 executes on the CPP of the last-hop switch on a path to the destination EPU 1350 (i.e., a first-hop switch of the destination EPU 1350), as further described below. In some embodiments, the CP scheduler 1315 (1) divides the stored data into several segments and for each segment, (2) generates a set of scheduling parameters for different EPIs of the EPU to use to retrieve data from the EPU's memory 1204, and (3) provides these sets of scheduling parameters to the different EPIs (e.g., directly when the switch CPP executes the CP scheduler, or indirectly through this CPP/switch when the CP scheduler executes on a CP proxy server).

In some of these embodiments, the CP scheduler 1315 specifies for each particular EPI the number of segments that the particular EPI has to read out, the ports of that EPI that the particular EPI has to use, and the segment number that identifies each segment assigned to the particular EPI to read out. Each EPI then uses each assigned segment's number and the total number of segments to identify each memory segment that the EPI has to read out. Other embodiments perform this scheduling differently. For instance, in other embodiments, the CP scheduler 1315 provides the scheduling parameters for all the EPIs to $EPI_1$ (e.g., the EPI that sent the notification to the CP scheduler 1315), which then passes all the scheduling parameters to all of the other EPIs that have to read out the data. Yet other embodiments use other techniques to identify for each EPI the segment that the EPI has to read out.

In the example of FIG. 13, the scheduling parameters to the different EPIs direct the EPIs to stream out their respective segments along all of their ports. Hence, these parameters not only load balance the result of the operation along several EPIs but also along all of the available ports of all of the EPIs. Accordingly, instead of reading out this data as one flow that is sent along one port of one EPI, the data is read out along all the ports of several EPIs of the EPU.

The second stage 1304 of FIG. 13 illustrates the EPIs retrieving their respective segments from the memory 1204. It also shows each EPI streaming the data in its retrieved segment or segments in the data message payloads of N sub-flows that the EPI transmits in parallel along its N ports and that traverse through the intervening RSF 1355. When the EPU has 5 EPIs each with 8 ports (i.e., when M equals 5 and N equals 8), the memory read out can be load balanced across all the ports of all the EPIs, i.e., can be transmitted along 40 ports (8 ports of each of the 5 EPIs) in parallel. The different EPIs can have same or different $1^{st}$ hop switches 1330 in the RSF, and their paths can traverse the same or different number of hops (i.e., intervening forwarding elements) within the RSF to the destination EPU 1350.

In the example of FIG. 13, the CP scheduler 1315 precomputes the path from each port of each EPI 1200 to the destination EPU 1350 before receiving the scheduling request from $EPI_1$, and provides mapping records associated with these paths to the EPIs to use in forwarding their data message flows. As mentioned above and further described below, the RSO server cluster 410 in other embodiments precomputes these paths and passes the mapping records to the EPIs through the first-hop MFE(s) of the EPIs. Upon receiving the scheduling request from $EPI_1$, the CP scheduler 1315 in these embodiments does not identify the paths but identifies the launch time and pacing rate.

In some embodiments, in addition to precomputing a path from each EPI port of a source EPU to each RSF destination, the CP scheduler 1315 or the RSO server cluster 410 also precomputes a path for each intervening forwarding element used by each EPI port to reach the RSF destination, and provides next-hop source-routing forwarding rules (e.g., mapping records that map source-specified tags to next hop egress ports) to each intervening forwarding element. The intervening forwarding elements then use the source-routing tags that are added at the source EPI to each data message flow. In some embodiments, while the intervening switches receive these source-routing forwarding rules, they do not receive the pacing rates and launch times.

In some embodiments, the CP scheduler computes the launch time and/or pacing rate on a per port basis. The example of FIG. 13 is an example of a bulk transfer that needs to be scheduled in real time. As mentioned above, the RSF CP scheduler of some embodiments also preschedules some transfers for small, high priority data for immediate transmission, while prescheduling other bulk transfers for transmission after a particular launch time and at a particular transmission rate.

The load balancing operation illustrated in FIG. 13 is just one example of a load balancing operation that the CP scheduler of some embodiments can perform. Many other examples of such load balancing operations exist. For instance, when the computational results from multiple EPUs have to be sent to another EPU, the CP scheduler can provide scheduling parameters to the different EPUs to ensure that the flows from these EPUs are spread along different paths to reach the other EPU and/or are sent at different times to reach this other EPU. The CP scheduler can also schedule different EPIs of the same EPU to send the results of different operations of the EPU concurrently or independently (e.g., without one operation's result from blocking the transmission of the other operation's result).

In the example of FIG. 13, the CP scheduler 1315 in the RSF network reactively schedules the EPIs 1200 of an EPU to forward to the destination EPU 1350 the result of the source EPU's operation in parallel along multiple paths through the RSF. For the result of another operation (i.e., another transaction) computed by the source EPU 1205, the RSF CP (e.g., the RSO server cluster) in some embodiments can proactively preschedule multiple EPIs 1200 to perform the parallel forwarding (also called streaming) of the result of this operation along multiple paths through the RSF. In some of these embodiments, the RSF CP (e.g., the RSO server cluster) can pass the proactively specified scheduling parameters to be provided to the EPIs of the EPU through the first-hop MFE(s) of these EPIs.

FIG. 14 illustrates an example of a switch tile 1400 that some embodiments use to implement an inter- or intra-cluster switch 1402. As shown, the switch tile 1400 includes one crossbar/ALU chiplet 1405 and eight port chiplets 1410. These components, along with CP components 1415, form a switch 1402 of some embodiments. The CP components 1415 include a CP processor and memory storing CP programing for implementing the control plane of the switch 1402. The crossbar/ALU chiplet 1405 includes a crossbar switch fabric to interconnect the port chiplets and an ALU for performing in-network computing operations within the switch. In some embodiments, the ALU also collects statistics used in monitoring an EPI-transmitted segment's flow through the switch. In other embodiments, this monitoring is performed by a separate monitoring circuit 1450. In still other embodiments, this monitoring circuit 1450 is part of the data message processing of the crossbar.

As shown, the crossbar/ALU chiplet 1405 includes eight UCIe adapters 1430 for interfacing with the eight port chiplets 1410. Each port chiplet 1410 has (1) P (e.g., 144) physical ports 1412 of the switch, (2) an Ethernet interface 1414, (3) an Ethernet transmitter 1416, (4) a transmit data message buffer 1418, (5) an Ethernet receiver 1422, (6) a receive data message buffer 1424, and (7) a UCIe adapter 1426. The physical ports 1412 of the switch transmit and receive data messages for the switch. The physical ports in some embodiments use SERDES macros that perform serialization/deserialization operations for transmitted data messages and received data messages respectively.

The Ethernet interface 1414 operates as the interface between these SERDES ports and the Ethernet transmitter and receiver 1416 and 1422, in order to pass transmitted data messages from the transmitter 1416 to these ports and to pass received data messages from these ports to the receiver 1422. The Ethernet transmitter 1416 retrieves data messages stored in the transmit data message buffer 1418 and provides these data messages to their destination ports 1412 through the Ethernet interface 1414. The transmitted data messages are received from the crossbar chiplet 1405 through the UCIe adapters 1430 and 1426. Conversely, the Ethernet receiver 1422 receives data messages from the ports 1412 through the Ethernet interface 1414 and stores these data messages in the receive data message buffer 1424. The received data messages are retrieved from the receive data message buffer 1424 and supplied to the crossbar chiplet 1405 through the UCIe adapters 1426 and 1430.

As noted above, the managed forwarding elements of some embodiments include intra-domain switches (e.g., rack switches connecting EPUs operating on the same rack) and inter-domain switches (e.g., rail switches connecting EPUs operating on different racks) that connect EPUs between their respective EPIs. Some embodiments define the switches within a domain as "scale up" or "rack" switches for scaling up the capacity within a domain (e.g., within a chassis, row, or datacenter rack) and the inter-domain switches as "scale out" or "rail" switches for scaling out capacity across domains (e.g., across racks) within a datacenter. The EPUs within the same domain are said to be in the same EPU cluster. In some embodiments each EPU in the same cluster is only one switch hop away (<1 microsecond) via an inner network (i.e., the domain described above).

Figure 15:
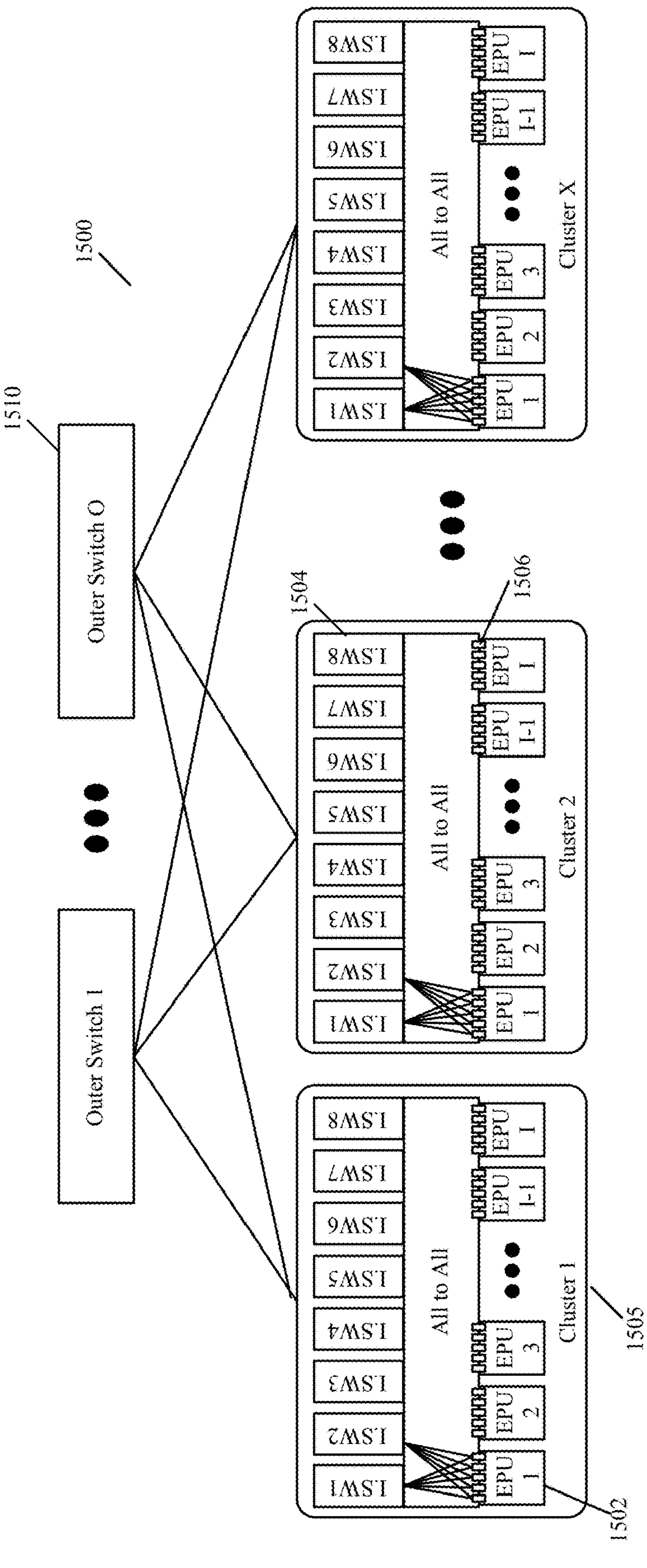
FIG. 15 illustrates one example of the network fabric between X clusters of EPUs.

FIG. 15 illustrates one example of the network fabric 1500 between X clusters 1505 of EPUs. In this example, each cluster has I EPUs 1502 and 8 intra-cluster switches 1504 (also referred to as inner switches or leaf switches). In other embodiments, different clusters have different numbers of EPUs and/or different numbers of intra-cluster switches than those illustrated in FIG. 15. The inner switches are TOR switches in some embodiments, are middle of the rack switches in other embodiments, back of the rack switches in yet other embodiments when two racks of EPUs are placed back-to-back, and corner of the rack switches in still other embodiments that abut two or more clusters of EPUs at corner vertices of racks.

Each EPU also has M EPIs 1506, with each EPI having several ports (e.g., 8 ports). Each port of each EPU EPI in this example connects to each inner switch of the EPU's cluster through an Ethernet cable (e.g., a cat6 cable). In other embodiments, different EPUs have different number of EPIs and/or different number of ports per EPI than those illustrated in FIG. 15. Furthermore, in other embodiments, the EPI ports may connect to the inner switches through other types of wired or wireless connections.

In addition to the EPIs 1506 and the inner switches 1504, the network fabric 1500 includes O outer switches 1510 (also called spine switches). As shown, each inner switch connects to each outer switch so that there is a full mesh between the inner and outer switches. The inner switches 1504 serve as first-hop leaf switches, while the outer switches 1510 serve as spine switches that are inter-cluster switches that connect different leaf switches, in order to connect different EPU clusters. In some embodiments, the outer switches are optical switches and the links between the inner and outer switches include optical connections. Each intra-cluster switch in some embodiments connects to each inter-cluster switch through a physical network link, while in other embodiments each intra-cluster switch connects to each inter-cluster switch through a physical network link. In some embodiments, the copper-to-optical link subscription ratio is N (e.g., 10, which signifies that the network fabric 1500 has 10 copper Ethernet cables for each 1 optical cable).

The network fabric 1500 of FIG. 15 enables any EPU in one domain (e.g., EPU 1 of cluster 1) to connect to another EPU in another domain (e.g., EPU 3 of cluster 2) through three switch hops, with two of these switches being one intra-cluster switch in each of the domains (e.g., I.SW1 of cluster 1 and I.SW3 of cluster 2) and the third switch being an inter-cluster switch (e.g., outer switch 1) that connects the two intra-cluster switches in the two domains.

In some embodiments, the EPIs can perform striping operations to forward individual EPU computation results along two or more paths through the RSF network 1500.

When an EPU's set of one or more EPIs perform such a striping operation for a result computed by the EPU, the striping operation can distribute the RSF-network load for sending this result to its intended destination(s) among various paths through the network. This load distribution, in turn, can provide multiple secondary benefits, such as allowing the result to reach a destination faster, creating fewer congested nodes (e.g., MFEs or links) in the network, etc.

Performance of the striping operations by the EPIs also relieves the intra- and inter-cluster switches from performing such striping operations, which at the switches typically involve performing resource-consumptive hash computations or other computations to distribute the flows along different paths. Relieving switches from performing striping operations in some embodiments is combined with the source-assigned, tag forwarding operations of these switches in some embodiments, which relieves the intra- and inter-cluster switches from performing L2 and L3 learning operations (such as ARP, BGP, etc.). Relieving these switches from performing computations for striping operations and from performing learning operations allows these switches in some embodiments to be just dedicated fast-switching devices that perform fast forwarding operations based on source-side assigned tags.

Figure 16:
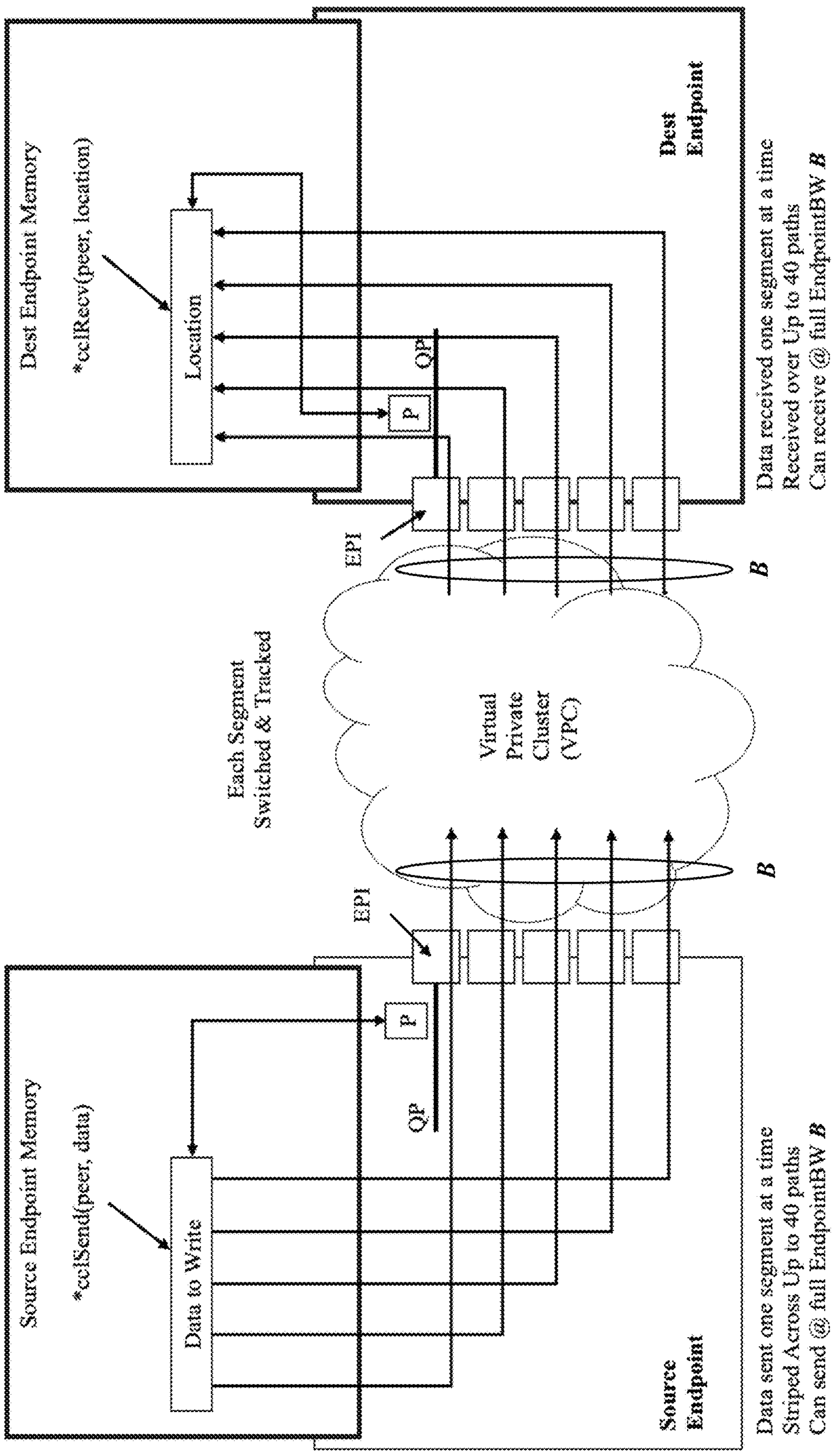
FIG. 16 illustrates how an existing data exchange operation (send/recv) is carried over a tiled set of EPIs to fully utilize the endpoint Bandwidth.

FIG. 16 illustrates how an existing data exchange operation (send/recv) is carried over a tiled set of endpoint Interfaces (EPIs) to fully utilize the endpoint Bandwidth B. The peer variable on both sides maps to their respective remote EPU and is assigned a Queue Pair (QP) used to send and receive data between these two endpoints (i.e., two EPUs). When the source endpoint issues *cclSend( ) the transmit queue associated with that remote endpoint has a descriptor with a pointer to the data to send. This Task is scheduled in some embodiments by the RSF CP scheduler to take 40 different paths simultaneously, eight paths per EPI, utilizing the full bandwidth B available between these two endpoints.

Segment striping in some embodiments is transmission in parallel across available paths one segment at a time. At the destination, an entry in the receive queue in some embodiments tracks each segment as it is placed directly into the memory space of the destination endpoint. When all segments are received the transfer is complete and both endpoints are notified. If any segments are lost or corrupted, the RSF CP scheduler in some embodiments schedules new transfers to re-transmit the missing segments from source to destination. This retransmission of missing segments is handled by a novel transport layer protocol (TLP) of some embodiments.

In this manner, a single operation, such as a send or a write, can utilize the full bandwidth between endpoints. For instance, in FIG. 16, there are 40×200 GbE paths across 5 EPIs available enabling 8 Tb/sec of throughput. Using a segment size of 1 KB, and using all 40 paths simultaneously for each transfer, data as small as 40 KB can be sent between endpoints at 1 TB/sec in less than a microsecond.

Figure 17:
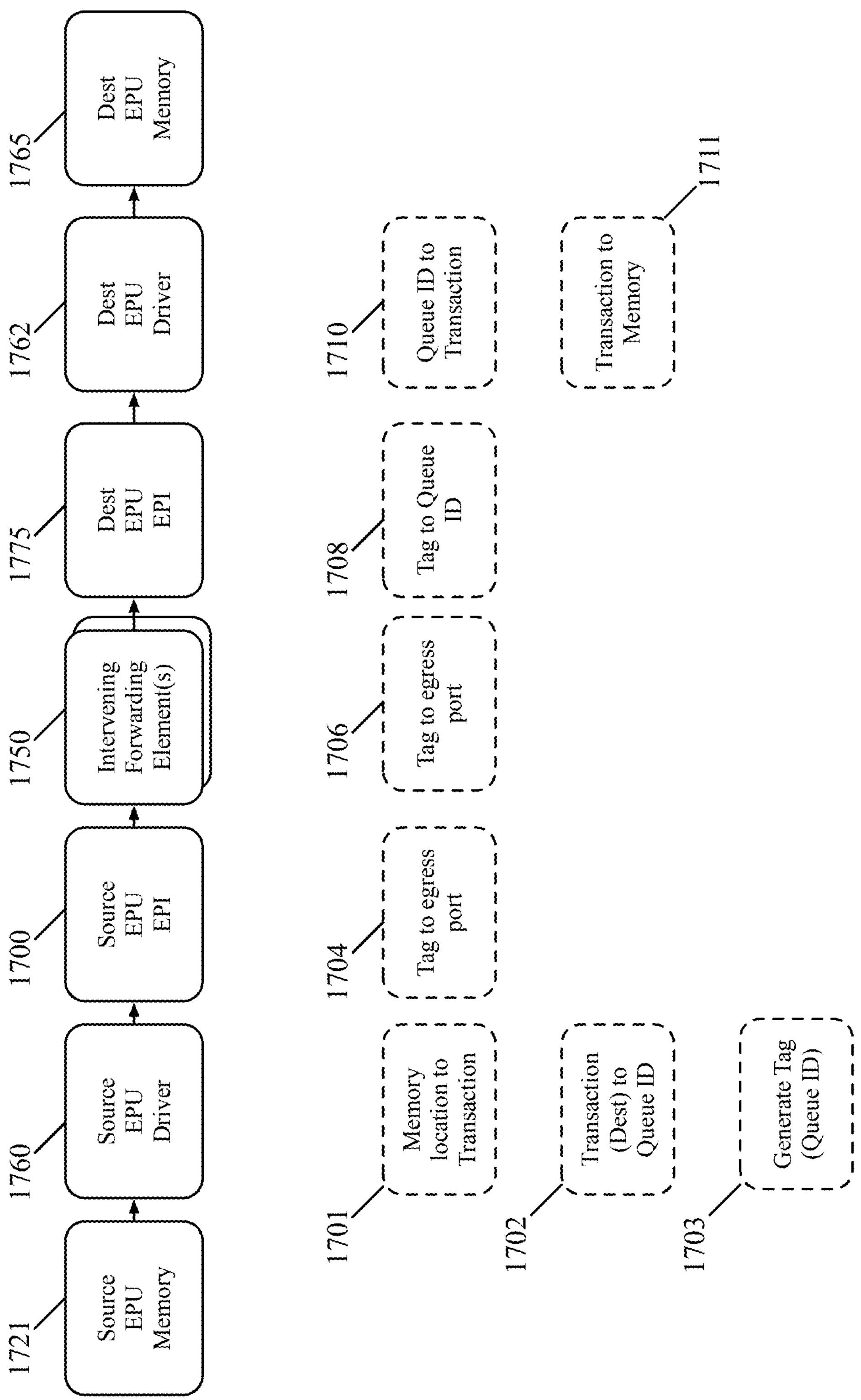
FIG. 17 illustrates an example of how some embodiments (1) generate, at a source EPU, a tag for a data message flow that is associated with a data transfer transaction, (2) use the source-generated tag to identify an egress EPI port for forwarding the flow to the RSF, and (3) use the source-generated tag to perform tag-based forwarding of the data message flow through the RSF to a destination EPU.

As mentioned above, some embodiments use source-assigned tags to forward data message flows to their destination (e.g., to a destination EPU or to a destination switch that performs an in-network computing operation on the data message) in the RSF. FIG. 17 illustrates an example of how some embodiments (1) generate, at a source EPU, a tag for a data message flow that is associated with a data transfer transaction, (2) use the source-generated tag to identify an egress port of an EPI of the source EPU to forward the flow to a managed forwarding element of the RSF network, and (3) use the source-generated tag to perform tag-based forwarding of the data message flow through the RSF network to a destination EPU, which can be a standalone EPU or an EPU that is part of a forwarding element of the RSF (e.g., a switch).

Specifically, this figure illustrates a driver 1760 of a source EPU performing a memory retrieval operation 1701 that reads a location in a source-side EPU memory 1721 that stores information about a transaction associated with an EPU operation. This memory location stores a transaction descriptor that describes the transaction and provides the length of data associated with this transaction. As part of the memory retrieval operation 1701, the driver generates a transaction identifier (ID), which specifies a specific data transfer transaction (e.g., a Read, Write, Send, or Receive transaction).

The driver then performs a mapping operation 1702 to map the transaction ID to a queue ID (e.g., a single identifier or a pair of identifiers) that identifies the communication queue pair for the EPU and its EPI to use to communicate regarding a flow for the data transfer transaction. The queue ID in some embodiments is associated with the source and destination of the flow (e.g., with the source-side EPU and the destination-side EPU, or with a source-side EPI egress port and a destination-side EPI ingress port). As such, the queue ID is used at both the source and destination sides in some embodiments for identifying communication queue pairs for communications between the RSF (e.g., the EPI) and the source- and destination EPUs.

As shown, the driver 1760 also performs a tag generation operation 1703 to generate a source-assigned tag for this flow. This tag in some embodiments includes the queue ID or data derived from the queue ID, while in other embodiments the queue ID or related derived data accompanies the tag. As mentioned above, this tag in some embodiments includes, or is accompanied by, other parameters as well, such as transaction ID, segment ID, etc. All of these parameters are populated in the tag by the driver 1760 in some embodiments, while in other embodiments some of these parameters are populated by the EPU's EPI. More specific examples of these tags will be described further below by reference to FIGS. 19 and 27.

As shown in FIG. 17, an EPI 1700 of the source EPU performs a mapping operation 1704 to map the tag to one of the EPI's ports to use as the egress port for forwarding the data message flow. In some embodiments, the egress port is connected to the first-hop switch through a physical link such as a wired connection (e.g., an Ethernet cable), a wireless connection, or an optical connection. The first-hop switch 1750 as well as any other intervening switch between the first-hop switch and the flow's RSF destination performs a mapping operation 1706 to map the tag (or a portion of the tag) to the switch port to use as the egress port for forwarding the data message flow to its next hop. In some embodiments, each of these egress ports is connected to the next hop through a direct physical link, such as a wire link, an optical link or a wireless link.

An EPI 1775 of a destination EPU receives each data message of the flow at one of its ports. This EPI then performs a mapping operation 1708 that maps the flow's tag with the queue ID that identifies the queue pair to use to communicate with its EPU regarding the received flow. In other embodiments, if the queue ID is carried within the data messages of the flow, the EPU can simply extract the queue ID rather than require the use of a mapping record to determine the queue ID from the tag. Still other embodiments, if using a context ID to disambiguate multiple transactions, map from this context ID to the queue ID.

Next, at 1710, the destination EPU's driver 1762 performs a mapping operation that maps the queue ID to a transaction ID associated with the flow, and then maps (at 1711) the transaction ID to a location in a destination EPU memory 1765 to store the data received from the source EPU as part of the transaction.

The transaction length in some embodiments is provided as part of the received flow to the destination EPU so that the destination driver 1762 can use this information in performing its memory write to the destination EPU memory. In other embodiments, this length is not used at the destination EPU side. Also, when the transmission of the data flow(s) associated with a transaction needs scheduling parameters from the RSF control plane, the transaction length in some embodiments is provided by the EPI of the source EPU (1) to the CPP (which serves as the first-hop MFE CPP of the EPU (serving as its local control plane, LCP), (2) to the CP proxy server that serves as the EPU's LCP, or (3) to the CPP of the last-hop MFE on the path from the source EPU to the destination. The provided transaction length is then used by the CPP or CP proxy server to provide the scheduling parameters. For proactively scheduled transaction, the RSO server cluster in some embodiments accounts for the transaction length in providing its scheduling parameters.

In some embodiments, the queue ID is associated with the source and destination EPIs (e.g., source-side EPI egress port and destination-side EPI ingress port) of the source and destination EPUs and is also dependent on the data transfer transaction so that different data transactions between the source and destination can have different queue IDs. In other embodiments, the queue ID for all data transactions between the source and the destination are the same.

In some embodiments, different segments of an EPU operation's result data can be transmitted along different ports of one EPI, or different ports of different EPIs, of the EPU for load balancing and/or throughput purposes. For such use cases, some embodiments use the same transaction ID across different ports of different EPIs, or different ports of the same EPI, but use different queue IDs for the different portions that are sent along different ports of the same or different EPIs. Other embodiments use the same queue ID for these different portions.

For instance, in some embodiments, the transaction ID for an EPU computed result is associated with the RSF-network destination(s) that will receive the result through the RSF network, as mentioned above. In some of these embodiments, the transaction ID for the result includes or is derived from the destination(s) for the result. As depicted in FIG. 17, some embodiments perform multiple mapping operations to generate the source-assigned forwarding tag from the transaction ID.

In some embodiments, each transaction ID maps to one queue ID, which in turn maps to a list of one or more paths through the network with each path being associated with its own forwarding tag. When the result is forwarded from one or more ports of one or more EPIs of an EPU, each EPI in some embodiments maps the queue ID for the result to a list of paths, then identifies the paths that are associated with it (the EPU), identifies the tag for each of its paths from the list of paths, and then uses each identified tag to forward a portion of the result along one of its egress ports (one of the ports of that EPI) associated with that tag. These mapping operations are part of the virtualization operations of the RSF network in some embodiments, which allow one set of resources to be shared among numerous EPUs sharing the same network for one or more clients.

Under the above-described mapping approach, no resource of the EPU (e.g., no EPU driver or kernel process) needs to divide a computed result into multiple segments and assign the different segments to different ports of one or more EPIs to forward. Instead, the decision to send an EPU computation result into one or more flows (carrying one or more segments of the result) is made and implemented by the EPI(s) of the EPU based on the mapping records distributed by the RSO server cluster. Having this decision performed at the network infrastructure layer managed by the RSO server cluster is most efficient as this layer has insight in the current conditions of the RSF network fabric (e.g., due to the collection of the telemetry data). Making and implementing this decision in the networking layer allows the RSF network fabric to offload this decision from the EPUs.

One of ordinary skill will realize that FIG. 17 illustrates only one set of mapping operations used in some embodiments to produce the queue ID and/or source-assigned forwarding tag at the source EPU, and that other embodiments use mapping operations other than those illustrated in FIG. 17. For instance, some embodiments use the queue IDs as the forwarding tags, e.g., (1) use a first mapping record that maps the EPU memory location to a transaction ID, (2) use a second mapping record that maps the transaction ID to a queue ID, and then (3) use a third mapping record that maps the queue ID to an egress port of the network interface. Still other embodiments use the transaction IDs as forwarding tags, e.g., (1) use a first mapping record that maps the EPU memory location to a transaction ID and (2) a second mapping record that maps the transaction ID to an egress port of the network interface.

Figure 18:
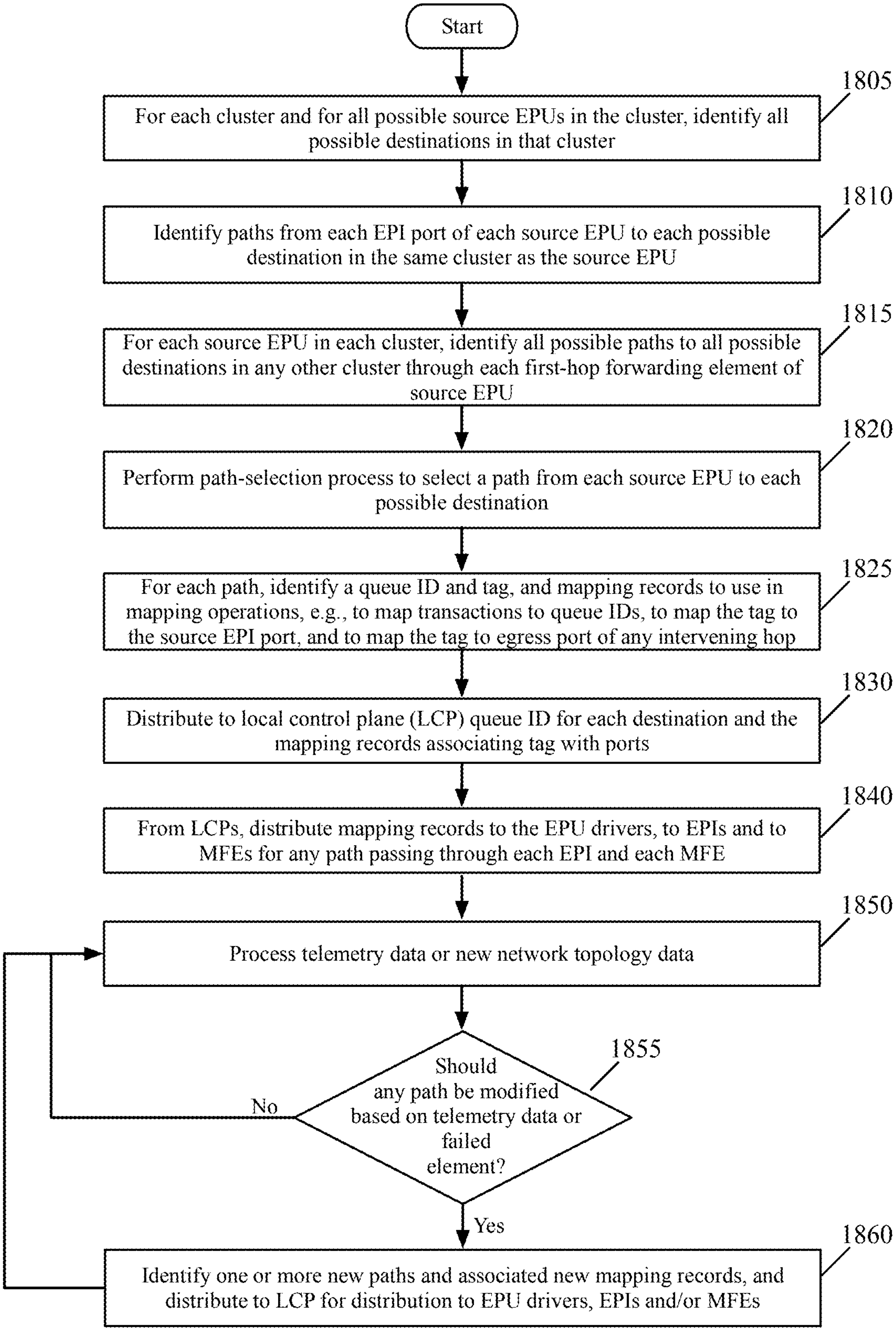
FIG. 18 conceptually illustrates a process that conceptually illustrates operations that the RSF control plane of some embodiments performs to specify the path from each source EPU to any RSF destination.

FIG. 18 presents a process 1800 that conceptually illustrates operations that the RSF control plane of some embodiments performs to specify the path from each source EPU to any RSF destination. In some of these embodiments, the CP process 1800 specifies the paths by (1) using network topology and telemetry data to perform path-search operations to identify the paths between each source and destination EPU connected through the RSF and (2) distributing configuration records that configure the configurable network elements (e.g., the EPU drivers, EPIs and forwarding elements) of the network fabric to perform the tag-based mapping operations needed to forward the data messages along the CP-specified paths. Examples of such mapping operations are the mapping operations 1702, 1703, 1704, 1706 and 1708 illustrated in FIG. 17.

As shown, the process 1800 performs operations 1805-1820 to identify the paths from each source EPU to each of its possible RSF destinations. Operations 1805-1815 hierarchically identify all paths from each source EPU to each of its destinations, and then operation 1820 selects one path (from all of the identified paths) from each source EPU to each of its destination. Specifically, at 1805, the process 1800 identifies, for each particular EPU in each particular EPU cluster, all possible destinations in the particular cluster. For each source EPU, each identified destination in some embodiments is a standalone EPU or switch EPU that is a candidate EPU for the transaction (e.g., Read, Write, Receive or Send transaction) from the source EPU.

At 1810, the process 1800 identifies all the candidate paths from each EPI port of each source EPU to each identified destination in the same cluster. Next, at 1815, the process 1800 identifies, for each source EPU in each cluster, all possible paths to all possible destinations in each other cluster through each first-hop forwarding element for the source EPU. From all of the paths identified for each source EPU to each of its possible destinations, the process 1800 selects (at 1820) one path from the source EPU to the destination. In some embodiments, this operation is done in a greedy fashion. Conjunctively, or alternatively, this operation in some embodiments is based on telemetry data relating to congestion of the intervening forwarding elements (e.g., switches) between the source EPU and its destination. Other embodiments perform this selection based on another set of optimization criteria.

For each path selected for each source EPU to each destination, the process 1800 specifies (at 1825) a queue ID, a tag, and mapping records to use to perform the mapping operations for the data flows from the source EPU to the destination. Examples of such mapping operations are the operations illustrated in FIG. 17. These operations in some embodiments map transactions from the source EPU that need to be sent to a destination to one or more queue IDs, map a source-assigned tag to the source EPI port, and map the source-assigned tag to egress port of any intervening hop.

The operations 1805-1825 in some embodiments are performed by the central control plane (CCP), which is a logically centralized control plane that is implemented by multiple RSO servers (e.g., RSO servers 210 and 410 of FIGS. 2 and 4) for load-distribution and fault-tolerance purposes. For instance, these operations 1805-1825 of the process 1800 in some embodiments are performed by a topological service of the RSO server cluster. After 1825, the process 1800 distributes (at 1830) from the CCP to the RSF local control planes (LCPs) the mapping records identified at 1825. In some embodiments, the LCPs in the RSF are the CPPs (e.g., the CPPs 460 or 1044) of the first-hop RSF MFEs (e.g., the forwarding elements 450 or 1005) of the EPIs.

At 1840, the LCPs in some embodiments distribute the received mapping records to the EPU drivers (e.g., RSF driver 1260), EPIs (e.g., EPIs 430, 432, 1020, and 1200) and the data plane circuits (e.g., DPPP 1042) of the forwarding elements (e.g., elements 450 or 1005). In other embodiments, the CCP does not distribute to the LCPs the mapping records (e.g., forwarding records) that the LCPs distribute to the EPI drivers, EPIs, and data plane circuits of the forwarding elements. For instance, in some of these embodiments, the CCP distributes the data needed for generating the mapping records but leaves the generation of these records as a task for the LCPs to perform. That is, the CCP distributes a first set of configuration data to the LCPs, which generate a second set of configuration data (mapping records) from the first set of configuration data and distributes the second set of configuration data to the EPI drivers, EPIs, and data plane circuits of the forwarding elements.

After distributing the initial set of mapping records that configure the EPU drivers, EPIs, and intervening forwarding elements to perform the desired forwarding operations for each possible pair of source and destination, the process 1800 performs monitoring operations 1850-1860 to monitor new telemetry and network topology data, to assess whether forwarding through the RSF needs to be updated in view of this new data, and when needed, to modify the mapping records to modify the forwarding through the RSF.

Specifically, at 1850, the process 1800 analyzes new telemetry data (e.g., collected by the telemetry servers 480) or new network topology data (e.g., specified by network administrators through a management plane UI or APIs to add or remove new forwarding elements, links between forwarding elements, and/or EPUs). At 1855, the process 1800 assesses this new data to determine whether the forwarding through the RSF needs to be updated in view of this new data. If not, the process returns to 1850 to wait for the next set of new telemetry data or network-topology data to analyze.

When the process 1800 determines (at 1855) that the RSF forwarding needs to be updated in view of new telemetry or topology data, the process 1800 (at 1860) identifies one or more new paths through the RSF, generates the associated new mapping records for any such new path, and distributes the new mapping records to LCPs for distribution to EPU drivers, EPIs, and forwarding elements. After each iteration through 1860, the process returns to 1850 to wait for the next set of new telemetry data or network-topology data to analyze.

As mentioned above, the process 1800 is a conceptual illustration for some embodiments as these embodiments perform some of the illustrated operations differently. For instance, instead of enumerating (at 1810 and 1815) all possible paths between each source and destination connected through the RSF and then selecting one of the enumerated paths (at 1820), other embodiments identify and select just one path between each possible source/destination pair.

Figure 19:
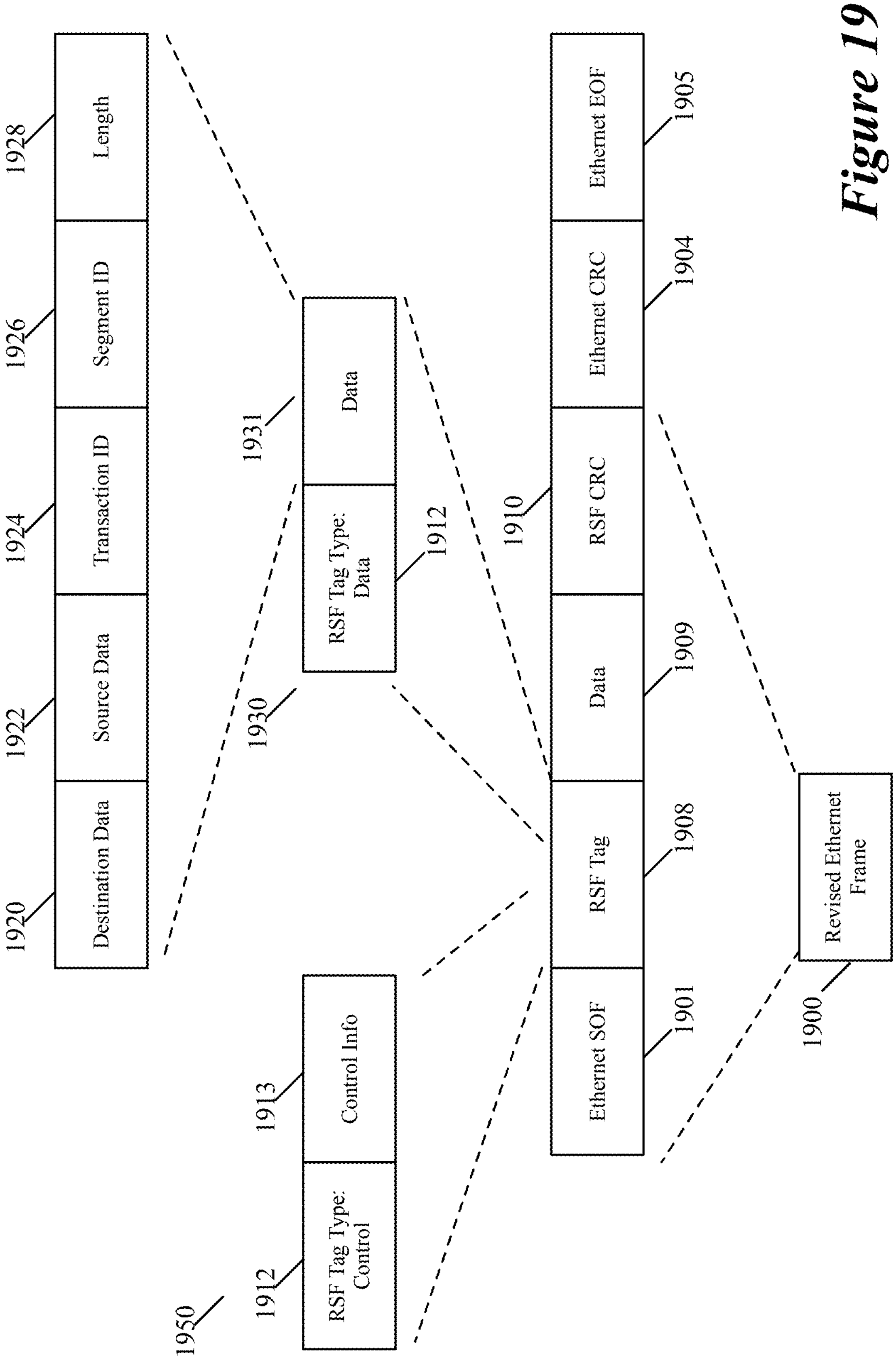
FIG. 19 illustrates an example of a revised Ethernet frame that is used in some embodiments.

As mentioned above, a data message refers to a collection of bits in a particular format sent across a network. The data messages forwarded through the RSF have different formats in different embodiments. For instance, in some embodiments, the formatting of these bits is specified by standardized protocols or non-standardized protocols. Examples of standardized protocols used in some embodiments include Ethernet frames, IP packets, TCP segments, UDP datagrams, etc. Other embodiments use a revised Ethernet frame for the format of the data messages forwarded through the RSF. This format in some embodiments is a modified Ethernet frame to speed-up tag-based forwarding at each hop. FIG. 19 illustrates an example of such a revised Ethernet frame 1900 that is used in some embodiments. As shown, each Ethernet frame data message 1900 uses a revised format that includes an Ethernet Start of a Frame (SOF) 1901, an Ethernet CRC field 1904, and Ethernet End of a Frame (EOF) 1905.

After the SOF, the revised Ethernet frame 1900 in some embodiments has an RSF tag 1908, the data payload 1909 and an RSF tag CRC 1910. The RSF tag CRC stores information for performing error correction for the RSF tag 1908 and/or payload 1909. The RSF tag includes a field 1912 that specifies whether the RSF tag is an RSF control tag 1950 or an RSF data tag 1930. The field 1912 allows control messages to be sent in-band through the RSF forwarding elements. Examples of the control RSF tag 1950 include tags used for Sync, ACK, and NACK operations in some embodiments. As shown, the control RSF tag 1950 includes the tag type 1912 indicating that this is a control RSF tag and control information 1913.

As further shown, the data RSF tag 1930 includes the tag type 1912 indicating that this is a data RSF tag as well as RSF tag data 1931. The RSF tag data 1931 includes (1) a destination field 1920 that includes information derived from the destination queue (e.g., transmit queue ID above) and/or transaction, (2) a source field 1922 that includes information derived from the source queue (e.g., receive queue ID above) and/or transaction, (3) a transaction field 1924 that stores a transaction ID that identifies the transaction being carried by the Ethernet frame's flow, (4) a segment ID (e.g., segment number) 1926 that specifies the segment that is part of the transaction being carried in this Ethernet frame, and (5) a length field 1928 that specifies the length of the data in the Ethernet frame. In some embodiments, the RSF data tag 1930 includes other fields as well, such as a path field that specifies the path to use on a hop-by-hop basis.

The RSF CRC 1910 in some embodiments is applied across the RSF Tag, which includes the RSF tag type and data. The RSF CRC is stored with the data in each hop end-to-end in some embodiments. The Ethernet CRC is added/stripped on each Ethernet hop in some embodiments. While the two CRC fields are separate fields in some embodiments, these two fields are combined in other embodiments.

Figure 20:
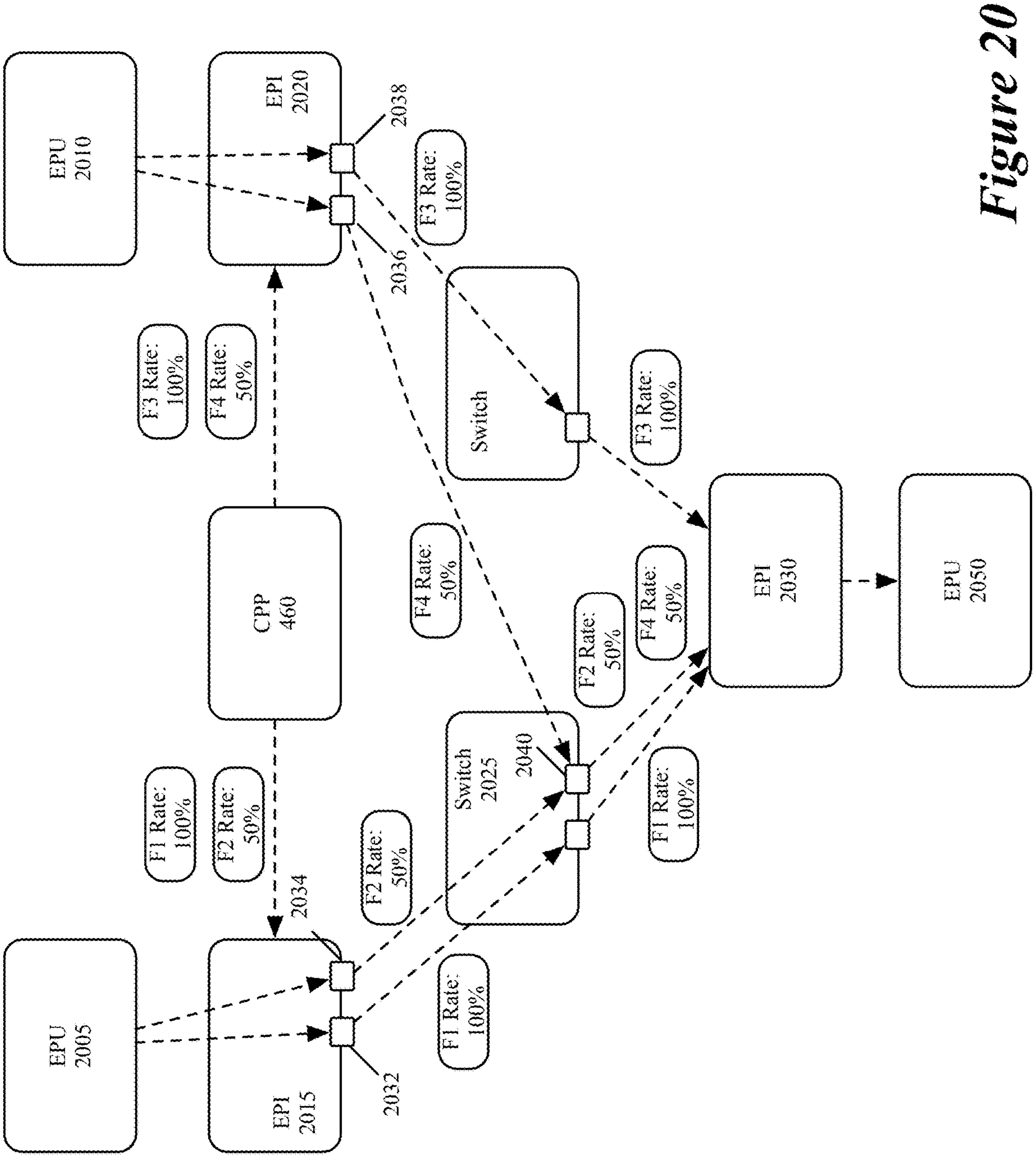
FIG. 20 illustrates an example of an RSF CPP specifying different rates for transmitting different data segments associated with an EPU transaction.

As mentioned above, the RSF CP in some embodiments can specify different rates for transmitting different portions of data that are computed for an EPU transaction. FIG. 20 illustrates an example of an RSF CPP 460 specifying different rates for transmitting different data portions associated with an EPU transaction. In other examples, the scheduling service of the RSO server cluster provides the different rates for transmitting different data portions associated with an EPU transaction.

In the example of FIG. 20, the results of two computations performed by two EPUs 2005 and 2010 are sent to another EPU 2030. The data computed by each of the EPUs 2005 and 2010 is sent along as two portions that traverse along two paths to the EPI 2030 (the EPI for EPU 2050). A first portion of the computed data of the EPU 2005 is sent along as flow F1 with a 100% rate from a first port 2032 of an EPI 2015 of the EPU 2005, while a second portion of the computed data of the EPU 2005 is sent along as flow F2 with a 50% rate from a second port 2034 of the EPI 2015. Similarly, a first portion of the computed data of the EPU 2010 is sent along as flow F3 with a 50% rate from a first port 2036 of an EPI 2020 of the EPU 2010, while a second portion of the computed data of the EPU 2010 is sent along as flow F2 with a 100% rate from a second port 2038 of the EPI 2020. The flows F1, F2, and F3 from the EPU 2005 and 2010 traverse to EPU 2030 through a switch 2025, while the flow F4 from the EPU 2010 traverse to EPU 2030 through a switch 2025.

In this example, the CPP 460 of a forwarding element sets the pacing rates and provides these rates as part of the scheduling parameters that it provides to the EPIs 2015 and 2020 of the EPUs 2005 and 2010, in order to schedule the transmission of the results of the computations of these two EPUs to the EPI 2030. The CPP specifies a 100% pacing rate for the flows F1 and F3 from the EPUs 2005 and 2010, because these flows are sent along paths that are not currently used for transmission of any other flows. On the other hand, the CPP specifies a 50% pacing rate for the flows F2 and F4 from the EPUs 2005 and 2010, because these flows are sent along two paths that converge at port 2040 of the switch 2025. The 50% pacing rate is used so that the port 2040 does not become over congested as the transmission of the flows F2 and F4 through this port overlaps.

Some embodiments use a novel transport layer protocol, called TXRX, to transfer data reliably between two EPIs of two EPUs. This protocol in some embodiments supports (1) multi-pathing, (2) selective retransmission in case of packet loss, (3) large data transfers (up to 4 TB), and (4) high throughput (up to 3.2 TB/sec). Also, in some embodiments, the parameters for this transport layer protocol (TLP) are stored in a layer 2 (L2) header, such as the Ethernet header. For instance, as described above by reference to FIG. 19 and further described below by reference to FIGS. 21 and 27, some embodiments forward the EPU computation results (e.g., the GPU computation results) through Ethernet frames and embed the TLP parameters in the L2 encapsulation header, L2 auxiliary header, or an L4 header (e.g., a TXRX header as further described below by reference to FIG. 27) inside the Ethernet frame The TLP parameters allow the sources and destinations of flows to specify the start of each flow carrying an EPU computation result, to ensure the reliable transport of all the data messages in the flow to the flow's destination, and to specify the end of the flow. The Ethernet frame headers in some of these embodiments include source-specified forwarding tags that are not L2, L3, or L4 network addresses or port numbers and that are used by the network fabric forwarding elements to forward each data message of a flow from a source EPU to the flow's destination. These tags are not network addresses as two different sources can specify two different tags for the same destination (e.g., the same destination EPU or EPI) in some embodiments. This is in contrast to a network address of a destination network element (e.g., an EPU or EPI), which in some embodiments is a common and unique address used by several or all of the elements in the network for the destination network element.

Figure 21:
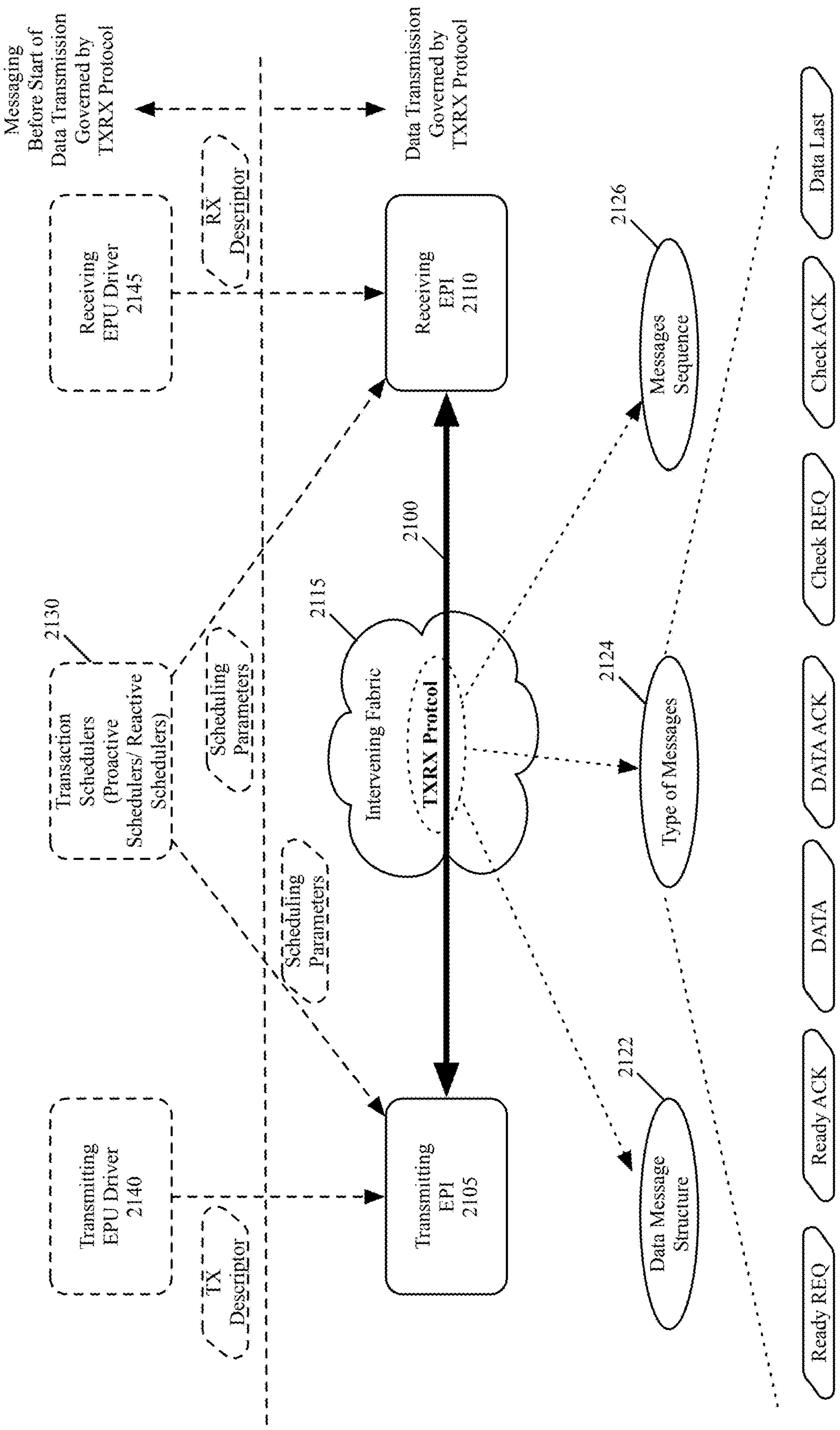
FIG. 21 illustrates the use of a TXRX protocol in some embodiments.

FIG. 21 illustrates the use of a TXRX protocol 2100 in some embodiments. The TXRX protocol 2100 is used in some embodiments to reliably transfer data between a transmitting EPI 2105 of a transmitting EPU (not shown) to a receiving EPI 2110 of a receiving EPU (not shown) through an intervening network fabric 2115 of a network that connects numerous EPIs of numerous EPUs. As shown, this protocol in some embodiments governs the data message structure 2122 for sending data messages (e.g., L2 frames, L3 packets, etc.) between the EPIs, the type 2124 of messages exchanged between the EPIs, and the sequence 2126 of messages exchanged between the EPIs.

As further shown, the message types 2124 in some embodiments include Ready Request (REQ), Ready Acknowledgement (ReadyACK), Data, Data ACK, Check REQ, Check ACK, and Data Last. Several examples regarding the use of these messages and the sequence 2126 for sending these messages will be further described below by reference to FIG. 29-32. Also, the message structure of the TXRX protocol in some embodiments will be described further below by reference to FIG. 27.

FIG. 21 illustrates that before the TXRX protocol is used to control the communication between the transmitting and receiving EPIs 2105 and 2110 (also called source and destination EPIs), the transmitting and receiving EPIs 2105 and 2110 receive (1) scheduling parameters from transaction schedulers 2130 and (2) transmission (TX) and reception (RX) descriptors from the transmitter EPU driver 2140 and receiver EPU driver 2145 respectively.

As shown, transaction schedulers in some embodiments include proactive schedulers and reactive schedulers. In some embodiments, proactive scheduling is scheduling that generates and distributes all the scheduling parameters (such as time and rate) for a transaction before the EPUs start their execution. In some of these embodiments, the scheduling parameters are generated and distributed for some transactions even before these transactions are assigned to the EPUs.

On the other hand, reactive scheduling in some of these embodiments generates one or more of the scheduling parameters for a transaction after the source EPU has started and/or completed its computations for the transaction, as further described below. Some embodiments perform proactive scheduling on servers while performing reactive scheduling through control plane processors of the forwarding elements that form the RSF network fabric, as further described below. Accordingly, in some embodiments, reactive scheduling is available even when the scheduling service of the RSO server cluster goes down. Hence, proactive scheduling can be viewed as a scheduling optimization that some embodiments provide in addition to in-band reactive scheduling provided by the CP processors.

Figure 22:
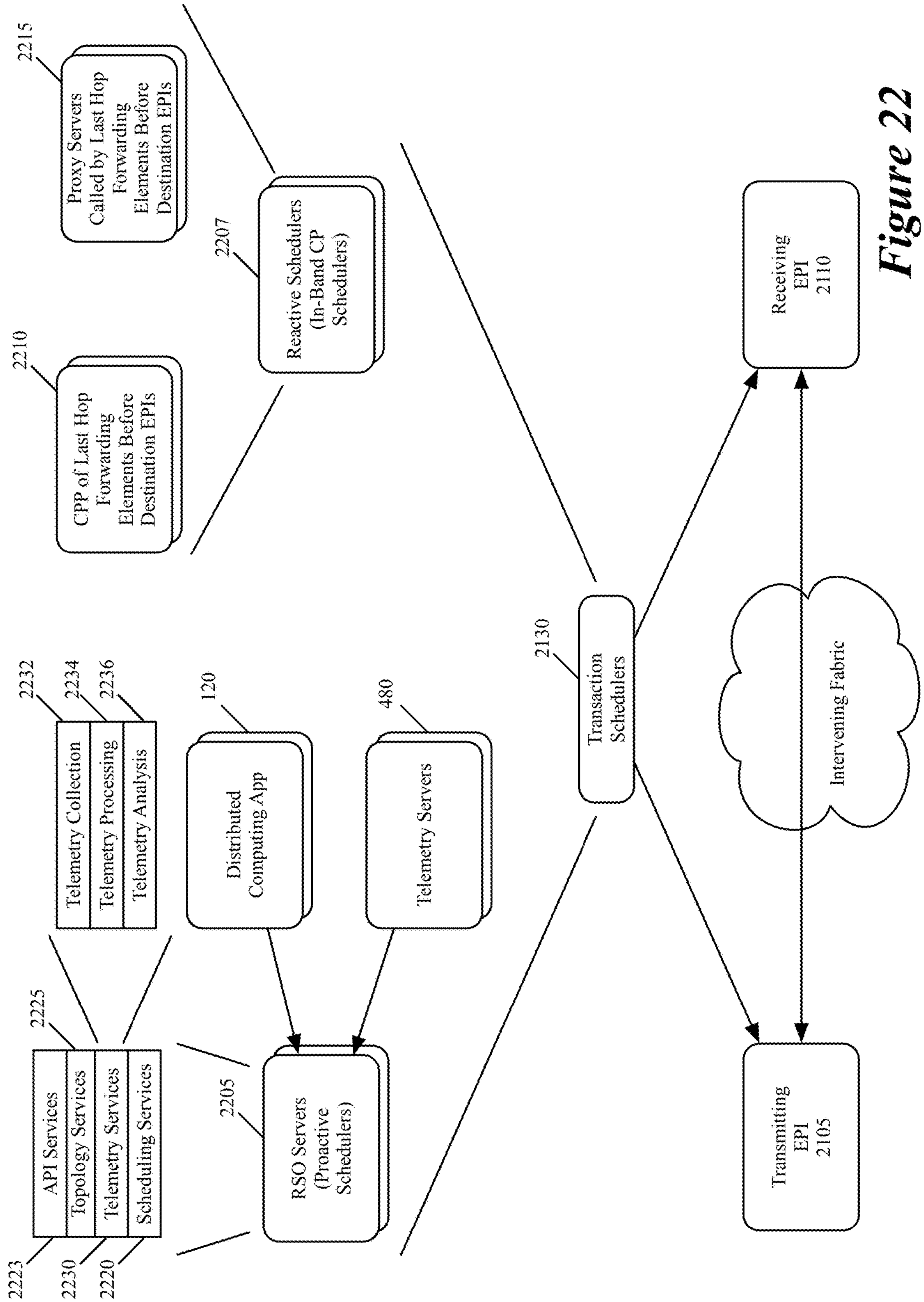
FIG. 22 illustrates that some embodiments use a scheduling service of a server cluster.

FIG. 22 illustrates that some embodiments use the scheduling service 2220 of a cluster of RSO servers 2205 that operate as one logically centralized proactive scheduler, while using CP processors 2210 or proxy servers 2215 associated with destination EPIs to implement in-band reactive CP schedulers 2207. In addition to their scheduling service, the RSO servers 2205 perform (1) topological services 2225 to define paths in the network and configure the paths in the forwarding elements (e.g., switches), as described above by reference to FIG. 21, and (2) telemetry services 2230 with telemetry collection 2232, telemetry processing 2234 and telemetry analysis 2236 subservices that respectively collect, process and analyze telemetry data received from the telemetry servers 480, as described above by reference to FIGS. 4 and 5. As further described below, the RSO servers 2205 also include API services to receive scheduling requests for transactions (operations involving one or more computations to be performed by one or more EPUs) from distributed applications 120.

In some embodiments, the centralized proactive scheduler typically proactively preschedules large transactions. Different embodiments define a large transaction differently. For instance, a large transaction in some embodiments is a transaction that produces a large amount of data (e.g., greater than a threshold amount of data) that needs to be transmitted to one or more destinations connected through the RSF network fabric. In other embodiments, a large transaction is a transaction that uses a lot of compute or memory resources (e.g., greater than a threshold amount of compute resources and/or memory resources) at the source EPU that performs the transaction. In still other embodiments, a large transaction is a transaction that is broken into smaller transactions that are then assigned to several EPUs to perform collectively. Such large transactions are typically prescheduled as they require coordination among the individual EPUs that perform the smaller transactions that collectively form the larger transaction. Some embodiments allow a system or network administrator to define programmatically what constitutes a small or large transaction in his or her particular RSF network deployment. Irrespective of how some embodiments define a large transaction, a small transaction in some of these embodiments is a transaction that has not been defined as a large transaction.

As shown in FIG. 22, the RSO servers 2205 have an API service 2223 through which these servers in some embodiments receive and process transaction planning requests from one or more applications of a distributed computing application 120 (such as an AI training or inference application as described above). The topological service 2225 of these servers ensures that paths are generated between the source and destination EPUs associated with each transaction that is requested for scheduling, while the scheduling service 2220 of these servers performs the proactive scheduling that generates and distributes the scheduling parameters for each such transaction. When the EPUs are located in one or more multi-tenant datacenters that specify different VPCs for different tenants, the scheduling service 2220 for each tenant is implemented in some embodiments by a different set of scheduling servers that are operating for that tenant's VPC.

A transaction planning request in some embodiments identifies the data transfer (e.g., by reference to a pointer and a size parameter), the transmitting and receiving EPUs in the network (e.g., by reference to a routing tag as well as queue ID(s) for source and destination), and the desired rate and starting time. In some embodiments, the centralized proactive scheduler uses this data to specify scheduling parameters and/or identify the EPIs (e.g., source and destination EPIs) and forwarding elements (e.g., for performing collective operations, as described above and below) that need to receive scheduling parameters to handle the transaction associated with the planning request. In some embodiments, the RSO server cluster's topological services define paths in the network and configure the paths in the forwarding elements (e.g., switches), as described above.

To configure the forwarding elements, the centralized scheduler in some embodiments can provide the following information to an EPI: (1) the number of paths to use, (2) the actual throughput granted and calculated schedule time, (3) the specific queues to use at source and destination EPUs, and (4) a unique transaction ID that can be used track this transaction. For each transaction computed by a source EPU and having a result that needs to be sent to a destination EPU along a particular path, the specific queues that are used in some embodiments are associated with a source EPI port of the source EPU and a destination EPI port of the destination EPU.

In some embodiments, the proactive scheduler uses a particular protocol to communicate with the EPIs that ensures that each end point gets the information mentioned above. The proactive scheduler in some embodiments communicates with the EPIs by using the same network through which the EPUs communicate, while in other embodiments it communicates with the EPIs using a different network. As such, the request/acknowledgements for transaction planning between the proactive scheduler and the EPIs use different protocols in different embodiments (e.g., TCP/IP packets) that use the same network or different network than that used by the EPUs to communicate with each other. Proactive scheduling will be further described below by reference to FIGS. 23 and 24, while the reactive scheduling will be further described below by reference to FIGS. 25 and 26.

For a given transaction that is computed by a source EPU and that has computational results that need to be sent to a destination EPU, the source EPU driver (also called transmitting EPU driver) provides a Transmit Descriptor to the source EPI (also called transmitting EPI), while the destination EPU driver (also called receiving EPU driver) provides a Receive Descriptor to the destination EPI (also called receiving EPI).

In some embodiments, the source EPU driver provides its Transmit Descriptor to one or more of its EPIs once the transaction has been completed. For a transaction that has its result being sent to one or more destinations connected to the RSF network, the source EPU driver provides its Transmit Descriptor to each of its EPIs that has a port through which a data message flow will be sent to at least one of these destinations to carry a portion of the transaction's result.

After receiving one or more Transmit Descriptors for a completed transaction, the source EPI will commence using the TXRX protocol to start each transfer to each destination that the source EPI will handle. Each such destination is associated with a different destination queue ID and the Transmit Descriptor identifies the destination queue ID associated with the particular destination for the data transfer that is specified by the Transmit Descriptor. In some embodiments, a processor or controller (e.g., the CP processor 1207 or a dedicated controller in the data plane 1202, such as an RTL (register transfer level) controller in the data plane 1202) of the source EPI partly or fully manages each TXRX protocol session (e.g., the TXRX session for each transfer to each destination). As part of this operation, this EPI processor or controller generates TLP commands and/or parameters, such as block and segment assignments, segment IDs, block IDs, and/or other TLP parameters.

In other embodiments, the destination queue ID is not included in the Transmit Descriptor as this descriptor is stored (e.g., by the EPU driver) in the correct transmit queue of an EPI that is associated with the queue ID. Similarly, in these embodiments, the source queue ID is not included in the Receive Descriptor as this descriptor is stored in the correct receive queue of an EPI. In other embodiments, the Receive Descriptor includes both the source and destination queue IDs for a transaction. For the same transaction, the Transmit Descriptor in these embodiments also includes the source and destination queue IDs for the transaction, but in a reverse order of what is stored by the Receive Descriptor (with the destination queue ID of the source being the local queue ID of the destination, and the source queue ID of the source being the remote queue ID of the destination).

In some embodiments, the source and destination EPU drivers generate the Transmit and Receive Descriptors not only based on information distributed by the proactive schedulers when the transactions are prescheduled, but also based on information provided by the distributed computing applications 120 when these applications assign transactions to the EPUs associated with these drivers. The distributed applications in some embodiments use a transaction scheduler and/or one or more existing protocols (such as NCCL) to assign transactions to EPUs. For a transaction, a destination EPU driver produces one or more Receive Descriptors from the information provided by the distributed computing applications and provides the produced descriptor(s) s to one or more EPIs that will operate as destination EPIs for receiving a data message flow associated with the transaction (e.g., for carrying data computed by the source EPU for the transaction) from the source EPI(s).

Once a source EPI starts a data transfer to a destination EPI by using the TXRX protocol 2115, there are three possibles outcomes for this data transfer. First, the data transfer is fully completed between the source and destination EPIs, including recovery from any lost data messages. Second, the transaction cannot be fully completed by source and destination EPIs due to network error caused by topology change or port failures. For such an outcome, the source EPI firmware in some embodiments attempts to rectify the situation by contacting the topological services of the RSO server cluster to resolve the issue (e.g., to receive a new path to the destination). Third, the transaction cannot be completed as the EPI driver cannot rectify the failure to fully transmit the result of the transaction. Under this scenario, the source EPI bounces back the transaction to the EPU driver to perform the necessary error handling operation(s). This may happen if a network failure cannot be resolved.

As described above by reference to operations 910-925, some embodiments allow the source EPIs to send results of small transactions upon the completion of these transactions. For small transactions, the receiver driver in some embodiments pre-generates descriptors pointing to fixed size buffers to receive any incoming small transactions. Under such conditions, the source EPI (i.e., the transmitting EPI) does not have to go through a proactive or reactive scheduling session with a transaction scheduler. Instead, the source EPI directly transfers small messages reliably to the receiver using same transmit descriptors as for large transactions. Some embodiments allow a network administrator to define what is a large transaction and what is a small transaction, as described above.

Figure 23:
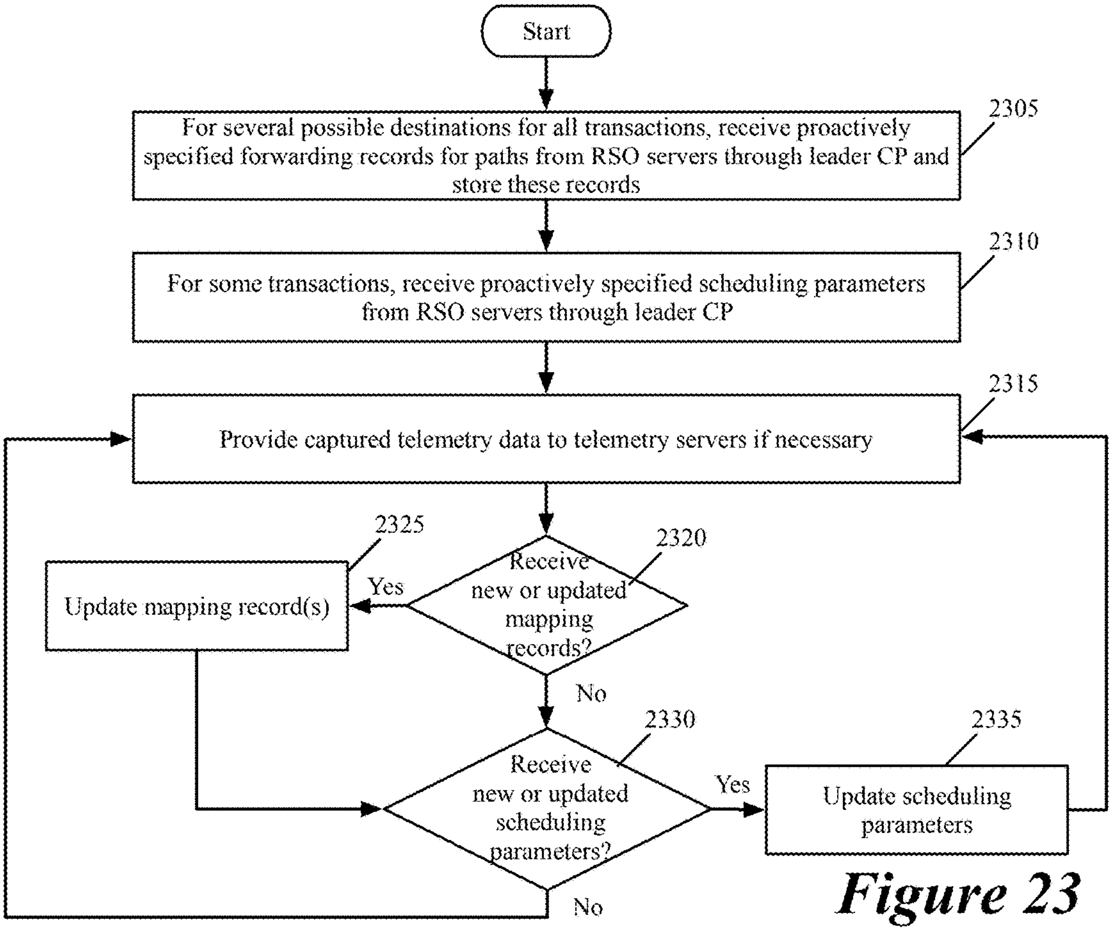
FIG. 23 presents a process that conceptually illustrates operations performed by an EPI in its interactions with the topological, scheduling and telemetry services of the RSO server cluster 2205 and the telemetry servers 480.

Proactive configuration and scheduling of the EPIs will now be described by reference to FIGS. 23 and 24. FIG. 23 presents a process 2300 that conceptually illustrates operations performed by an EPI in its interactions with the topological, scheduling, and telemetry services of the RSO server cluster 2205 and the telemetry servers 480. This figure will be described below by reference to FIG. 24, which illustrates an EPI 2405 and EPU driver 2410 of an EPU 2415 being configured by an RSO server cluster 2205 through a leader CP processor 2420 of a first-hop forwarding element 2425 directly connected to the EPI 2405.

As shown in FIG. 23, the process 2300 starts (at 2305) when the EPI 2405 receives, for several possible destinations of transactions computed by the EPI's EPU 2415, proactively specified forwarding records for paths to these destinations. These paths are computed by the topological service 2225 of the RSO server cluster 2205 in some embodiments. As described above by reference to FIGS. 17 and 18, the RSO server cluster computes paths for some or all EPUs operating as source EPUs for transactions. To effectuate these paths, the RSO server cluster 2205 (1) generates next-hop forwarding records for the source EPUs and any intervening forwarding elements (e.g., switches) between the source EPUs and the destination EPUs and (2) distributes the generated forwarding records to the source EPUs and intervening forwarding elements. As noted above, in other embodiments, the RSO server cluster provides configuration data specifying these paths to the CP processors of at least a set of the forwarding elements, which generate the forwarding records to distribute to the source EPUs and intervening forwarding elements.

The distributed forwarding records include records for the EPU drivers to use to map (1) different transactions that have their results going to different destinations to (2) different communication queue ID pairs, with each queue ID pair identifying a communication queue pair for the EPU and its EPI to use to communicate regarding a flow from the source EPU to a destination EPU for the transaction. As mentioned above, the queue ID pair in some embodiments is associated with the source and destination of the flow (e.g., with the egress port of the source EPI of the source EPU and the ingress port of the destination EPI of the destination EPU) and is used at both the source and destination sides for identifying communication queue pairs for communications between the RSF (e.g., the EPI) and the source and destination EPUs.

A queue ID pair in some embodiments includes (1) a source queue ID that identifies an egress port of a source EPI and (2) a destination queue ID that identifies an ingress port of a destination EPI. As further described below, other embodiments use one source queue ID for all egress ports of a source EPI. Also, in some embodiments, a queue ID pair is a single queue ID that uniquely identifies an egress queue and ingress queue at a source EPI and a local queue and a remote queue at a destination EPI.

For each queue ID pair that is associated at a source EPI port with a destination EPI port, a source-specified forwarding tag is specified in some embodiments at the source EPU driver. In other embodiments, the forwarding tag is just specified based on the destination EPI port. This forwarding tag is then mapped at the source EPU's EPI to an EPI egress port, which is on the path through the RSF network to the destination EPU. In some embodiments, this mapping involves comparing the forwarding tag with tag attributes of match-action forwarding records at the EPI. Each match-action record in some embodiments has a tag attribute and an egress-port attribute. When the specified forwarding tag matches the tag attribute of a match-action record, the EPI then identifies the EPI egress port to use (to forward the flow to the destination EPU) from the egress-port attribute of the matching match-action record. In some embodiments, the match-action record matches on only a portion of the source-specified forwarding tag rather than the entire source-specified forwarding tag.

The forwarding tag that is specified and used in some embodiments is derived from an identifier of the destination EPU, such as its DMAC. In other embodiments, this tag is the DMAC of the destination EPU. As mentioned above, the forwarding tag is used in some embodiments to perform source-specified forwarding at the intervening forwarding elements between the source and destination EPUs. This is because each intervening forwarding element receives a match-action forwarding record that matches on the source-specified forwarding tag (or a portion of the source-specified forwarding tag) and forwards matching data messages to an egress port of the forwarding element.

Hence, after receiving a data message of the flow between the source and destination EPUs, each forwarding element in some embodiments uses the tag to perform a mapping operation that matches the tag extracted from the received data message with the tag attribute of a forwarding record, and then uses the egress-port attribute of this matching forwarding record (i.e., the identified forwarding record with the matching tag attribute) to identify the EPI egress port of the forwarding element to use to forward the flow to the destination EPU.

One of ordinary skill will realize that other embodiments are implemented differently than the embodiments described above. For instance, in some embodiments, instead of having a unique source queue ID for each port of the source EPI, the source EPI uses one source queue ID for all of its ports, as the destination queue ID is used to identify the forwarding tag that is used by the source EPI and the intervening managed forwarding elements to forward the data message flow for a transaction to the correct ingress port of the destination EPI.

Figure 24:
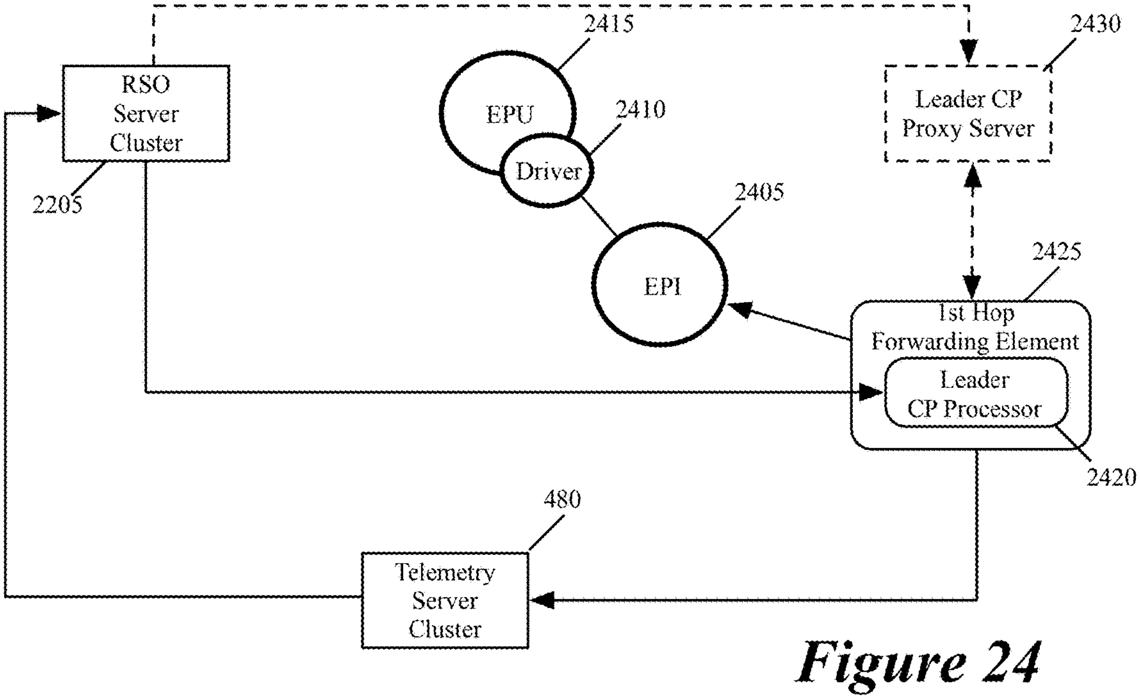
FIG. 24 illustrates an EPI and EPU driver of an EPU being configured by an RSO server through a leader CP processor of a first-hop forwarding element.

As shown in FIG. 24, the RSO servers 2205 in some embodiments use the CP processor 2420 of a first-hop forwarding element directly connected to the EPI 2405 (e.g., through a wired or wireless physical link) to distribute to the EPU driver 2410 and EPI 2405 the mapping records (e.g., the match-action records described above) that are used to identify the queue IDs and the egress ports for several destinations. This CP processor configures the EPI 2405 as it has been designated as a "leader" CP processor (among two or more CP processors of two or more first-hop forwarding elements of the EPI 2405) for configuring the EPI 2405. In other embodiments, the RSO servers 2205 use a CP proxy server 2430 that has been designated as a "leader" CP proxy server of the EPI 2405 to configure this EPI. As shown, the proxy server 2430 configures the EPI 2405 in some such embodiments by transmitting in-band control plane messages through the first-hop forwarding element 2425 or another first-hop forwarding element of the EPI 2405.

After the EPU driver and EPI receive (at 2305) the mapping records for identifying the queue IDs and the egress ports for several destinations, the scheduling service 2220 of the RSO server cluster 2205 provides (at 2310) to the EPI 2405 a set of scheduling parameters for each of several transactions that is to be performed by the EPI's associated EPU. In some embodiments, the received set of scheduling parameters for a transaction can include launch time (also called start time) and/or data transmission rate for transmitting the data that the EPU 2415 computes for the transaction. Like the mapping records, the scheduling parameter sets are configuration data sent by the RSO servers to the EPI 2405 through the leader CP processor 2420 of the first-hop forwarding element 2425 in some embodiments, or through the leader CP proxy server 2430 in other embodiments. In still other embodiments, like the forwarding records, the RSO servers provide configuration data to the leader CP processor 2420 or CP proxy server 2430, which in turn generates and distributes the actual scheduling parameters to the EPI 2405. Unlike the forwarding records, in some embodiments the scheduling parameters (i.e., at least the launch times and transmission rates) are not provided to the intervening forwarding elements.

After 2310, the EPI can commence transmitting the results of prescheduled transactions that its EPU completes based on the preconfigured paths and proactively provided scheduling parameters that it has received. At this stage, the EPI loops through the operations 2315-2335, which in some embodiments are performed by several different processes of the EPI.

At 2315, the EPI 2405 provides any telemetry data that it has recorded to the telemetry server cluster 480. In some embodiments, as described above, the EPI 2405 reports this data via the CP processor 2420 of one of its first-hop forwarding elements 2425 (e.g., the leader CP processor). The EPI 2405 records telemetry data after transmitting results of completed transactions. Hence, the EPI 2405 might not initially (e.g., in the first few iterations through 2315) have any telemetry data to report as it has not completed any transactions for which telemetry data can be captured. Whenever the EPI 2405 reports telemetry data (at 2315) to the telemetry server cluster 480, this server cluster aggregates the data with other data captured from other EPIs and provides the aggregated data in a push or pull scheme to the telemetry service 2230 of the RSO server cluster 2205 for the telemetry service 2230 to collect, process, and analyze the data.

Based on the collected telemetry data, and/or based on modifications to the RSF network, the topological service 2220 of RSO server cluster 2205 occasionally provides new or updated mapping records (e.g., match-action forwarding records, or transaction to queue ID mapping records) to identify new or updated paths to new or existing destination EPUs in the network. Hence, in each iteration through 2320, the EPI determines whether it has received any new or updated mapping records. If not, the EPI process 2300 transitions to 2330. If so, the EPI (at 2325) adds or updates its new or modified mapping record(s), and then transitions to 2330.

At 2330, the process determines whether it has received one or more new or updated scheduling parameter sets for one or more EPU transactions. If not, the EPI process 2300 returns to 2315. Otherwise, when the process determines that it has received one or more new or updated scheduling parameter sets for one or more EPU transactions, the EPI adds or updates (at 2335) its scheduling parameter sets, and then transitions back to 2315.

It should be understood that the process 2300 is a conceptual process and that the EPIs of some embodiments do not actually iterate through operations 2315-2135 repeatedly. Rather, in some embodiments, the EPIs are event-driven with respect to these operations. That is, the EPIs respond to each data transaction by providing captured telemetry data and respond to any receipt of new or updated mapping records or scheduling parameters by updating their mapping records or scheduling parameters.

Figure 25:
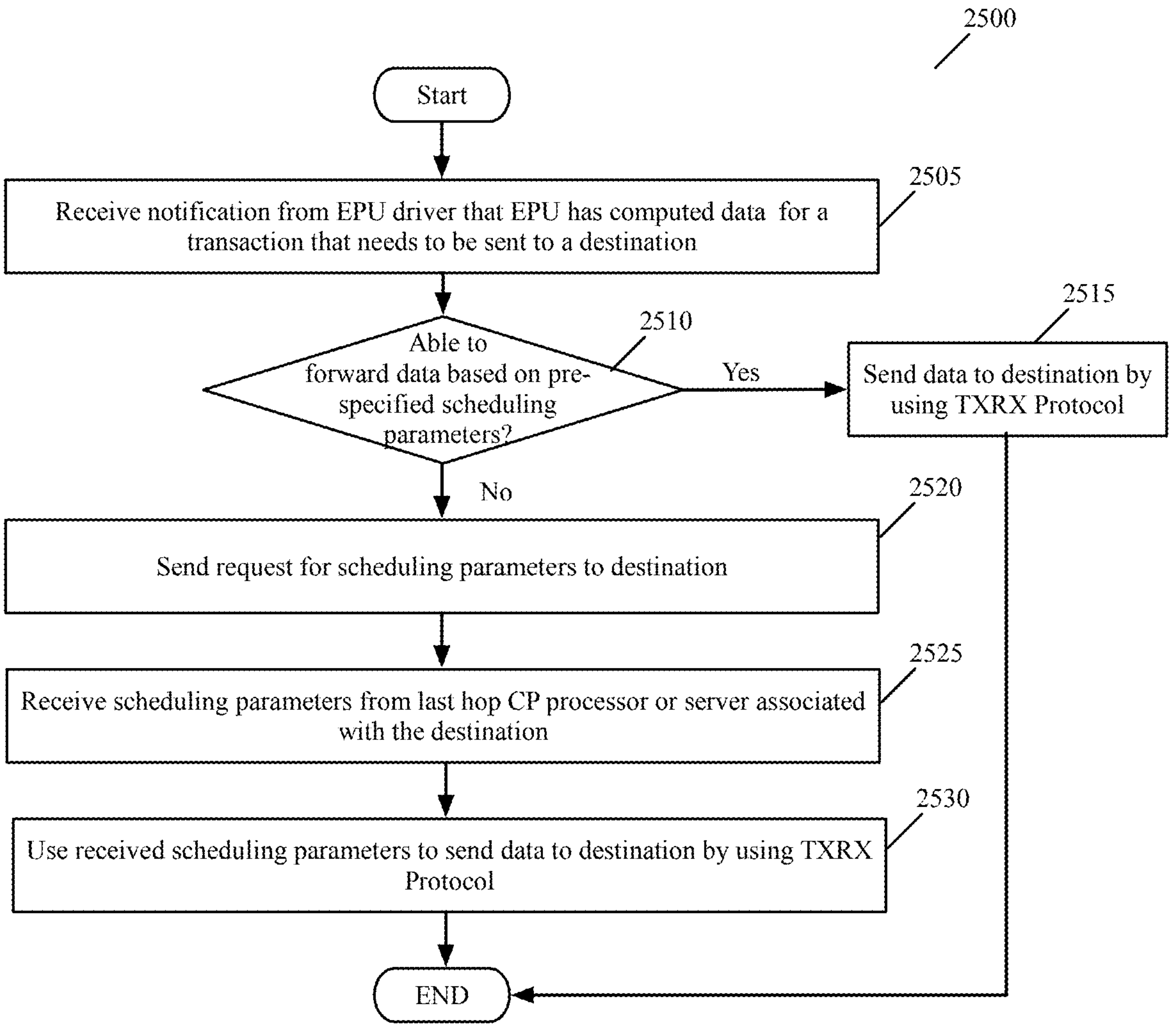
FIG. 25 presents a process that conceptually illustrates operations performed by an EPI when the EPI needs to reactively receive scheduling parameters for a transaction that is completed by its EPU.

Reactive scheduling of the EPIs in some embodiments will now be described by reference to FIGS. 25 and 26. FIG. 25 presents a process 2500 that conceptually illustrates operations performed by an EPI when the EPI needs to reactively receive scheduling parameters for a transaction that is completed by its EPU. This process 2500 will be described below by reference to FIG. 26, which illustrates an example where a source EPI 2605 in some embodiments reactively receives scheduling parameters for a transaction completed by its source EPU 2610.

In this example, the source EPI 2605 reactively requests the scheduling parameters by sending an in-band TXRX request message (i.e., a request message formatted according to the TXRX protocol 2100) to a destination EPI 2625 of a destination EPU 2620 that is supposed to receive the results of the computed transaction. As shown, and as further described below, a CP processor 2644 of a last-hop forwarding element of the destination EPI 2625 intercepts this scheduling-parameter request, reactively schedules this transaction by generating the requested scheduling parameters, and then provides the requested scheduling parameters in its TXRX reply message (i.e., a request message formatted according to the TXRX protocol 2100).

Figure 26:
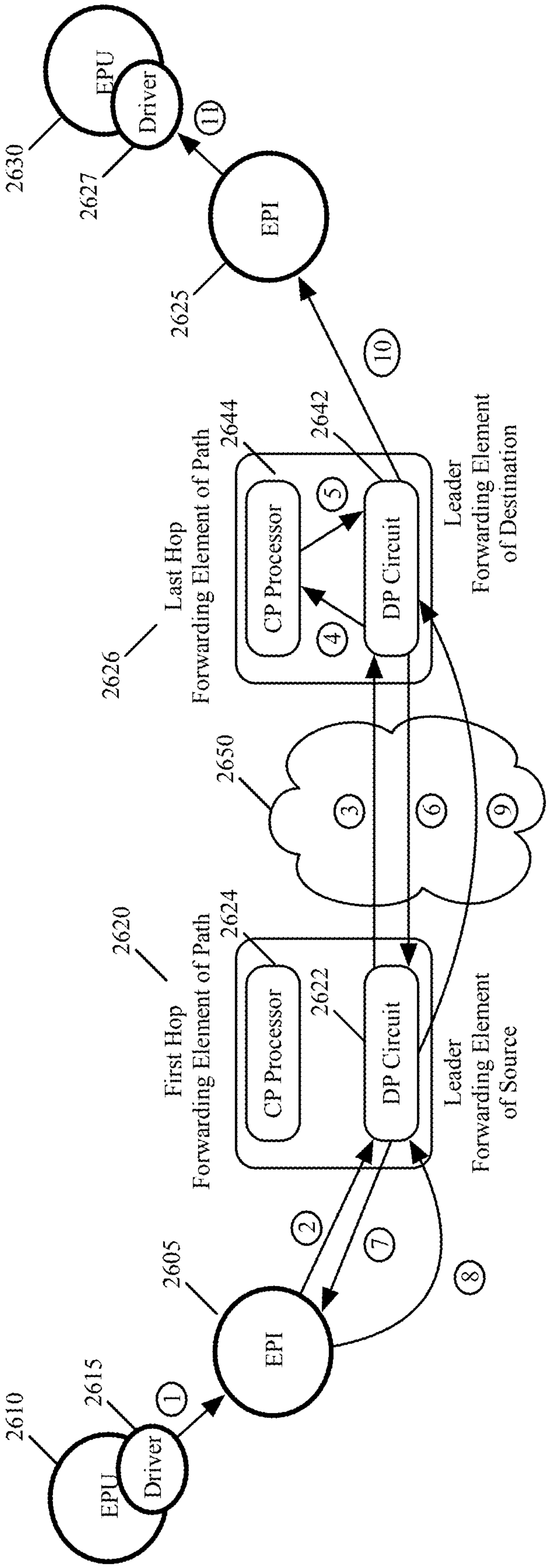
FIG. 26 illustrates an example where a source EPI in some embodiments reactively receives scheduling parameters for a transaction completed by its source EPU.

As shown in FIGS. 25 and 26, the process 2500 starts when the source EPI 2605 receives (at 2505) a notification from the driver 2615 of the source EPU 2610 that its EPU 2610 has completed a transaction that has resulted in data that needs to be sent to the destination EPU 2630. In some embodiments, the driver 2615 provides this notification by providing a transmit descriptor for the completed transaction to the EPI 2605.

In these embodiments, each time the driver detects that its EPU has completed a transaction, it notifies the EPI of the completion of the transaction by providing a transmit descriptor for the transaction to the EPI. The transmit descriptor includes a pointer to the memory location that stores the transaction's result that the EPU computed. The corresponding receive side descriptor that the destination EPI 2625 receives from the driver 2627 of the destination EPU has a pointer to the destination EPU's memory location that should store the payloads of the data message flow transmitted by the source EPI 2605 for the transaction.

At 2510, the source EPI 2605 determines whether the scheduling service 2220 of the RSO server cluster 2205 has proactively provided a set of scheduling parameters for the transaction. In some embodiments, the EPI 2605 determines (at 2510) that it has the necessary scheduling parameter set to transmit the result of the completed transaction when the EPI assesses that the transaction is a small transaction (e.g., produces a result that is smaller than the requisite threshold size, as described above by reference to operation 915 of FIG. 9, or is otherwise defined as a small transaction).

In some embodiments, the EPI also determines (at 2510) that it has the necessary scheduling parameter set when it determines that it has previously received the scheduling parameter set for the transaction from the proactive scheduler. As mentioned above, the proactive scheduler in some embodiments is the scheduling service 2220 of the RSO servers 2205. The proactive scheduler provides to the EPI 2605 the scheduling parameter set for a transaction through the EPI's leader first-hop forwarding element (which is forwarding element 2620 in this example), when the scheduling service 2220 proactively schedules one or more transactions of the EPU 2610. As mentioned above, the scheduling parameter set in some embodiments includes a start time (also called launch time) and transmission rate.

When the EPI 2605 determines (at 2510) that it has the necessary scheduling parameter set to transmit the result of the completed transaction (either because it has received proactively scheduled parameters from the scheduling service or has determined that the computed results are less than a threshold size), the EPI does not need to reactively request scheduling parameters from the destination EPI 2625. Hence, it transitions to 2515 to send data to the destination EPU 2630 by using the TXRX protocol 2100, and then the process ends.

With the Transmit Descriptor for the transaction, the EPI 2625 in some embodiments stores (at 2515) the transmission rate and launch time that the EPI used to transmit the data message flow for the transaction, as metadata for the transaction. This metadata is stored in the memory of the EPU 2630. The RSO servers in some embodiments can later process the stored metadata to analyze the forwarding of the transaction's result alone, or in conjunction with the forwarding of results of other transactions, for debug and/or performance evaluations.

On the other hand, when the EPI 2605 determines (at 2510) that it does not have the necessary scheduling parameter set for the completed transaction, the EPI 2605 sends (at 2520) an in-band TXRX request message to the destination EPI 2625 of the destination EPU 2620. This request message is a request for scheduling parameters that are needed for the completed transaction. As further described above as well as below, the TXRX message structure in some embodiments includes a field that specifies whether the message is a control or data message. In some of these embodiments, the scheduling-parameter request message is a TXRX message that specifies that it is a control message that is requesting scheduling parameters. In some embodiments, the data of this control message specifies that the sender needs to send a certain amount of data to a particular destination EPU.

As shown in FIG. 26, this message traverses through the data plane circuit 2622 of a first-hop forwarding element 2620 (e.g., a first-hop switch) directly connected to the EPI 2605, and through intervening network fabric 2650 before reaching last-hop forwarding element 2640 in the path to the destination EPI 2625 and destination EPU 2630. This last-hop forwarding element is a first-hop forwarding element of the EPI 2625 in that it has a direct physical link with this EPI 2625.

As shown, the CP processor 2644 of the forwarding element 2640 intercepts this scheduling-parameter request and provides the requested scheduling parameters. Hence, for the embodiments illustrated in FIGS. 25 and 26, it is the CP processor of the last hop forwarding element 2640 connected to the destination EPI that processes the reactive scheduling request. In other embodiments, however, the CP processor of the first-hop forwarding element 2620 of the source EPI 2605 performs this reactive scheduling.

To intercept the scheduling-parameter request, some embodiments define a policy-based rule in the DP circuit 2642 of the forwarding element 2640 to direct all TXRX scheduling-request data messages to the CP processor 2644 of the forwarding element. Also, to expedite this forwarding, some embodiments use the DPDK framework to expedite the data plane to control plane communication that forwards a scheduling-request data message from the data plane circuit 2642 to the CP circuit 2644.

After receiving the scheduling-parameter request, the CP processor 2644 reactively schedules this transaction by generating the requested scheduling parameters and then providing the requested scheduling parameters in its TXRX reply message. In some embodiments, the CP processor 2644 provides the scheduling parameters after waiting for a timeout period (e.g., setting a timer upon receiving the request and only responding once the timer has expired) to determine whether it receives another scheduling-parameter request for another data message flow that is destined to the same port of the destination EPI 2625. In other embodiments, the CP processor 2644 uses the timeout period to determine whether it receives another scheduling-parameter request for another data message flow that is destined to the same destination EPI 2625 or the same destination EPU 2630 instead of just limiting its assessment to the same port of the same destination EPI 2625.

After the timeout period, the CP processor provides the scheduling parameter set by using one set of heuristics. In some embodiments, the CP processor 2644 uses a greedy heuristic. For instance, in some embodiments, the CP processor 2644 checks a database to determine the amount of bandwidth that it currently has assigned to other flows, computes its available bandwidth based on this determination, and then assigns all of the available bandwidth associated with the receiving port of the destination EPI 2625 (i.e., the port that will receive the data message flow from the EPI 2605 for this transaction) to the data message flow from the EPI 2605. For instance, if 40% of the bandwidth of a destination (e.g., a particular port of the destination EPI 2625) is currently assigned to one flow, and two new flows have requested bandwidth for transmitting to the same destination, the CP processor 2644 would assign half (30%) of the available (60%) bandwidth to each new flow.

In other embodiments, the CP processor 2644 subdivides the available bandwidth associated with the receiving port of the destination EPI 2625 by the number of current and new data message flows received at this port, and assigns each existing and new data message flow one of the subdivided portions of the bandwidth. For instance, if 40% of the bandwidth of a destination (e.g., a particular port of the destination EPI 2625) is currently assigned to one flow, and two new flows have requested bandwidth for transmitting to the same destination, the CP processor 2644 would assign one third (33%) of the bandwidth to each flow. To implement such an approach, the CP processor 2644 would have to send new scheduling parameters to the source EPI of the existing flow. This existing flow might have been previously proactively scheduled by the RSO server cluster, or reactively scheduled by CP processor 2644 or another CP processor of another MFE in the RSF network. In some embodiments, such rescheduling is not desirable and hence is not performed.

Instead of using the CP processor 2644 to perform the reactive scheduling operations of FIG. 26, other embodiments use a CP proxy server that executes on a separate computing device than the forwarding element 2640 to generate the requested scheduling parameters and then provide the requested scheduling parameters to the EPI 2605. In some such embodiments, the DP circuit 2642 is configured to forward scheduling-parameter requests to the CP proxy server. In some of these embodiments, the CP proxy server then provides its reply to the DP circuit 2642 to forward the generated scheduling parameters in a TXRX reply message back to the EPI 2605.

As shown in FIG. 26, the DP circuit 2622 of the forwarding element 2620 receives the TXRX reply message and forwards this reply back to the EPI 2605. Hence, the EPI 2605 receives (at 2525) the reactively requested scheduling parameters in the TXRX reply message. In some embodiments, the requested scheduling parameters include the start time and transmission rate for the transmitting the data message flow that will contain the computed results of the transaction.

The EPI 2605 then uses (at 2530) the received scheduling parameters and the TXRX protocol to send the data message flow (e.g., at the scheduled start time with the scheduled rate) to the destination EPU for the data. After 2530, the process 2500 ends. Like the end of forwarding operation 2515, the EPI 2625 after completing the forwarding operation at 2530 in some embodiments stores (at 2515) the transmission rate and launch time that the EPI used to transmit the data message flow for the transaction, as metadata for the transaction. This metadata is stored with the Transmit Descriptor for the transaction in some embodiments and can be used for later analysis for debug and/or performance evaluation.

FIG. 26 illustrates the EPI 2605 sending the data message flow for the transaction to the EPI 2625 through the DP circuits 2622 and 2642 and the intervening network fabric 2650 between these two DP circuits. It also shows the EPI 2625 forwarding the payload data from the transmitted data message flow to the destination EPU 2630. In some embodiments, the EPI 2625 stores the payload data in the memory location specified by the receive descriptor that the destination EPU's driver 2627 provided for this transaction.

After the source EPU completes a transaction and its associated driver provides a transmit descriptor for the completed transaction to the source EPI, the source EPI determines whether it is able to transmit the result of the transaction to its destination based on preconfigured or proactively provided scheduling parameters. When the EPI does not have such requisite scheduling parameters, it obtains them through an in-band scheduling request to the reactive scheduler, as described above by reference to FIGS. 25 and 26.

Once the source EPI determines that it has the requisite preconfigured, proactively provided, or reactively provided scheduling parameters, the source EPI then starts the data transmission by using the TXRX protocol 2100. As mentioned above, this protocol in some embodiments governs the data message structure 2122 for sending data messages (e.g., L2 frames, L3 packets, etc.) between the EPIs, the type 2124 of messages exchanged between the EPIs, and the sequence 2126 of messages exchanged between the EPIs.

Figure 27:
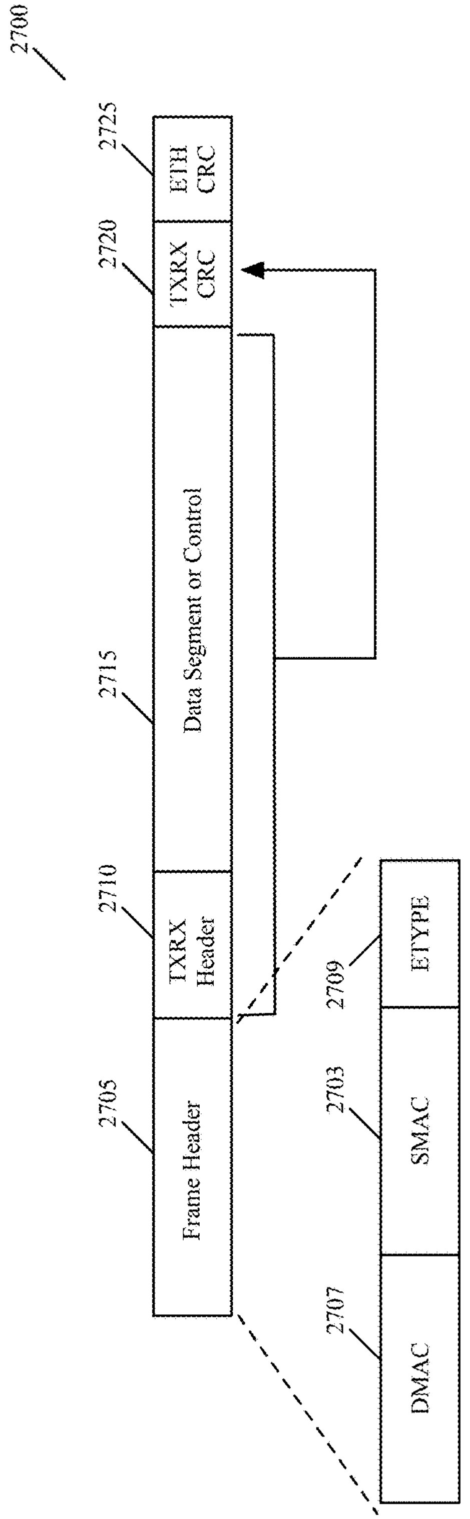
FIG. 27 illustrates an example of an Ethernet frame used by as the data message structure of the TXRX protocol to send data messages through the L2 switches of the RSF network of some embodiments.

FIG. 27 illustrates an example of an Ethernet frame 2700 that the TXRX protocol of some embodiments uses as the data message structure for sending data messages through the L2 switches of the RSF network. Each such frame carries one segment of data. As shown, the frame 2700 has a frame header 2705, a TXRX header 2710, a data or control segment 2715, a TXRX CRC field 2720 and a frame CRC field 2725. The protocol in some embodiments uses fixed size data segments (e.g., 1 KB or 4 KB), except for the last segment which may be shorter. For instance, some embodiments allocate 20 bytes for the headers 2705 and 2710, 1024 bytes (1 KB) for the payload data segment 2715, and 8 bytes for the CRC fields.

The CRC fields are used to perform CRC operations on the TXRX header and the overall frame. The frame header 2705 includes a source MAC address 2703, a destination MAC address 2707 and an Ethertype field 2709. Table 1 below provides further explanation of the different fields of the Ethernet frame 2700.

TABLE 1

| Byte | n | Notes |
|---|---|---|
| 0 | 0x02 | DMAC': 6-bytes, DMAC-like, pass through L2 standard switches: • Byte 0 = 0x02: locally administrated addresses • Byte 1 = 0xDD: identifying the message as an RSF data message. • Byte 2..5 are for the forwarding tag that is used for performing next-hop forwarding (e.g., to identify egress port) at each hop along the path through fabric |
| 1 | 0xDD | |
| 2 | Forwarding_TAG[31:24] | |
| 3 | Forwarding_TAG[23:16] | |
| 4 | Forwarding_TAG[15:8] | |
| 5 | Forwarding_TAG[7:0] | |
| 6 | 0x02 | SMAC': 6-bytes, SMAC-like, locally administrated • Byte 0 = 0x02: locally administrated addresses • Byte 1 = 0xDD; identifying the data message as an RSF data message • Byte 2..3 = destination Queue ID • Byte 4..5 = source Queue ID Switches in some embodiments ignore the content of bytes 6...11 (normally SMAC). SMAC used in some embodiments for specifying queue ID - set by sender so that when the receiver gets it, the receiver will know what receiver queue is associated with this message |
| 7 | 0xDD | |
| 8 | DST_QID[15:8] | |
| 9 | DST_QID[7:0] | |
| 10 | SRC_QID[15:8] | |
| 11 | SRC_QID[7:0] | |
| 12 | Ethertype | Fix value: 0xDDDD (default) |
| 13 | | |
| 14 | MESSAGE_TYPE | Transmitter issued: • DATA(0): • DATA_LAST(1): • RDY_REQ(2) • CHK_REQ(3) Receiver issued: • DATA_ACK(16) • RDY_ACK(17) • CHK_ACK(18) |
| 15 | Byte/Retry Counter | For DATA_LAST: indicates number of valid bytes in this frame if there was padding. Set to 0 otherwise and the payload length is derived from length of frame. For RDY_REQ/ACK and CHK_REQ/ACK: indicates the retry number starting at 0 with the first attempt. Transmitter only accepts ACK with the same retry number as the REQ. |
| 16 | SEGMENT[31:24] | Segment number for DATA packet. Block number for DATA_ACK, CHK_REQ and CHK_ACK. The block number is sent as block_no*1024, which is also the first segment of the block. Not used for RDY_REQ/ACK, set to 0. |
| 17 | SEGMENT[23:16] | |
| 18 | SEGMENT[15:8] | |
| 19 | SEGMENT[7:0] | |

As specified in Table 1, the first six bytes are for the DMAC' attributes, which are a DMAC-like set of attributes, while the next six bytes are for the SMAC' attributes, which are an SMAC-like set of attributes. The DMAC' attributes include the forwarding tag used for performing the mapping operations (e.g., the match-action operations) at each hop along the path to the destination to identify the egress port to use at that hop. This forwarding tag and mapping operations were described above by reference to FIG. 17. The SMAC' attributes, in some embodiments, include the queue ID or queue IDs. As described above, some embodiments embed the source and/or destination queue IDs in the data messages (e.g., in the SMAC' attributes). Other embodiments use one queue ID for the queue pair. Still other embodiments use a context ID within the header instead of the queue ID, which has a 1:1 mapping to the queue ID if only one transaction is sent between the pair of queues. If multiple transactions are sent between a pair of queues at a sender and a receiver, the context ID disambiguates these transactions. The thirteenth and fourteenth bytes identify an Ethertype for the frame (e.g., to specify that the subsequent bytes will be formatted according to the TXRX header 2710). In some embodiments, the first through fourteenth bytes of Table 1 correspond to the packet header 2705 in FIG. 27.

The fifteenth byte (byte 14) starts the TXRX header 2710, which includes the fifteenth through twentieth bytes (bytes 14 to 19 in Table 1) of the frame 2700. The TXRX header 2710 is an L4 header in some embodiments. In these embodiments, each data message that uses the data message structure 2700 has an L2 header (e.g., bytes 0-13) and an L4 header (e.g., bytes 14-19), in addition to a payload, but does not include any L3 header. As specified in Table 1, the fifteenth byte (byte 14) in some embodiments identifies the data message type, i.e., whether the data message is a control message, a DATA message, a DATA_LAST message, a RDY_REQ message, or a CHK_REQ message when sent by transmitting EPI, and a DATA_ACK message, a RDY_ACK message, or a CHK_ACK message when sent by the receiving EPI.

The sixteenth byte (byte 15) in some embodiments includes the Byte/Retry Counter. For DATA_LAST messages (the last data message of a transaction), this byte indicates the number of valid bytes in the frame if padding is used. When set to 0, the payload length is derived from the length of the frame in some embodiments. For RDY_REQ/ACK and CHK_REQ/ACK messages, the sixteenth byte indicates the retry number, starting with 0 for the first attempt. The transmitter in some embodiments only accepts an ACK with the same retry number as the REQ sent (e.g., as the last REQ message sent). In some embodiments, the last four bytes (bytes 16-19 in Table 1) contain the segment data. Other embodiments might use fewer or more bytes for segment data.

The segment data includes the segment number (also called segment ID) for a DATA message. This segment ID, in some embodiments, implicitly includes a block number (block ID) as well as an indicator as to which segment in the block the DATA message belongs. For instance, in some embodiments, the last 10 bits of the segment data specify the segment ID within a block (as 10 bits are needed to specify any of 0-1023) while the other bits (or a portion of the other bits) are used to specify the block ID. For DATA_ACK, CHK_REQ and CHK_ACK messages, the segment data includes the block ID. The block ID in some embodiments is sent as the (block number)*1024, which also corresponds to the first segment of the block. The segment data is not used for RDY_REQ/ACK, and hence is set to 0 for these messages. After byte 19, in some embodiments, are the data or control bytes 2715 for the payload, followed by the TXRX CRC field 2720 and the Ethernet CRC field 2725, as shown in FIG. 27.

The first twelve bytes in the frame 2700 are referred to as DMAC-like and SMAC-like in Table 1 because some embodiments use traditional switches for the managed forwarding elements that form the RSF network along with the EPU EPIs. In these embodiments, the traditional switches are programmatically configured to treat the first six bytes as the DMAC address and the next six bytes as the SMAC address. In other words, they are configured with match-action records that map the values in the DMAC address (and in some cases the SMAC address) to their egress ports in order to forward messages along their desired paths to their destinations (i.e., the destinations of these messages).

In some of these embodiments, the switches are configured so that they do not perform any of their traditional learning operations as the values in the first twelve bytes do not correspond to actual DMAC or SMAC values, but rather correspond to values needed for performing the mapping operations of the match-action records. Also, in some of these embodiments, the EPU EPIs are interfaces that are custom designed and manufactured for the RSF network, the TXRX protocol, and the desired match-action forwarding of these embodiments. In other embodiments, the EPIs are traditional NICs that are configured to use the TXRX protocol. In these embodiments, the launch-time feature of the NICs is used to control when the NICs start sending the data message flow(s) for a completed transaction. The launch-time values of these NICs in some embodiments are set through the proactive scheduling of the logically centralized schedulers and/or the reactive scheduling of the in-band CP schedulers.

Table 1 provides one way that some embodiments use to embed transport layer (L4) parameters (also called TLP parameters) in the forwarded data messages in order to implement the TXRX protocol. Specifically, this table illustrates that some embodiments embed TLP parameters in an L4 header of a data message structure that only has an L2 header (bytes 0-13) and an L4 header (bytes 14-19), but no L3 header. Other embodiments embed this data differently than the manner described above by reference to Table 1, e.g., some embodiments embed the forwarding tag partly or fully in the SMAC field 2703. Also, other embodiments use other techniques to embed the TLP parameters (necessary for implementing the TXRX protocol) with the data messages forwarded through the network fabric in order to exchange the EPU computation results. For instance, in some embodiments, the TLP parameters are included in an L2 encapsulation header (such as in a Geneve header), in one or more auxiliary fields of the L2 header, or in an auxiliary L2 header.

As described above, some embodiments configure communication between EPUs that are in different L3 domains. These different L3 domains can be in the same rack, same datacenter, different datacenters in the same location (e.g., same neighborhood or city), or different datacenters in different geographic locations (e.g., different neighborhoods, cities, regions, states, countries, etc.). When the TXRX protocol is used to transmit data between EPUs in different L3 domains, an egress router, gateway, or other network extender in a first L3 domain encapsulates in some embodiments the frame 2700 for a data message from a first EPU in the first L3 domain to a second EPU in a second L3 domain. For instance, some embodiments use an L3/L4 header (e.g., an IP/UDP header) for the encapsulation, allowing the frame to traverse to the second L3 domain (e.g., through intervening network fabric if any) and/or to be processed at the second L3 domain by an ingress router, gateway, or other network extender.

Figure 28:
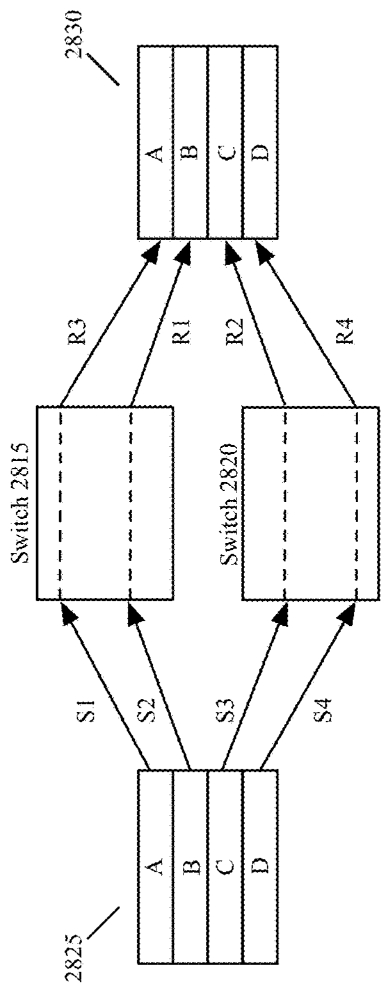
FIG. 28 illustrates an example that shows how a segment ID can be used to support multi-pathing in some embodiments.

The segment ID that the TXRX protocol uses in its segment data of the frame 2700 of FIG. 27 allows this protocol to support multi-pathing. FIG. 28 illustrates an example that shows how the segment ID can be used to support multi-pathing in some embodiments. This figure illustrates an example in which a sender uses multiple paths to transmit the results of a transaction to a destination. The transaction's data in this example is decomposed into four segments A, B, C and D in a memory 2825 of a source EPU. These four segments are sent from a source EPI to a destination EPI along four different paths through two switches 2815 and 2820. These four segments are associated with a queue that is associated with the destination EPU.

Each of the four paths depends on the egress port selected and the source assigned tag (e.g., the tag used in place of the DMAC address in some embodiments). The path selected depends on match-action mapping records provided by the topological services of the RSO server cluster. Because of the multi-path nature, data messages may arrive out of order and the TXRX protocol is designed to support this.

In the example of FIG. 28, even though data messages A, B, C, and D are sent in the sequential order of A, B, C, and D, they arrive out of order with B arriving first, followed by C, and then A and D. However, the destination EPI uses the segment ID specified in each received data message to place each segment in the correct memory location of the memory 2830 of the receiving EPI's associated EPU, as shown in FIG. 28. In this example, segments A-D are sent respectively with segment IDs 1-4, and these segment IDs are then used to correctly re-assemble in the correct order the segments A-D, which arrive out of order at the receiving EPU.

In some embodiments, the source EPU's result can be divided into multiple blocks with each block having multiple segments and different blocks using the same segment ID. In some of these embodiments, a destination EPI uses both the segment and block IDs to correctly re-assemble in the correct order the source EPU's result in the destination EPU's memory, as the segment ID is not sufficient to perform this re-assembly (given that two different blocks can use the same segment ID). However, other embodiments only rely on the segment IDs as these embodiments use segment IDs that are unique across all blocks.

When multiple paths are used to transmit a result that is large enough to be divided into multiple blocks to a destination EPU (as in FIG. 28), some embodiments divide each block of data between the multiple paths (e.g., rather than assigning different blocks of data to different paths). Specifically, some embodiments sequentially assign the data segments (e.g., the 1 KB data segments) to the different paths, rotating through these paths. Thus, for a 16-segment result divided among four paths, the first path would send segments 0, 4, 8, and 12, the second path would send segments 1, 5, 9, and 13, the third path would send segments 2, 6, 10, and 14, and the fourth path would send segments 3, 7, 11, and 15.

In some embodiments, the EPI reads from memory a group of segments at once (e.g., with the number of segments equal to the number of paths used to send the result). Thus, if four paths are used, the EPI reads four segments worth of data (e.g., 4 KB) from the memory with each memory access. The EPI controller manages the stride (4 KB in this example) such that each read advances within the memory by this amount, and also manages the assignment of the segment IDs used within the TXRX protocol messages for each data segment. Other embodiments may read multiple segments per path with each memory access. If the number of paths being used needs to be reconfigured (e.g., because one of the paths fails or degrades), then the EPI controller handles the reassignment of data to the different paths (and potential reconfiguring of the amount of data to read per memory access).

If multiple EPIs are used to transmit data for one transaction, in some embodiments a communication path between the EPI controllers is used to manage the segment assignment as well as data segmentation. In some embodiments, these EPI controllers are the above-described dedicated controllers (e.g., RTL controllers) in the data planes of the EPIs. In some embodiments, these dedicated controllers of two or more EPIs of an EPU communicate with each other through a dedicated communication channel.

In some embodiments, one of the source EPIs of a source EPU handles the memory accesses (e.g., so that all of the data to be sent out across all of the paths for a group of contiguous segments can be read in a single memory access). The appropriate data for the various segments from such a memory access is then pulled by the appropriate EPIs to generate the data messages for these segments, without requiring separate memory accesses by the different EPIs.

As mentioned above, the topological service 2225 of the RSO server cluster 2205 in some embodiments identifies the paths through the RSF that are to be used for forwarding transaction results between different pairs of source and destination EPUs. In some of these embodiments, the topological services also determine whether a single path should be used between a pair of source/destination EPUs, or multiple paths should be used between this pair. In some embodiments, this determination is made on a per transaction basis. Hence, for a first transaction that that is computed by the source EPU, the topological services can specify that the result should be forwarded only along one path to the destination EPU. For a second transaction that that is computed by the source EPU, the topological services can then specify that the result should be forwarded along multiple path to the destination EPU. In some such embodiments, different forwarding tags are used for the different transactions at the source EPI and along any intervening forwarding elements.

Figure 29:
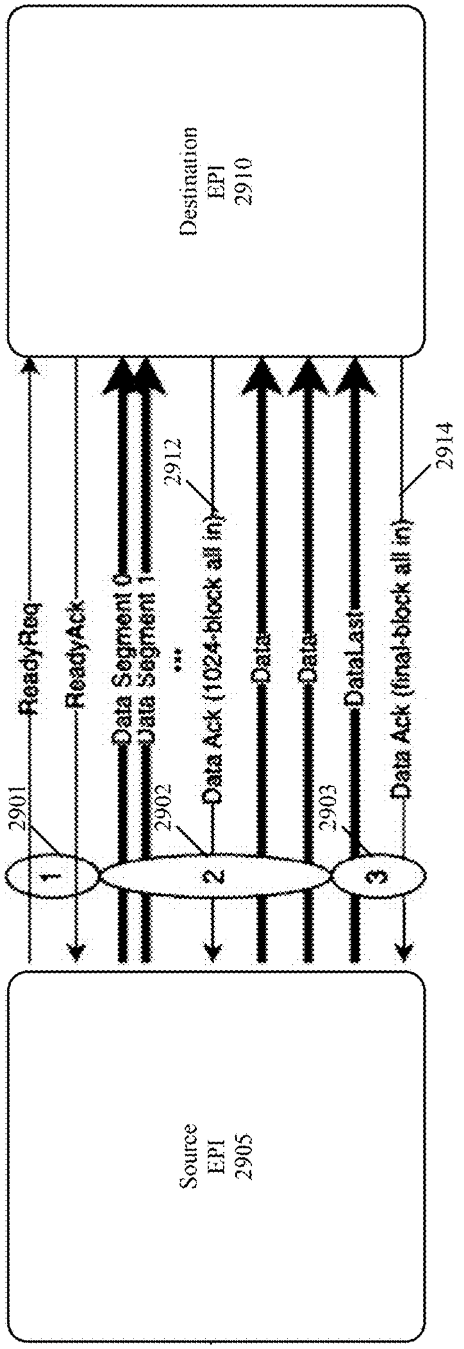
FIGS. 29 and 30 illustrate two examples of two data transfers that are implemented by the TXRX protocol of some embodiments.
Figure 30:
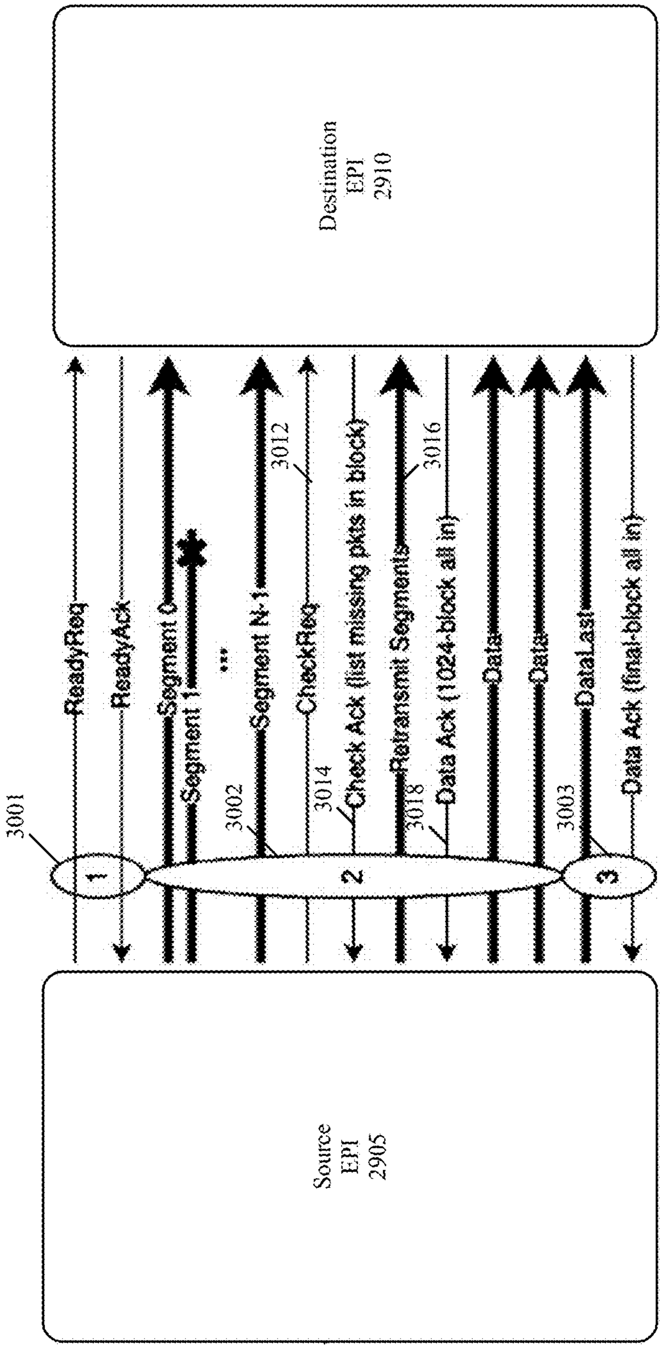

As discussed above by reference to FIG. 21, the TXRX protocol of some embodiments includes the following message types 2124: Ready Request (REQ), Ready Acknowledgement (Ready_ACK), Data, Data_ACK, Check_REQ, Check_ACK, and Data_Last. To illustrate how these message types are used in some embodiments, FIGS. 29 and 30 illustrate examples of two data transfers between a source EPI 2905 and a destination EPI 2910. In FIG. 29, no data message that contains a data segment is lost. On the other hand, in FIG. 30, the data message carrying Segment 1 is lost and has to be retransmitted.

Both of these examples illustrate three phases to the TXRX protocol in some embodiments. In the first phase 2901 or 3001, the source EPI 2905 checks to see if the destination EPU is ready to receive data by sending a ready request (RDY_REQ) and then receiving a ready acknowledgement (Ready_ACK). This is necessary in case the transmitter (i.e., the source) gets its descriptor ahead of the receiver (i.e., the destination). Before sending its Ready_ACK, the receiver in some embodiments checks that a queue has been pre-allocated for the transaction. A transaction ID is used in some embodiments to ensure that the right transaction is in place. The first phase can be skipped in some embodiments when it is known that the receiver is ready by some other means. In some embodiments, the source EPI will generate and send up to a specified number of retries of the RDY_REQ message, and then give up if unsuccessful. The Ready_ACK message in some embodiments marks the start of a TXRX session between the source and destination EPIs.

The second phase 2902 or 3002 of the protocol in these examples handles the large data transfer offload. The messaging for this offload in some embodiments is in the form of data transmission (DATA), data acknowledgment (DATA_ACK), data check request (CHK_REQ), and data check acknowledgment (CHK_ACK) messages. The large transfer offload in some embodiments can support up to 4G segments of 1 KB segments (4 TB) or 4 KB segments (16 TB).

As shown in these examples, some embodiments use periodic block segment acknowledgements to avoid overloading the receiver EPIs. For instance, the receiver EPI 2910 in some embodiments generates 1024-bit scoreboards (128 bytes), with each scoreboard used to log arrival of segments in a 1024-segment block (i.e., the score keeping is aligned to the 1024-segment block boundary). In some of these embodiments, the scoreboard has one bit for each segment in the block that the receiver sets (e.g., sets to 1) when the receiver receives the segment, and leaves unset (e.g., leaves as 0) when the receiver has not received the segment.

The receiver in some embodiments sends an intermediate DATA_ACK back for every block of 1024 segments (such as DATA_ACK 2912 in FIG. 29 for the 1024-segment block), and for the final block (which can be a partial block, such as DATA_ACK 2914 which is for the second partial block in FIG. 29), but only if all segments of that block have been received. Sending 1024 1 KB-segments at 1 TB/s requires about 1 microsecond. In some embodiments, the number of scoreboards allocated is defined per transaction, respects the total number of hardware scoreboards available, and is chosen based on the latency variance across paths in the network.

The source EPI in some embodiments tracks incoming DATA_ACK messages while transmitting segments, and stops sending data after N blocks (N*1024 segments) when the source EPI fails to receive a DATA_ACK for the oldest block in flight. In some embodiments, this number of blocks N is based on the number of scoreboards allocated for the transaction. When the sender's transmission stalls for a threshold time period (e.g., because no DATA_ACK has been received for that oldest block), the sender sends a check request (CHK_REQ) for the unacknowledged block (i.e., the block for which the sender has not yet received a CHK_ACK). The sender may also send a CHK_REQ message prior to reaching the point at which it needs to stop sending data in some embodiments (e.g., after failing to receive a DATA_ACK once the last segment of a block has been sent). FIG. 30 illustrates the source EPI 2905 sending a CHK_REQ message 3012 for the first block. In this case, the destination EPI 2910 did not receive segment 1 of this block and thus did not send a DATA_ACK message to acknowledge completion of receipt for the block.

The receiver EPI 2910 includes the scoreboard for this block in the CHK_ACK reply 3014, allowing the sender EPI 2905 to identify which packets are missing from the receiver. The sender EPI 2905 then retransmits any missing segments (e.g., segment 1) via another DATA message 3016, and receives a DATA_ACK 3018 when the receiver EPI 2910 completes its score board for the affected first block that includes Segment 1.

In some embodiments, the sender EPI repeats the CHK_REQ message and resends any data segments indicated as missing in the corresponding CHK_ACK message) until it achieves success (i.e., a DATA_ACK message is received indicating all segments of the block have been received at the destination), or until it reaches a maximum number of retries. Once retransmission is complete, the sender resumes normal data transfer. The TXRX protocol in some embodiments supports a programmable timeout and a programmable number of retries for start, end, and check requests.

This periodic scoreboard acknowledgment technique is not only useful in avoiding the overloading of the receiver EPIs, but also when the source and destination EPUs are in different geographic sites that are connected through routers, gateway and/or other network extenders. This is because the conduit connecting these sites has larger latency than the network latency within one local site. If the transport protocol required faster or more responsive ACKs from the destination EPI than the aggregate scoreboard ACKs of the TXRX protocol, then the source EPI would more frequently send receipt check commands to the destination EPI, which would inefficiently send more unnecessary messaging through the conduit and add unnecessary responses to the destination EPI.

More generally, the TLP parameters (such as scoreboard parameters) stored inside of the Ethernet frames of some embodiments establish a TLP mechanism for a destination EPU in a first site to use to confirm to a source EPU in a second site that the destination EPU has successfully received all segments of a result that the source EPU computed and then forwarded to the destination EPU. This TLP mechanism is not affected by variable latency and jitter in a network connection between the first and second sites. Some embodiments allow the network administrators to programmatically modify the sizes of the scoreboards (e.g., changing the number of segments in a data block) to account for different delays between source and destination EPIs that can be experienced in different deployments.

The site-to-site communication is further enhanced by the encryption of the data message flows. For instance, in some embodiments, the source EPI of a source EPU encrypts a data message flow containing the result that the source EPU computed before sending the flow to the destination EPU (e.g., encrypts each frame of the data message flow, or encrypts the payload within each frame), where it will be decrypted by a destination EPU's EPI(s). The encryption allows the data message flow to traverse through forwarded elements that are not rated as trustworthy by a network administrator of the first and second sites.

The receiver in some embodiments recycles the oldest scoreboard when all of the bits of that scoreboard are set (e.g., are all 1s) and uses it as the next scoreboard, if the number of blocks in a flow exceeds the number of allocated scoreboards. However, if a DATA_ACK message is lost (i.e., not received at the source), the source EPI might subsequently request a scoreboard for a data block that the receiver no longer has because all of the data segments were received and the scoreboard was thus reused. In such a case, the receiver in some embodiments fabricates a dummy scoreboard with all of the bits set and sends this dummy scoreboard to the source.

In the third phase 2903 or 3003 of the TXRX protocol of some embodiments, the sender EPI 2905 terminates a transaction by sending a DATA_LAST for the last segment and waits for the final DATA_ACK from the receiver to acknowledge reception of all segments of the transaction. In some embodiments, the sender EPI determines that a transaction is completed once the sender receives the final DATA_ACK, while the receiver EPI determines that the transaction is completed upon sending the final DATA_ACK. If the final DATA_ACK is lost, the sender EPI in some embodiments generates and sends a CHK_REQ message to determine whether data is missing at the receiver. If the receiver has already declared the transaction complete and deleted the scoreboards, then the receiver fabricates a dummy all scoreboard indicating all segments were received and sends the CHK_ACK message with this scoreboard.

For the scoreboard technique to work, some embodiments use a unique transaction ID for each transaction for a given queue, in order to distinguish different transactions. Hence, a new transaction must not match a previous transaction for a given queue.

Figure 31:
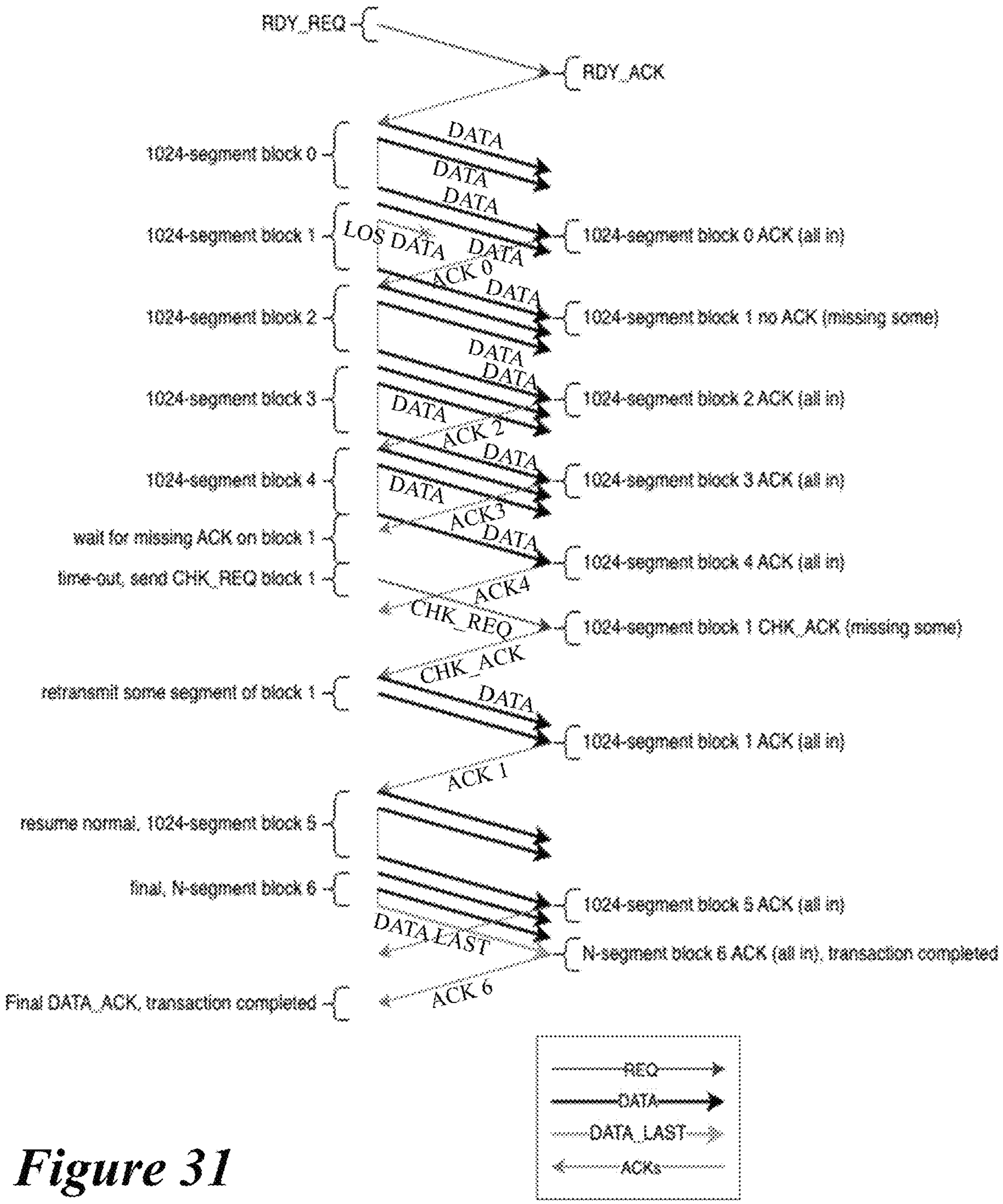
FIG. 31 illustrate an example of a larger data transfer.

FIG. 31 illustrates an example of a larger data transfer between the source and destination EPIs 2905 and 2910. In this example, the source EPI 2905 does not send the check request for the second segment block (Block 1) with the missing scoreboard (with the missing DATA ACK) from the receiver EPI 2910 until it has received two other scoreboards ACK2 and ACK3 for two subsequent 1024-segment blocks (Blocks 2 and 3).

As shown, the destination EPI 2910 sends a check acknowledgement (CHK_ACK) message in response to the check request for block 1. This acknowledgment identifies the missing segment(s) in this block. The source EPI 2905 then retransmits the missing segment(s) in this block. When the destination EPI 2910 receives the missing segment(s) in block 1, the destination EPI 2910 transmits the DATA ACK for this block. The source EPI 2905 then resumes its transmission of the remaining blocks 5 and 6, as it had previously transmitted and received the ACK for block 4. The source EPI's last data transmission for block 6 is a DATA LAST message to indicate that it is the last data message. The destination EPI 2910 sends its final DATA_ACK once it receives the DATA_LAST message and confirms that its scoreboard indicates reception of all prior segments in the final block 6.

The final DATA_ACK message for the final data block in some embodiments marks the end of a TXRX session between the source and destination EPIs. When the source EPU's result has been sent along one path to one destination EPI in one TXRX sessions, the end of this session marks the completion of the data transfer, which is then noted in the RX queue (e.g., queue 1206) for the source EPU's process (e.g., driver or kernel process). In case the source EPU's result is sent along multipaths from one or more source EPIs to one or more destination EPIs, some embodiments define only one TXRX session across all the paths as this approach has some advantages (e.g., allowing one scoreboard to be maintained for each block having segments that may have been sent along different paths). Hence, under this approach, TXRX session ends similarly, i.e., upon reception of the final DATA_ACK message for the final data block.

As mentioned above, a source EPI in some embodiments tracks incoming DATA_ACK while transmitting segments, stops sending data after N blocks (N*1024 segments) when it fails to receive a DATA_ACK for the oldest block in flight, and after detecting that the transmission has stalled for a threshold time period, sends a check request (CHK_REQ) for the unacknowledged block (i.e., the block for which the sender has not yet received a CHK_ACK). Other embodiments, however, use other criteria for sending the check request. For instance, in some embodiments, the source EPI sends a check request for a first block after determining that a block-complete notification (DATA_ACK) has not been received for the first block even though it has received the block-complete notification(s) for N blocks after the first block, where N is an integer such as 1, 2, 3 or larger.

Figure 32:
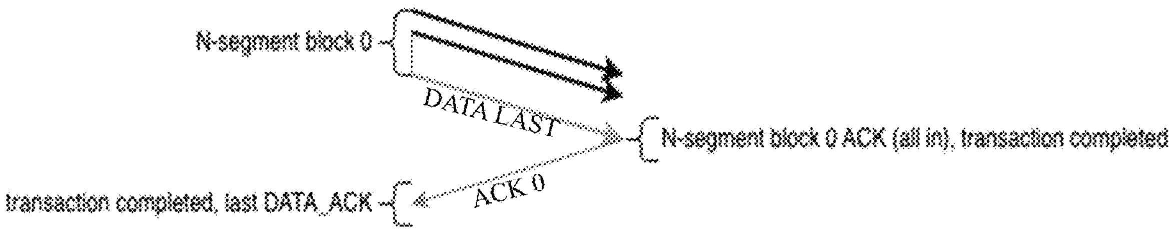
FIG. 32 illustrate an example of a small data transfer.

FIG. 32 illustrates an example of a small data transfer between the source and destination EPIs 2905 and 2910. In this example, the data transfer is so small that the transfer ends before the destination EPI 2910 reaches its threshold to send its first DATA ACK (i.e., to complete its first scoreboard). Hence, the source EPI 2905 sends its DATA LAST message before the destination EPI 2910 has a chance to send its first scoreboard. After receiving the DATA LAST message and confirming that the destination EPI has received all segments in the one and only block, the destination EPI 2910 sends its DATA ACK to confirm receipt of all the segment and the completion of the data transfer for the transaction.

In some embodiments, TXRX Protocol is designed based on the following principles. The sender EPI implements network time-outs and retries, while the receiver does not implement time-outs and retries as the receiver EPI only follows the data messages received. The receiver answers always positively to a request or message from sender and does emit data messages without explicit solicitation from a data message received from sender. The RDY_REQ/ACK and CHK_REQ/ACK retries are numbered to ensure that the transmitter reacts to the correct ACK message and not a later or previous one.

The protocol in some embodiments tolerates a very short time out at the sender EPI. For example, if the latency in the network is known to be less than X microseconds for 95% of the time, the timeout is set to X microseconds in some embodiments. In some embodiments, the protocol also limits a sender to only one transaction in flight at any time such that the sender does not start a new transfer until the current transfer completes. In some embodiments that handle more than one transaction at a time, the sender EPI uses different queues. The TXRX protocol in some embodiments is designed to process packets of a given transaction at line rate but not necessarily do so from one transaction to the next. Also, in some embodiments, the TXRX protocol supports the use of multi-pathing and latency variations across paths.

Some embodiments allow an EPU driver to direct its associated EPI to send a transaction's result as two different types of data flow, which are (1) TXRX data message flow and (2) default L2 data message flow. These embodiments provide this ability to allow system administrators to opt out of using the TXRX protocol for some of the EPU transactions. The EPU driver informs its associated EPI of the type of message flow to use through the transaction descriptor that it provides to its EPI.

Figure 33:
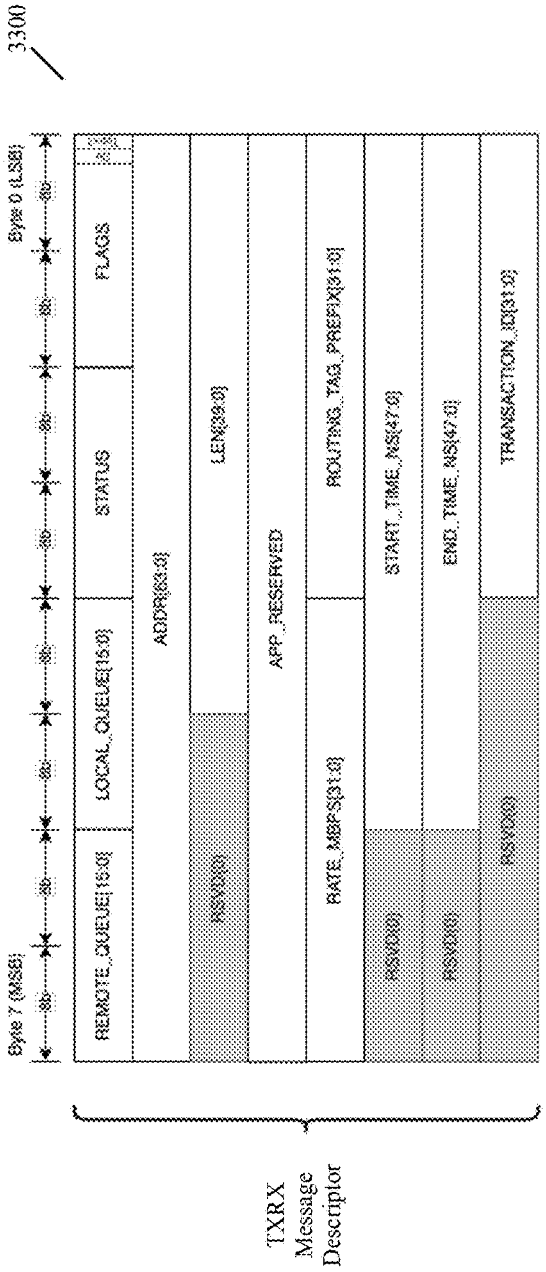
FIGS. 33 and 34 respectively illustrate a TXRX descriptor and an L2 descriptor
Figure 34:
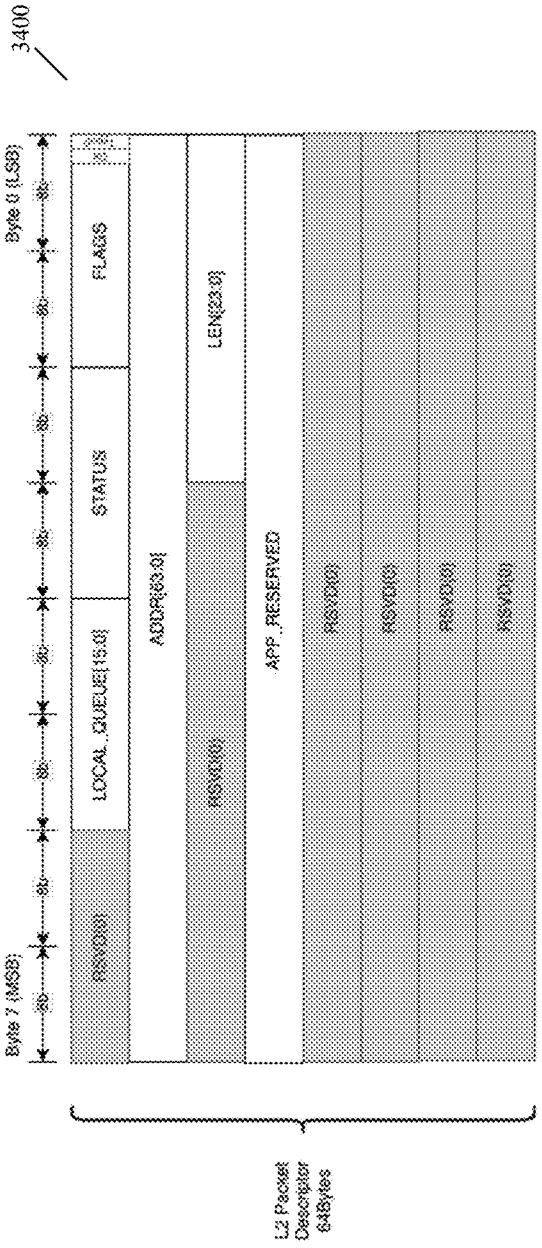

FIGS. 33 and 34 respectively illustrate the TXRX descriptor 3300 and the L2 descriptor 3400 that the EPU driver of some embodiments uses to identify the flow type for a completed transaction to its associated EPI. Tables 2 and 3 describe the fields that are used in a TXRX transmit descriptor and TXRX receive descriptor.

TABLE 2

Transmit TXRX Descriptors

| Field | Description/Usage |
|---|---|
| addr | where to read data from |
| len | Size of data in bytes (example: 256MB). The maximum is (2^32-1) segments times either 1KB (8TB) or 4KB (32TB). |
| start_time_ns | When to start actual data transfer at starting. Returns actual time it was started on descriptor completion. Set to 0 to skip waiting for start time. |
| end_time_ns | Returns actual time it was completed on descriptor completion. |
| transaction_id | Used to track a transaction. Must be different than 0, and receiver must have a different transaction_id between consecutive transactions.<br>NOTE: the routing prefix, source & destination Q should be enough to uniquely track a transaction. The transaction ID is used with READY_REQ to confirm the connection is the right one and track CHK_REQ/ACK. |
| routing_tag | Upper 24 bits is a prefix, lower 8 bits is number of paths. |
| rate_mbps | actual data rate in Mbps globally, each path uses same fraction of the total rate. |
| flags | 32-bit option flags are:<br>• bit 0: L2_PACKET(0) vs TXRX_TRANSACTION(1)<br>• bit 1: DIR_TX(1) vs DIR_RX(0)<br>• bit 2: size of one segment (only two choices: 1KB or 4KB)<br>• bit 3: skip RDY step (1) or not (0) |
| status | 0 : busy<br>1 : done OK<br>2..255: failure |
| direction | TX(0) |
| type | Default L2_Message(when set to 0)<br>TXRX_TRANSACTION(when set to 1) |

TABLE 3

| Receive TXRX Descriptors | |
|---|---|
| Field | Description/Usage |
| addr | where to write data to |
| len | Size of data in bytes (example: 256MB). The maximum is (2^32-1) segments times either 1KB (8TB) or 4KB (32TB). |
| start_time_ns | When to start actual data transfer at starting. Returns actual time it was started on descriptor completion. |
| end_time_ns | Returns actual time it was completed on descriptor completion. |
| transaction_id | Used to track a transaction. Only used if sender sends a RDY_REQ. NOTE: the routing prefix, source & destination Q should be enough to uniquely track a transaction. The transaction ID is used with READY_REQ to confirm the connection is the right one. |
| routing_tag_prefix | Packets are tagged with: tag = (routing_prefix << 8) + (f(port#,seg#) % N_PATHS) |
| rate_mbps | Not used. The receiver does not produce enough bandwidth to justify controlling its speed. |
| flags | 32-bit option flags are not used, shall be set to 0 |
| n_paths | Defines how many paths there is through the network to go back to the transmitter. |
| completion_code | 0 : success<br>1..255: failure |
| direction | RX(1) |
| reserved | For other possible future uses |
| type | Default L2_Message(when set to 0)<br>TXRX_TRANSACTION(when set to 1) |

As described in Table 2, the address and length fields of the TX descriptor respectively are (1) the pointer that identifies the location in the source EPU memory to retrieve the transaction's result data and (2) the length of this data. Similarly, as described in Table 3, the address and length fields of the RX descriptor respectively are (1) the pointer that identifies the location in the destination EPU memory to store the transmitted result of the transaction and (2) the length of this data. FIG. 34 illustrates that the L2 TX descriptor includes similar address and length fields to the TXRX transmit descriptor of FIG. 32 and Table 2.

The transmit and receive descriptors have start and end times that indicate the start and end time for the actual data transmission/reception. They also include status and completion fields that indicate the status of the transmission/reception. In some embodiments, the source EPU driver monitors one or more of these fields of the transmit descriptor to know that the transmission has been completed, and hence the result data can be deleted from EPU memory. Similarly, in some embodiments, the destination EPU driver monitors one or more of these fields of the receive descriptor to know that the reception has been completed and the data can be passed to destination EPU.

As mentioned above, the managed forwarding elements that form the RSF network fabric connecting the EPUs in some embodiments have processing units (e.g., full-fledged EPUs, ALUs, etc.) that allow these forwarding elements to perform computations in the RSF network. These operations in some embodiments include performing "collective" operations. In some embodiments, collectives involve combining data from multiples sources and distributing the result to multiple destinations.

Figure 35:
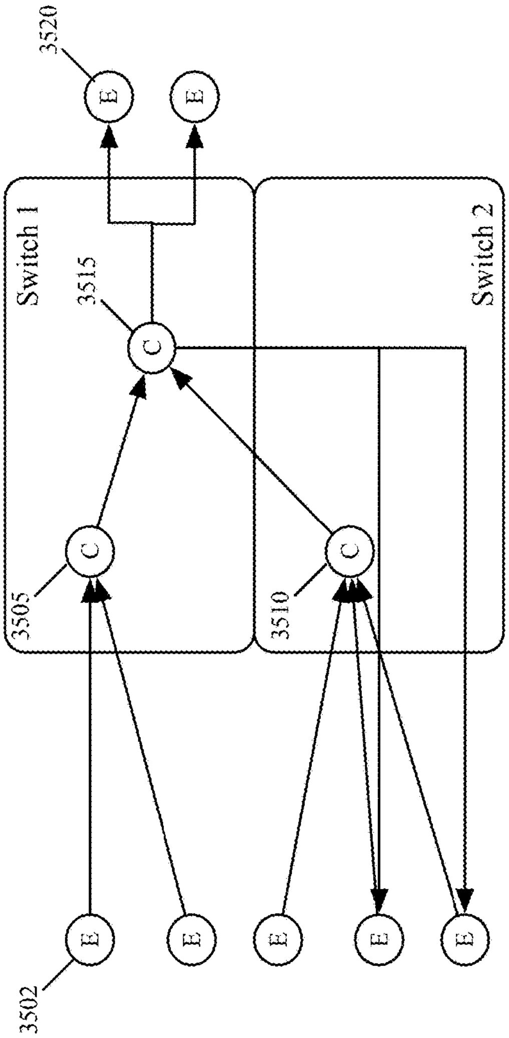
FIG. 35 presents an example that illustrates splitting transaction processing into multiple collectives with intermediate collectives feeding into a final collective.

For topology and speed reasons, it can be beneficial in some cases to split the processing into multiple collectives with intermediate collectives feeding into a final collective as illustrated in the example presented in FIG. 35. In this case, the intermediate collective nodes 3505 and 3510 in switches 1 and 2 collect data from several EPUs 3502, perform respective computational operations on the collected data, and then forward their data to a final collective node 3515 in switch 1 when they are done.

The final node 3515 then performs its computation on the received data, and in this example, allcasts its result to several EPUs 3520 (i.e., forwards its result as a unicast to each destination EPU). In this example, the EPUs 3520 that receive this allcasts result include some of the original source EPUs 3502, as shown in FIG. 35. Instead of allcasting, the node 3515 of switch 1 in some embodiments multicasts its result to multiple destinations. However, the use of multicasting can make it more difficult to handle tracking packet loss in order to retransmit lost packets.

Figure 36:
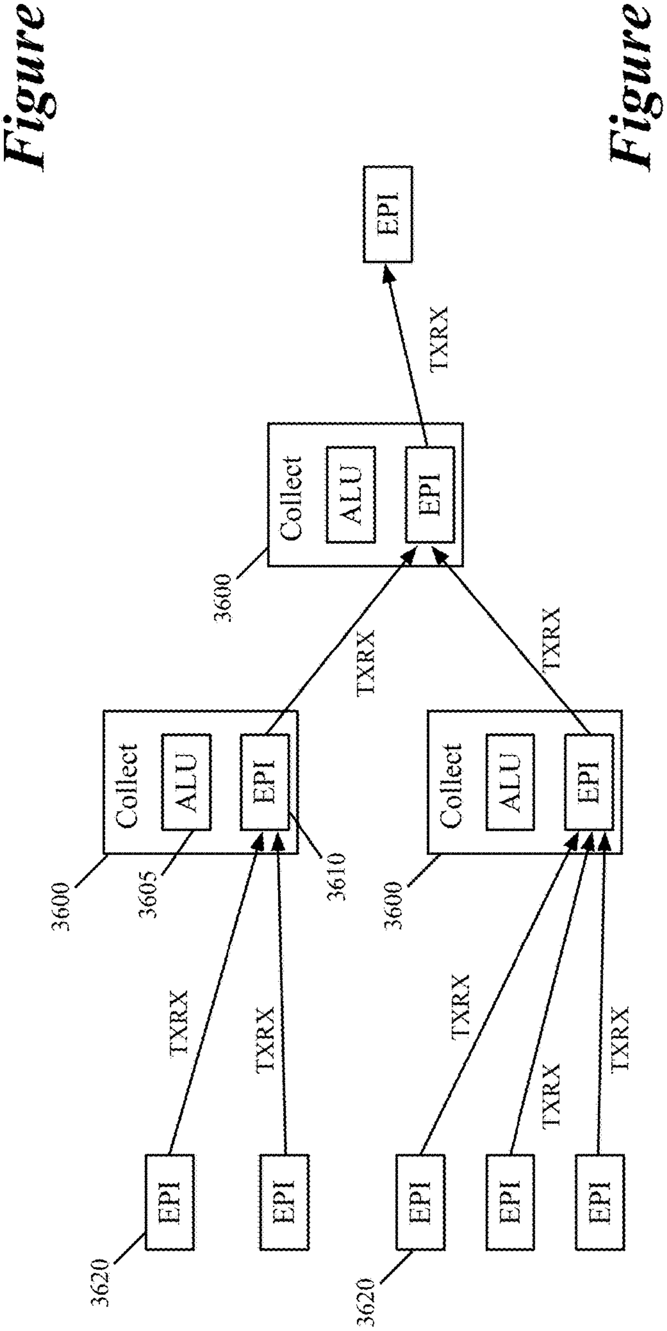
FIG. 36 illustrates that in some embodiments a managed forwarding element includes a computation unit.

FIG. 36 illustrates that in some embodiments a managed forwarding element 3600 includes (1) a computation unit 3605 (such as an ALU) that allows the forwarding element to operate as an intermediate processing unit, called a collective unit (CU) below, and (2) an EPI 3610 to interface with this computation unit and handle the TXRX protocol communication with other EPIs that communicate with the EPI 3610. In these embodiments, the use of the TXRX protocol by an EPI in a forwarding element also ensures that data is transmitted integrally from sender EPU to receiver EPU.

In some embodiments, the EPI 3610 of a managed forwarding element 3600 that implements an CU does not have MAC/PCS layers as it taps directly to the switch fabric and does not have a complex PCIe/UCIe interface with complex latency characteristics. This EPI in some embodiments reuses the Queue Controller and is designed as higher bandwidth to the fabric. The ALU 3605 in some embodiments is a local vectored ALU with a sufficient amount of memory to allow the ALU to perform computations on the data that it receives when the switch is implementing a CU.

The chain of computations in FIG. 36 in some embodiments is activated by each CU and EPU (illustrated in FIG. 36 through their EPIs 3620) receiving from transaction management software information regarding transactions assigned to the CU and EPU. An example of a transaction management software in some embodiments includes a transaction scheduler. In some embodiments, this management software is part of the distributed application, while in other embodiments the management software is a separate application. Conjunctively, or alternatively, the transaction management software in some embodiments uses one or more existing protocols (such as NCCL) to assign transactions to the CUs and EPUs.

From the information provided regarding the assigned transactions, the drivers of the source and destination CUs and EPUs generate Transmit or Receive Descriptors before the source EPU starts the data transfer for the data transaction. Once the Transmit and Receive Descriptors are in place, the CUs and EPUs will use the same TXRX protocol (e.g., as described above) to transfer the data reliably. The CUs in some cases can delay sending DATA_ACK messages to the sender when the attached ALU 3605 becomes full or when a follow-on CU is delayed. Retransmission due to packet loss is handled by TXRX protocol in some embodiments.

In some embodiments, an EPI of an EPU might use multipathing and hence transfer the result of a data transaction through multiple different CUs. In such a case, the EPI transfers the result of the data transaction through multiple different CUs by using different Transaction Descriptors that divide a large transfer into smaller ones covering different section of the memory to transfer.

In some embodiments, a forwarding element (e.g., a switch) can include more than one CU, with each CU having its own compute unit (e.g., its own ALU). Using more than one CU in a forwarding node increases the computational capacity of the forwarding node. For instance, in FIG. 35, switch 1 in some embodiments has two CUs to implement the operations of collective nodes 3505 and 3515. However, in other embodiments, the operations of the two collective nodes 3505 and 3515 are implemented with one CU being first configured to perform the operation of collective node 3505 and then configured to perform the operation of collective node 3515.

In some embodiments, an aggregation of the results of two or more earlier EPU computations might be too large for the computational unit (e.g., the ALU) of an EPU or a CU to perform. In such cases, some embodiments split the result from each earlier EPU transaction into two or more parts (also called portions) and then have different compute units of the same EPU/CU or different EPUs/CUs aggregate each set of two or more corresponding portions from the two or more earlier EPUs or CUs.

Figure 37:
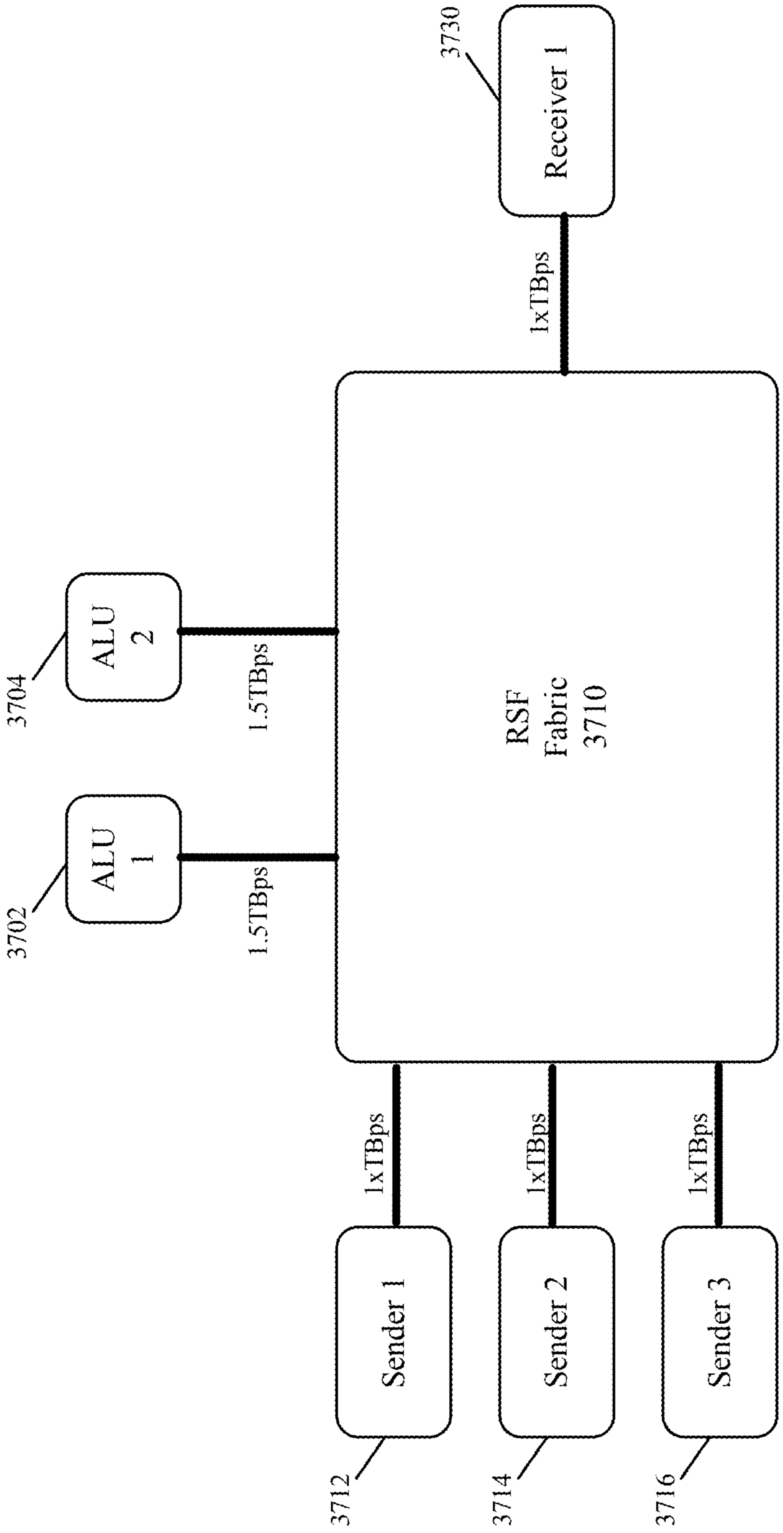
FIG. 37 illustrates an example of performing such a splitting operation using two ALUs that aggregate three sets of memory portions from three results computed by three senders.

FIG. 37 illustrates an example of performing such a splitting operation using two ALUs 3702 and 3704 that aggregate three sets of memory portions from three results computed by three senders 3712, 3714, and 3716. The two ALUs may belong to two different EPUs in some embodiments, two different CUs, or one EPU and one CU in different embodiments. In other embodiments, the ALUs 3702 and 3704 belong to the same EPU or CU. The three senders 3712, 3714, and 3716 may be three EPUs, three CUs, or a combination of EPUs and CUs.

In this example, the following assumptions are made: (1) each ALU has throughput of 1.5 TBps (1024B@1.5 GHZ to fabric), (2) each ALU has 4 MB of storage for samples, (3) senders 3712, 3714, and 3716 all have 1 TBps interfaces, and (4) senders have transmit window of 4096 packets @1024B each (4 blocks). Also, in this example, the three senders 3712, 3714, and 3716 will overflow one ALU. Hence, in some embodiments, the solution is for each sender to split the result of its transaction into two transactions, rate control each from 1 TBps to 0.5 TBps, and split a large memory block into two blocks.

Each sender's result memory is split into high-low halves, with each half sent to a different ALU (e.g., all senders' low-halves go to one common ALU and high-halves to another ALU). The two ALUs have an ingress rate of 1.5 TBPs. As shown, each of the halves is forwarded to the correct ALU through RSF network 3710, which can be formed by any combination of forwarding elements, network links, and/or combination of EPU/CU internal circuitry. For memory striping, even indexed 1K pages go to one ALU and odd indexed 1K pages go to another ALU in some embodiments. In some embodiments, all of the senders are required to have the same policy as far as which portions of memory are sent to which ALU. The results from the two ALUs are then sent separately to a receiver 3730 at a rate of 0.5 TBps as the receiver has a bandwidth of 1 TBPs. After receiving the results of the two computations performed by the two ALUs, the receiver 3730 declares the job as being complete.

As described above by reference to FIGS. 5 and 22, the telemetry services 2230 of the RSO servers 2205 collect, process and analyze telemetry data collected from the EPIs and forwarding elements that form the RSF network. This allows the telemetry services to dynamically perform degradation detection, mitigation, and escalation in the RSF network without burdening the EPUs of the RSF network with collecting any telemetry data or performing any computations needed for the detection, mitigation, and escalation operations.

Degradation detection, in some embodiments, involves identifying underperforming ports (e.g., EPI or forwarding element physical ports), links, EPIs, forwarding elements, and paths in the RSF network. In some embodiments, underperformance includes underutilization of any such RSF-network resources (also called RSF-network components). Such underutilization might be indicative that the scheduling services are being too conservative in scheduling transmission of transaction results through the RSF network.

Conjunctively, or alternatively, underperformance in some embodiments includes failure or overutilization of any of the above-specified resources (e.g., ports, links, EPIs, forwarding elements, paths, etc.). In some of these embodiments, a degradation is an event in the RSF network that causes data exchange between EPUs to be late, corrupted, missing, or not capable of being transmitted. Also, in some embodiments, degradation detection determines when, where, why, and how data transmission was degraded.

To perform such degradation detection, the telemetry servers collect and aggregate data regarding the usage of not only the EPI and MFE ports, but also regarding the usage of the physical links between these ports. Such port and link usage data is used in some embodiments to determine when the ports/links are overutilized or underutilized. The usage data includes the amount of data (e.g., number of bits) transmitted through each port and carried through each link, as well as the rate of such transfers, in some embodiments. In some embodiments, the telemetry data also specifies the amount of data that is stored in EPU memory awaiting transfer. This EPU memory usage data can further be analyzed to provide even more insight as to when ports/links are being overutilized or underutilized for different amount of stored data in the EPU memories.

Once the telemetry services 2230 identify a degradation in the operation of an RSF-network component, the management service (not shown) of the RSO server cluster uses the server cluster's topology services 2225 and/or scheduling services 2220 to mitigate (e.g., resolve or lessen) the detected degradation, as further described below. Degradation mitigation in some embodiments attempts to resolve degradation, and when applicable, repair any data loss by re-transmitting lost segments.

In some embodiments, degradation that cannot be mitigated within an allotted amount of time triggers escalation for additional mitigations and/or alerts. When the mitigation fails to resolve a detected degradation, the management service of the RSO server cluster performs one or more escalation operations to notify network administrators of the need to resolve the detected degradation.

Figure 38:
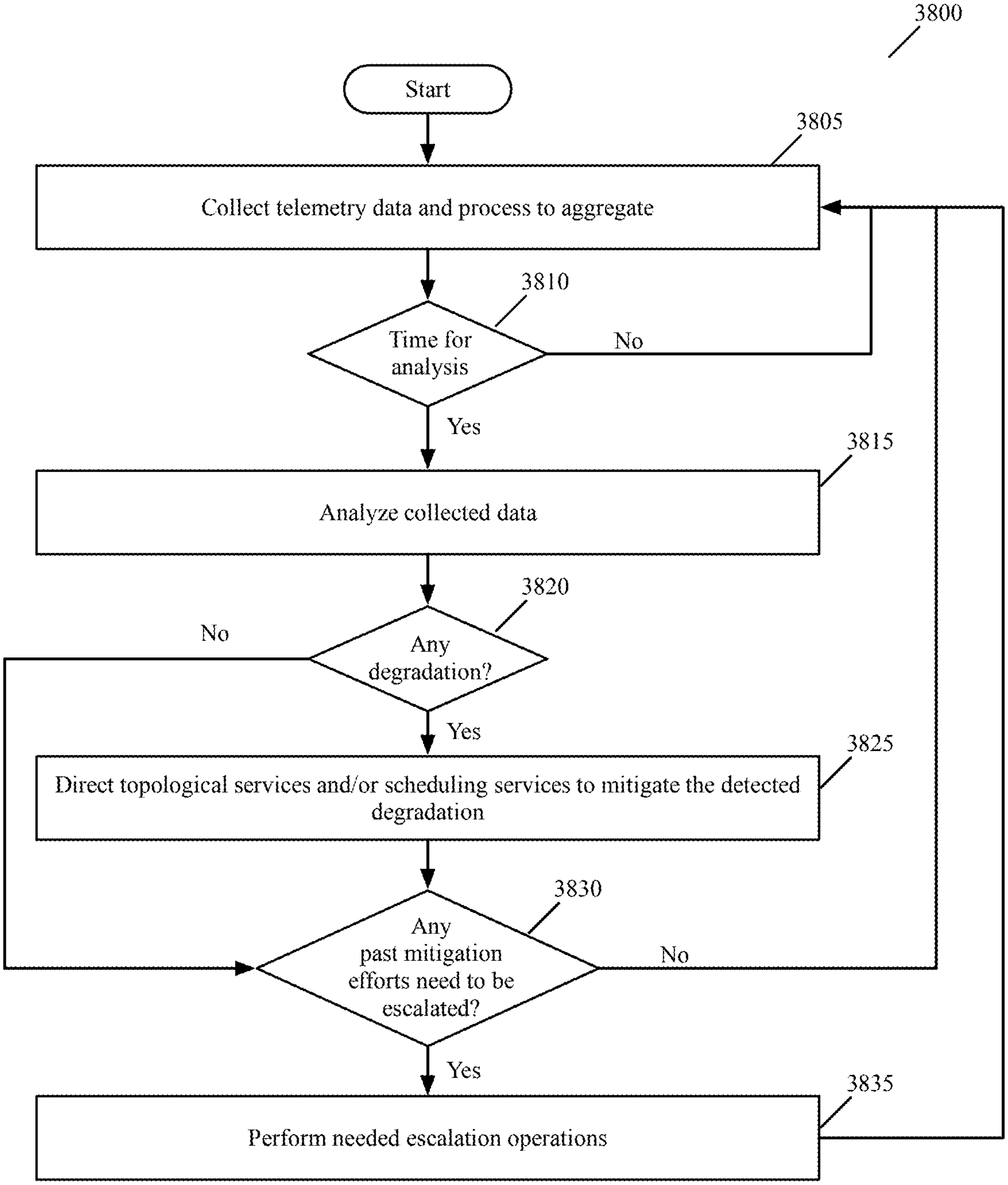
FIG. 38 conceptually illustrates a process performed by the RSO server cluster to dynamically perform degradation detection, mitigation and escalation in the RSF network.

FIG. 38 conceptually illustrates a process 3800 performed by the RSO server cluster 2205 to dynamically perform degradation detection, mitigation, and escalation in the RSF network. This process does not burden any EPU connected to the RSF network with collection of telemetry data or computations necessary for such detection, mitigation, and escalation operations. Although the operations illustrated in FIG. 38 are shown as being part of a single process, one of ordinary skill will realize that in other embodiments these operations are being performed by multiple processes that are running concurrently (e.g., to collect and process incoming telemetry data, to analyze the processed telemetry data, to perform degradation detection, to perform degradation mitigation, and/or to perform degradation escalation).

As shown, the process 3800 starts by collecting telemetry data 500 from the telemetry servers 480. The process 3800 periodically, or in real-time, receives (at 3805) telemetry data 500 from the telemetry servers 480 after these servers collect and aggregate telemetry data from the EPIs and the forwarding elements that forms the RSF network fabric. As mentioned above by reference to FIG. 5, the telemetry servers 480 in some embodiments collect MFE telemetry data (e.g., telemetry data regarding the MFEs) through the CP processors of the MFEs, and collect the EPU EPI telemetry data through the CP processors 505 of first-hop MFEs connected with the EPU EPIs. In other embodiments, the telemetry servers 480 collect EPI telemetry data directly from the EPIs or through CP proxy servers associated with these EPIs.

Also, as mentioned above, the telemetry data 500 in some embodiments includes a time stamp for each data message sent by an EPI or an MFE (e.g., a managed switch) to transmit each chunk of data that contains a portion of a result of an EPU operation. In other embodiments, however, the telemetry data 500 collected by the telemetry servers 480 only includes a completion flag associated with the EPI or switch completing the transmission of all the data messages that contain the EPU operation result. Along with this flag, the telemetry data 500 includes a time for when the transmission operation was completed.

This data in some embodiments is collected by the CPPs of the EPIs and by the CPPs of the MFEs. In addition to collecting such data, the CPPs of the EPIs and MFEs repeatedly (e.g., through periodic polling) collect other data from registers (in the data plane circuits) that store statistics regarding the physical ports of the data plane circuits of the EPIs and MFEs. Through all of the collected data, the CPPs, telemetry servers, and/or RSO server cluster 2205 can identify the amount, rate, and timing of data transmitted through each port of an EPI or MFE. The identified amount, rate, and timing of data can then be used to identify amount, rate, and timing for the use of each physical link (e.g., wired or wireless link) between two ports (e.g., between an EPI port and an MFE port or between two MFE ports) in the RSF network.

After collecting telemetry data, the process 3800 processes (at 3805) the collected data. In some embodiments, this processing entails aggregating the data with previously collected data from the same sources and/or correlating the collected data with data collected from other related sources. The data that is correlated with data collected from a particular port (e.g., of an EPI or an MFE) in some embodiments include data from other ports of the same EPI, of ports of other EPIs of an EPU, of ports of EPIs at the other end of a path segment than the particular port, and/or of ports of other EPIs along the same path. The processing also entails computing statistics (e.g., computing averages, means, median, etc.), and updating previous statistic computations for each port, link, EPI, etc.

After collecting and processing telemetry data, the process 3800 determines (at 3810) whether it has reached a time to analyze the data. If not, the process returns to 3805 to wait to receive and process the next batch of telemetry data. Otherwise, the process transitions to 3815 to analyze the collected telemetry data to detect any degradation in the RSF network operation (e.g., any degradation at any EPI, EPI port, MFE, MFE port, link between ports, etc.).

In some embodiments, the process 3800 performs its analysis of the telemetry data periodically. In these embodiments, the process 3800 determines whether the time for the analysis of the next batch of collected telemetry data has been reached (e.g., whether an analysis timer has expired). In other embodiments, the process 3800 analyzes each batch of telemetry data that is collected once this data has been processed to have its associated set of metrics updated.

Analysis (at 3815) of the collected data involves analysis of the statistics generated for each RSF network resource (e.g., each port, each EPI, each MFE, etc.) to determine whether any resources are performing sub-optimally, e.g., are overutilized (e.g., congested) or underutilized. Also, as mentioned above, some embodiments analyze data associated with the collected completion flags and times for each particular EPU operation that had a scheduled transmission through the network fabric, in order to identify one or more metrics associated with each flow's transmission through each network-fabric node and to generate visualizations of such flows. Reviewing this data can identify any portion of the network that is performing poorly. Also, repeated review of such data can identify any network node that has degraded performance for any type of flow. In addition to using this telemetry data to identify paths that have failed or have problems, some embodiments use similar timing data to determine when an EPU is performing poorly.

At 3820, the process determines whether it was able to identify a degradation in any part of the RSF network that it has to try to mitigate or escalate. In some embodiments, the process 3800 does not try to mitigate an identified degradation the first time it identifies the degradation. The degradation has to persist for a sufficiently long enough duration in these embodiments before the process identifies (at 3815) the degradation as one that the process 3800 has to mitigate or escalate. In other embodiments, the process 3800 flags an identified degradation for mitigation or escalation the first time that the process identifies the degradation. In still other embodiments, the analysis operation that identifies the degradation has a temporal component (e.g., a low-pass filtering operation) that ensures that the condition that resulted in the degradation detection has existed for a sufficiently long enough time period for the condition to be classified (at 3815) as a detected degradation.

Degradation detection in some embodiments involves identifying underperforming ports (e.g., EPI or forwarding element physical ports), links, EPIs, forwarding elements, and paths in the RSF network. In some embodiments, underperformance includes underutilization of any such RSF-network resources (also called RSF-network component). Such underutilization might be indicative that the scheduling services are being too conservative in scheduling transmission of transaction results through the RSF network. Conjunctively, or alternatively, underperformance in some embodiments includes failure or overutilization of any of the above-specified resources (e.g., ports, links, EPIs, forwarding elements, paths, etc.).

When the process 3800 determines (at 3820) that a sufficiently long-standing degradation has been identified (at 3815), the process 3800 directs (at 3825) the topology services 2225 and/or scheduling services 2220 to mitigate (e.g., resolve or lessen) any such detected degradation. When the detected degradation involves overutilization of an RSF-network resource, the topological services 2225 in some cases can modify one or more paths for one or more data message flows (for one or more EPU transaction results) through the RSF network in order to reduce usage of the overutilized RSF-network resource.

For instance, the process 3800 mitigates overloading of a particular MFE by configuring the EPIs and/or MFEs to send no flows or fewer flows through the particular MFE (e.g., by providing revised next-hop forwarding records to one or more EPIs and/or MFEs in order to reduce the number of flows that are sent along paths that use the particular MFE). To reduce the use of the overutilized RSF-network resource, the scheduling services 2220 in some cases can also modify one or more scheduling parameters for prescheduled transactions (e.g., reduce the rate of transmission through an overutilized port, link, or path).

When the detected degradation involves underutilization of an RSF-network resource, the process 3800 directs (at 3825) the scheduling services to utilize more of the underutilized RSF-network resource. These scheduling services in some embodiments include the proactive scheduling service 2220 of the RSF server cluster 2205. Conjunctively, the process 3800 in some embodiments configures the in-band reactive scheduling services (provided by the CP processors or CP proxy servers used by the RSF MFEs) to utilize more of the underutilized RSF-network resource.

After directing (at 3825) the topological and/or scheduling services to try to mitigate any degradation detected through the last iteration through 3820, the process 3800 determines (at 3830) whether any past mitigation operations identified in previous iterations through 3820 have failed and hence require an escalation operation to be performed for the detected degradation. If not, the process returns to 3805 to wait to receive and process the next batch of telemetry data. On the other hand, when the process 3800 determines (at 3830) that a mitigation operation fails to resolve a detected degradation, the process 3800 performs (at 3835) one or more escalation operations to notify one or more network administrators of the need to resolve the detected degradation, and then returns to 3805 to wait to receive and process the next batch of telemetry data.

In conjunction with notifying a network administrator, the process 3800 in some embodiments performs one or more other escalation operations. For instance, in some embodiments, the process 3800 mitigates overloading of a particular MFE by configuring the EPIs and/or MFEs to send fewer flows through the particular MFE. When the process 3800 subsequently detects that the reduction of flows through the particular MFE has not resolved the poor performance of the particular MFE, the process 3800 in these embodiments configures all the EPIs and/or MFEs to stop forwarding any flows through the particular MFE, and then notifies the administrator of the state of the particular MFE. The process 3800 may also direct the particular MFE to shut down its operation.

In some embodiments, the above-described process 3800 is designed to detect and mitigate failures within the RSF network in a bounded amount of time, setting an upper bound on the time lost for each type of mitigated degradation event. In the cases where these events cannot be mitigated within the given time, a pre-arranged escalation path is established to apply additional automated mitigations and/or alert external operator software of failures that might stretch beyond the RSF network. In some embodiments, this design of the process 3800 is implemented by using configurable timers that are set to expire within the desired configurable bounded amounts of time for detecting, mitigating, and escalating (if necessary) an event.

In addition to detecting degradation by analyzing the collected telemetry data at the RSO server cluster, some embodiments also use CP monitoring agents in the EPIs or MFEs to detect degradation in performance of an RSF network resource. Several examples of detected degradation and mitigation/escalation of such detected degradations will now be described.

The TXRX protocol is designed such that the EPIs that use this protocol can detect and mitigate bit flips, missing or corrupted segments, and poorly operating components, such as physical link transceivers. Conjunctively, MFE monitoring agents in some embodiments register when and where these types of errors occur, triangulating from TXRX, local statistics, and communication between the MFEs to isolate where errors are occurring and if the error rate should trigger the removal of a path or paths from the system. Retransmission of corrupted or lost data in these embodiments is not visible to the distributed application that uses the EPUs connected by the RSF network.

Losing one or more SerDes ports in an EPU EPI will degrade the total amount of bandwidth based on the remaining set of connections still functioning. The topological service of the RSF server cluster in some embodiments is able to gracefully degrade the bandwidth by updating the use of the different EPI ports for forwarding of a transaction's results through several data message flows that traverse through the different EPI ports. Segments that are lost during the changes in topology are re-transmitted using TXRX protocol. The change in bandwidth only impacts application performance, otherwise the application is not interrupted.

The telemetry service can also be configured by network administrators so that they can receive notifications of changes in the infrastructure, such as a bandwidth limitation. Based on this reduction in bandwidth, a network administrator may set a threshold for specifying service at the EPI or adjacent MFE is needed. Similarly, if all the connections into an EPU are lost, then EPU Loss of Connectivity Alert will trigger the EPU to be replaced.

Losing one or more SERDES ports between MFEs in some embodiments triggers the topological service of the RSF server cluster to find new paths between the MFEs, or between the EPU clusters connected by the MFE, as MFEs in some embodiments are only connected to one another when sending data to/from inner and outer networks. The topological service in some embodiments reconfigures the set of available paths between each impacted MFE, which may involve a reduction in maximum bandwidth. Segments that are lost during the changes in topology are re-transmitted using TXRX protocol. Accordingly, the change in topology only impacts application performance in certain cases; otherwise the application is not interrupted. The telemetry service of the RSF server cluster is used in some embodiments to notify network administrators of changes in the infrastructure, such as a topology change in the RSF network.

In-band control plane traffic (e.g., path latency measurements and reactive scheduling messages) are carried over the TXRX protocol in some embodiments. When a persistent or systematic path failure is detected in a TXRX connection carrying control plane traffic, the EPI in some embodiments steps through a set of backup paths to attempt to reach the same destination (which can be an MFE or another EPU EPI) using a different port and MFE(s). If that fails and the destination is an MFE, the EPI will attempt to reach a backup MFE to signal that the lead MFE may have failed or is slow to respond. Control plane messages bridge path-based, endpoint, and MFE escalation paths, since a failing control conversation may detect an error along the path, at an MFE, or at an endpoint, and/or multiple combinations of these failures at the same time.

Reactive scheduling that is late or not responding has a direct impact on end user applications as it is needed to allocate bandwidth to send traffic at high rates. Thus, the control plane message failures in some embodiments move rapidly through the escalation path to minimize the performance impact of path-based or MFE related degradations.

In some embodiments, each MFE uses a High Availability (HA) check protocol (e.g., keep-alive signaling) with other MFEs within the same cluster to ensure that the other MFEs are still operating properly. This checking simplifies the control plane communications used to facilitate scheduling, topology changes, and telemetry. It also ensures that when an MFE is lost (e.g., due to power failure, control plane processor crash, software malfunction, etc.), the other MFEs in the group take over its responsibilities so that the group can attempt to recover the lost device. HA check in some embodiments triggers an MFE reset if it detects that the software running on the control plane processor is responding slowly (e.g., between MFEs, between MFEs and EPU EPIs, or between MFEs and the services layer of the RSF server cluster).

The use of proactive scheduling allows for a monitoring agent of an EPU or an EPU EPI (that in some embodiments runs on the leader first-hop MFE of the EPU) to measure how close to its expected transmit time the EPI transmits its data, including detecting when its EPU is taking longer to compute a result compared to the proactive schedule and/or compared to its peers in a collective operation. In some embodiments, a network administrator may set a threshold (that is dependent on the amount of detected slowdown) at which point the EPU or EPI is replaced.

Conduits between sites are often made up of multiple optical connections bundled together to reach into the PetaBytes/sec of bandwidth. Loss of one or more connections should gracefully degrade the total amount of bandwidth between sites, and any segments lost during the failure and re-configuration should be re-transmitted using TXRX protocol, where TXRX protocol is configured to run across these site-to-site conduits taking into account their range in round trip times. The change in available bandwidth only impacts application performance; otherwise the application is not impacted or made aware of the loss in bandwidth unless it is monitoring the Telemetry Service.

Many of the features described above are described in terms of the operations of GPUs. However, as noted previously, any of these features relating to the transfer of result data computed by GPUs apply to the transfer of result data computed by any type of EPUs, such as CPUs, NPUs, TPUs, etc. (i.e., any sort of processing unit that can be configured to perform offloaded computations for an application).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 39:
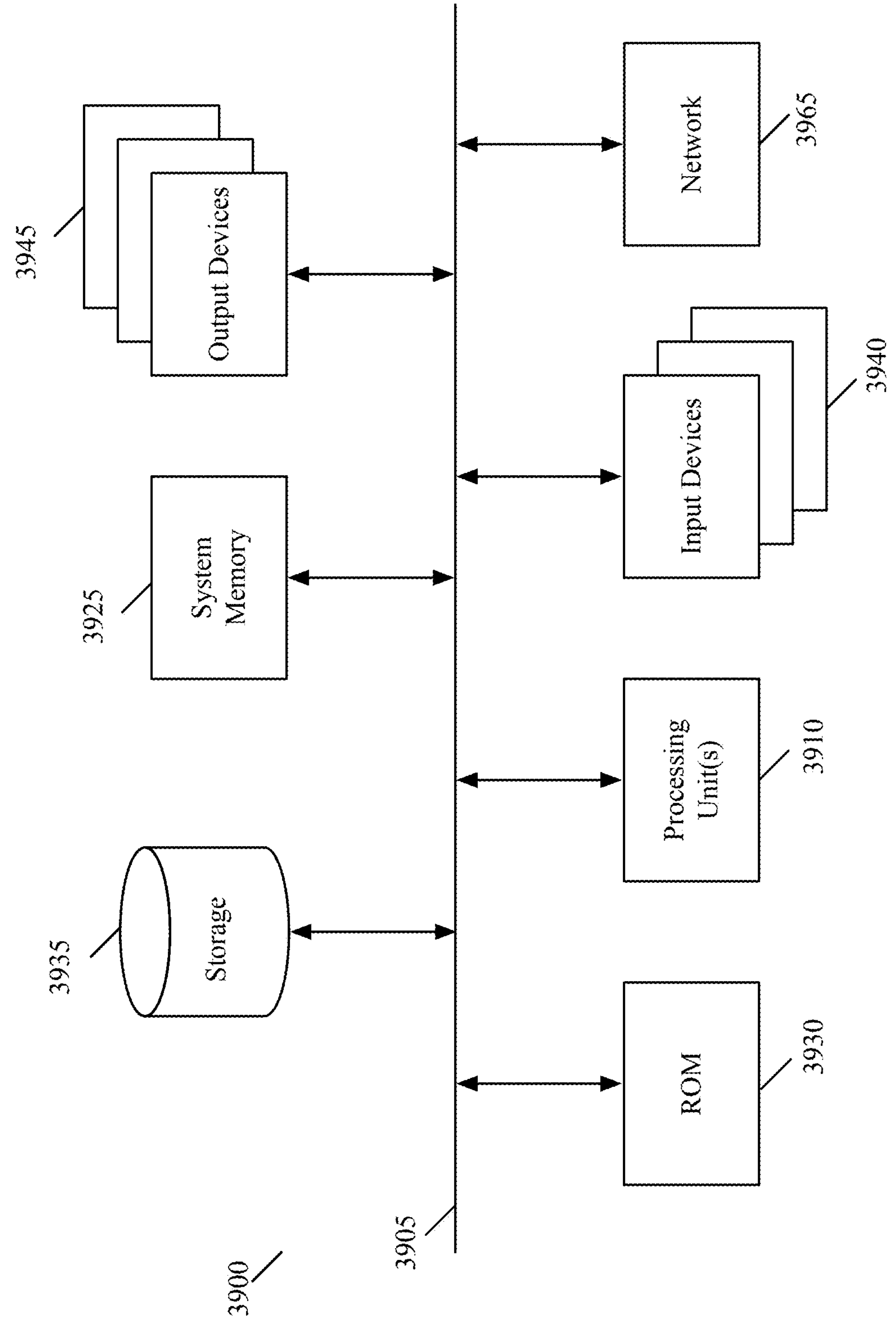
FIG. 39 conceptually illustrates an electronic system with which some embodiments of the invention are implemented.

FIG. 39 conceptually illustrates a computer system 3900 with which some embodiments of the invention are implemented. The computer system 3900 can be used to implement any of the above-described hosts, controllers, and managers. As such, it can be used to execute any of the above-described processes. This computer system includes various types of non-transitory machine readable media and interfaces for various other types of machine readable media. Computer system 3900 includes a bus 3905, processing unit(s) 3910, a system memory 3925, a read-only memory 3930, a permanent storage device 3935, input devices 3940, and output devices 3945.

The bus 3905 collectively represents all system, peripheral, and chipset buses that communicatively connect the numerous internal devices of the computer system 3900. For instance, the bus 3905 communicatively connects the processing unit(s) 3910 with the read-only memory 3930, the system memory 3925, and the permanent storage device 3935.

From these various memory units, the processing unit(s) 3910 retrieve instructions to execute and data to process in order to execute the processes of the invention. The processing unit(s) may be a single processor or a multi-core processor in different embodiments. The read-only-memory (ROM) 3930 stores static data and instructions that are needed by the processing unit(s) 3910 and other modules of the computer system. The permanent storage device 3935, on the other hand, is a read-and-write memory device. This device is a non-volatile memory unit that stores instructions and data even when the computer system 3900 is off. Some embodiments of the invention use a mass-storage device (such as a magnetic or optical disk and its corresponding disk drive) as the permanent storage device 3935.

Other embodiments use a removable storage device (such as a flash drive, etc.) as the permanent storage device. Like the permanent storage device 3935, the system memory 3925 is a read-and-write memory device. However, unlike storage device 3935, the system memory is a volatile read-and-write memory, such a random access memory. The system memory stores some of the instructions and data that the processor needs at runtime. In some embodiments, the invention's processes are stored in the system memory 3925, the permanent storage device 3935, and/or the read-only memory 3930. From these various memory units, the processing unit(s) 3910 retrieve instructions to execute and data to process in order to execute the processes of some embodiments.

The bus 3905 also connects to the input and output devices 3940 and 3945. The input devices enable the user to communicate information and select commands to the computer system. The input devices 3940 include alphanumeric keyboards and pointing devices (also called "cursor control devices"). The output devices 3945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 39, bus 3905 also couples computer system 3900 to a network 3965 through a network adapter (not shown). In this manner, the computer can be a part of a network of computers (such as a local area network ("LAN"), a wide area network ("WAN"), or an Intranet, or a network of networks, such as the Internet. Any or all components of computer system 3900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The discussion above elaborates on several ways to configure the EPUs (e.g., the EPU EPIs) to schedule their use of the network in order to reliably and deterministically communicate with each other (e.g., to pass their results to each other). One of ordinary skill will realize that this scheduling is accomplished through other mechanisms (e.g., through distribution of match-action units that will be used by data plane match-action units to schedule communication between the EPUs) in other embodiments. Also, rather than using some or all of the above-described scheduling parameters (e.g., rate, path and time), other embodiments use a subset of these scheduling parameters, and/or use other techniques for otherwise managing the use of the network between the EPUs for their communication (e.g., for the passing of their results to each other).

Even though FIG. 2 shows the management server cluster managing the network between a collection of GPUs, the management server cluster of some embodiments commonly manages the network between several different collections of EPUs, e.g., commonly manage one network that connects the CPUs in a collection of CPUs and also connects the GPUs in a collection of GPUs. The CPUs are often viewed as front-end network components performing front-end operations, while the GPUs are often viewed as back-end network components that perform back-end computations. In some embodiments, the management server cluster's management of the common network for both the front-end and back-end components effects the sequence of operations for managing (e.g., scheduling) of one type of processing units (e.g., the GPUs) use of the network fabric. Thus, one of ordinary skill in the art would understand that the invention is not to be limited by the foregoing illustrative details, but rather is to be defined by the appended claims.

The invention claimed is:

1. A system for executing a distributed application, the system comprising:

a plurality of clusters of endpoint processing units (EPUs) that perform computations that are associated with the execution of the distributed application, each EPU comprising a plurality of endpoint interfaces (EPIs), each EPI comprising a plurality of ports;

for each cluster of EPUs, a set of two or more intra-cluster switches each of which connects to a plurality of EPIs of two or more EPUs in the cluster in order to connect the EPUs in the cluster of EPUs; and a set of two or more inter-cluster switches each of which connects at least two intra-cluster switches of two different clusters of EPUs, said inter-cluster and intra-cluster switches forming a network, wherein in each cluster, each EPI of one EPU is only 1-hop away from an EPI of another EPU in the same cluster as the intra-cluster switches of the cluster connect each EPI of each EPU to an EPI of every other EPU in the same cluster, and each EPI of each EPU connects through one of its ports to each intra-cluster switch of the set of intra-cluster switches of the EPU's cluster.

2. The system of claim 1, wherein the EPUs are graphics processing units (GPUs).

3. The system of claim 1, wherein the EPUs comprise at least one of graphics processing units (GPUs), tensor processing units (TPUs) and central processing units (CPUs).

4. The system of claim 1, wherein a first EPU in any cluster is able to reach a second EPU in any other cluster through a maximum of three switch hops comprising one intra-cluster switch in each cluster and one inter-cluster switch connecting the two intra-cluster switches.

5. The system of claim 1, wherein each EPU's EPI has two or more ports that connect through two or more physical links with the set of two or more intra-cluster switches in order to connect the EPU with the set of two or more intra-cluster switches.

6. The system of claim 1, wherein wired physical links connect the EPUs with the intra-cluster switches, while optical physical links connect the intra-cluster switches with the inter cluster switches.

7. The system of claim 1, wherein each EPU in each cluster connects to each intra-cluster switch in the set of intra-cluster switches of the cluster.

8. The system of claim 1, wherein the EPIs forward results of computations with data message flows that contain forwarding tags that specify paths through which the flows will traverse along the network.

9. A network for connecting a plurality of clusters of endpoint processing units (EPUs) that perform computations of a distributed application to collectively execute the distributed application, each EPU comprising a plurality of endpoint interfaces (EPIs), each EPI comprising a plurality of ports, the network comprising:

a plurality of intra-cluster switches each of which connects two or more EPUs within one cluster; and a plurality of inter-cluster switches each of which connects at least two intra-cluster switches of two different clusters of EPUs in order to connect the two different sets of EPUs of the two different clusters, wherein in each cluster, each EPI of one EPU is only 1-hop away from an EPI of another EPU in the same cluster as the intra-cluster switches of the cluster connect each EPI of each EPU to an EPI of every other EPU in the same cluster, each EPI of each EPU connects through one of its ports to each intra-cluster switch of the set of intra-cluster switches of the EPU's cluster.

10. The network of claim 9, wherein the EPUs are graphics processing units (GPUs).

11. The network of claim 9, wherein the EPUs comprise at least one of graphics processing units (GPUs), tensor processing units (TPUs) and central processing units (CPUs).

12. The network of claim 9, wherein a first EPU in any cluster is able to reach a second EPU in any other cluster through a maximum of three switch hops comprising one intra-cluster switch in each cluster and one inter cluster switch connecting the two intra-cluster switches.

13. The network of claim 9, wherein each EPU's EPI has two or more ports that connect through two or more physical links with the set of two or more intra-cluster switches in order to connect the EPU with the set of two or more intra-cluster switches.

14. The network of claim 9, wherein wired physical links connect the EPUs with the intra-cluster switches, while optical physical links connect the intra-cluster switches with the inter-cluster switches.

15. The network of claim 9, wherein each EPU in each cluster connects to each intra-cluster switch in the set of intra-cluster switches of the cluster.

16. The network of claim 9, wherein each of one or more EPIs performs a multi-pathing operation that forwards a result of a computation performed by the EPI's EPU to a destination along two or more paths through the network, the performance of the multi-pathing operations by the EPIs relieving the inter-cluster and intra-cluster switches from performing multi-pathing operations to spread one flow through multiple paths through the network.

* * * * *